(12) United States Patent
Moon et al.

(10) Patent No.: US 12,425,640 B2
(45) Date of Patent: Sep. 23, 2025

(54) METHOD AND APPARATUS FOR ENCODING/DECODING IMAGE

(71) Applicant: INDUSTRY ACADEMY COOPERATION FOUNDATION OF SEJONG UNIVERSITY, Seoul (KR)

(72) Inventors: Joo Hee Moon, Seoul (KR); Dong Jae Won, Seoul (KR); Jae Min Ha, Incheon (KR); Sung Won Lim, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 240 days.

(21) Appl. No.: 18/187,338

(22) Filed: Mar. 21, 2023

(65) Prior Publication Data

US 2023/0239496 A1    Jul. 27, 2023

Related U.S. Application Data

(63) Continuation of application No. 17/253,924, filed as application No. PCT/KR2019/007328 on Jun. 18, 2019, now Pat. No. 11,647,222.

(30) Foreign Application Priority Data

Jun. 18, 2018 (KR) .................. 10-2018-0069604
Jun. 18, 2018 (KR) .................. 10-2018-0069605
Jun. 18, 2018 (KR) .................. 10-2018-0069606

(51) Int. Cl.
*H04N 19/527* (2014.01)
*H04N 19/107* (2014.01)
(Continued)

(52) U.S. Cl.
CPC ......... *H04N 19/527* (2014.11); *H04N 19/107* (2014.11); *H04N 19/176* (2014.11); *H04N 19/577* (2014.11)

(58) Field of Classification Search
CPC .................................................... H04N 19/527
(Continued)

(56) References Cited

U.S. PATENT DOCUMENTS

| 2016/0286229 A1 | 9/2016 | Li et al. |
| 2016/0286230 A1 | 9/2016 | Li et al. |

(Continued)

FOREIGN PATENT DOCUMENTS

| CN | 107113425 A | 8/2017 |
| CN | 107409225 A | 11/2017 |

(Continued)

OTHER PUBLICATIONS

International Search Report Issued on Sep. 24, 2019 in counterpart International Patent Application No. PCT/KR2019/007328 (2 pages in English and 2 pages in Korean).

(Continued)

*Primary Examiner* — Yulin Sun
(74) *Attorney, Agent, or Firm* — NSIP Law

(57) ABSTRACT

Disclosed herein are an image encoding method and an image decoding method. The image decoding method includes determining an initial motion vector of a current block using a motion vector of a reconstructed region, searching for the motion vector of the current block based on the initial motion vector, and generating a prediction sample of the current block using the motion vector. The initial motion vector includes a motion vector in a past direction and a motion vector in a future direction.

9 Claims, 77 Drawing Sheets

(51) Int. Cl.
*H04N 19/176* (2014.01)
*H04N 19/577* (2014.01)

(58) Field of Classification Search
USPC .................................................. 375/240.16
See application file for complete search history.

(56) References Cited

U.S. PATENT DOCUMENTS

| | | |
|---|---|---|
| 2016/0286232 A1 | 9/2016 | Li et al. |
| 2016/0345011 A1 | 11/2016 | Naing et al. |
| 2017/0251213 A1* | 8/2017 | Ye ........................ H04N 19/159 |
| 2017/0310990 A1 | 10/2017 | Hsu |
| 2018/0041769 A1 | 2/2018 | Chuang et al. |
| 2020/0366930 A1* | 11/2020 | Lee ...................... H04N 19/593 |

FOREIGN PATENT DOCUMENTS

| | | |
|---|---|---|
| CN | 107995489 A | 5/2018 |
| KR | 10-2017-0131447 A | 11/2017 |
| KR | 10-2018-0061060 A | 6/2018 |
| WO | WO 2016/160608 A1 | 10/2016 |
| WO | WO 2018/066990 A1 | 4/2018 |

OTHER PUBLICATIONS

Kamp, Steffen, et al. "Decoder-Side Motion Vector Derivation for Block-Based Video Coding." *IEEE transactions on circuits and systems for video technology* vol. 22 No. 12: Dec. 2012: pp. 1732-1745 (14 pages in English).

Esenlik, Semih, et al. "Description of Core Experiment 9 (CE9): Decoder Side Motion Vector Derivation." JVET-J1029: Apr. 2018. pp. 1-34 (34 pages in English).

* cited by examiner

FIG. 18

| INDEX | CANDIDATE INITIAL MOTION INFORMATION |
|---|---|
| 0 | CANDIDATE MOTION INFORMATION OF AMVP MODE |
| 1 | CANDIDATE MOTION INFORMATION OF MERGE MODE |
| 2 | MOTION INFORMATION OF TOP, LEFT, TOP LEFT, TOP RIGHT AND BOTTOM LEFT BLOCKS |
| 3 | ZERO MOTION INFORMATION |

FIG. 35

| ORDER OF CONSTRUCTION | 0 | 1 | 2 | 3 | 4 | 5 | 6 | 7 | 8 | 9 | 10 | 11 |
|---|---|---|---|---|---|---|---|---|---|---|---|---|
| CANDIDATE INDEX (PAST) | 0 | 1 | 0 | 2 | 1 | 2 | 0 | 3 | 1 | 3 | 2 | 3 |
| CANDIDATE INDEX (FUTURE) | 1 | 0 | 2 | 0 | 2 | 1 | 3 | 0 | 3 | 1 | 3 | 2 |

FIG. 42

| INDEX | CANDIDATE INITIAL MOTION INFORMATION |
|---|---|
| 0 | CANDIDATE MOTION INFORMATION OF AMVP MODE |
| 1 | CANDIDATE MOTION INFORMATION OF MERGE MODE |
| 2 | MOTION INFORMATION OF TOP, LEFT, TOP LEFT, TOP RIGHT AND BOTTOM LEFT BLOCKS |
| 3 | ZERO MOTION INFORMATION |

FIG. 52

CANDIDATE MOTION INFORMATION LIST (5201)

| MOTION INFORMATION CANDIDATE INDEX | PAST MOTION INFORMATION | FUTURE MOTION INFORMATION |
|---|---|---|
| 1 | MV:$(x1_{L0}, y1_{L0})$, RefIdx:$R1_{L0}$ | - |
| 2 | - | MV:$(x2_{L1}, y2_{L1})$, RefIdx:$R2_{L1}$ |
| 3 | MV:$(x3_{L0}, y3_{L0})$, RefIdx:$R3_{L0}$ | MV:$(x3_{L1}, y3_{L1})$, RefIdx:$R3_{L1}$ |
| 4 | MV:$(x4_{L0}, y4_{L0})$, RefIdx:$R4_{L0}$ | - |
| 5 | MV:$(x5_{L0}, y5_{L0})$, RefIdx:$R5_{L0}$ | MV:$(x5_{L1}, y5_{L1})$, RefIdx:$R5_{L1}$ |

CORRECTED CANDIDATE MOTION INFORMATION LIST (5202)

| MOTION INFORMATION CANDIDATE INDEX | PAST MOTION INFORMATION | FUTURE MOTION INFORMATION |
|---|---|---|
| 1 | MV:$(x1'_{L0}, y1'_{L0})$, RefIdx:$R1_{L0}$ | - |
| 2 | - | MV:$(x2_{L1}, y2_{L1})$, RefIdx:$R2_{L1}$ |
| 3 | MV:$(x3'_{L0}, y3'_{L0})$, RefIdx:$R3_{L0}$ | MV:$(x3'_{L1}, y3'_{L1})$, RefIdx:$R3_{L1}$ |
| 4 | MV:$(x4_{L0}, y4_{L0})$, RefIdx:$R4_{L0}$ | - |
| 5 | MV:$(x5_{L0}, y5_{L0})$, RefIdx:$R5_{L0}$ | MV:$(x5_{L1}, y5_{L1})$, RefIdx:$R5_{L1}$ |

FIG. 54

5401 CANDIDATE MOTION INFORMATION LIST

| MOTION INFORMATION CANDIDATE INDEX | PAST MOTION INFORMATION | FUTURE MOTION INFORMATION |
|---|---|---|
| 1 | MV:$(x1_{L0},y1_{L0})$,RefIdx:$R1_{L0}$ | - |
| 2 | - | MV:$(x2_{L1},y2_{L1})$,RefIdx:$R2_{L1}$ |
| 3 | MV:$(x3_{L0},y3_{L0})$,RefIdx:$R3_{L0}$ | MV:$(x3_{L1},y3_{L1})$,RefIdx:$R3_{L1}$ |
| 4 | MV:$(x4_{L0},y4_{L0})$,RefIdx:$R4_{L0}$ | - |
| 5 | MV:$(x5_{L0},y5_{L0})$,RefIdx:$R5_{L0}$ | MV:$(x5_{L1},y5_{L1})$,RefIdx:$R5_{L1}$ |

5402 REALIGNED CANDIDATE MOTION INFORMATION LIST

| MOTION INFORMATION CANDIDATE INDEX | PAST MOTION INFORMATION | FUTURE MOTION INFORMATION |
|---|---|---|
| 1 | MV:$(x3_{L0},y3_{L0})$,RefIdx:$R3_{L0}$ | MV:$(x3_{L1},y3_{L1})$,RefIdx:$R3_{L1}$ |
| 2 | MV:$(x4_{L0},y4_{L0})$,RefIdx:$R4_{L0}$ | - |
| 3 | - | MV:$(x2_{L1},y2_{L1})$,RefIdx:$R2_{L1}$ |
| 4 | MV:$(x5_{L0},y5_{L0})$,RefIdx:$R5_{L0}$ | MV:$(x5_{L1},y5_{L1})$,RefIdx:$R5_{L1}$ |
| 5 | MV:$(x1_{L0},y1_{L0})$,RefIdx:$R1_{L0}$ | - |

CASE OF "X≠0 AND Y≠0" OF MVD

| MVD SIGN SET INDEX | MVD SIGN SET | TEMPLATE MATCHING COST VALUE | ALLOCATED BINARY INFORMATION |
|---|---|---|---|
| 1 | (-,-) | 100 | 10 |
| 2 | (-,+) | 120 | 110 |
| 3 | (+,-) | 80 | 0 |
| 4 | (+,+) | 140 | 111 |

6902

CASE OF "X=0 AND Y≠0" OF MVD

| MVD SIGN SET INDEX | MVD SIGN SET | TEMPLATE MATCHING COST VALUE | ALLOCATED BINARY INFORMATION |
|---|---|---|---|
| 1 | (,-) | 100 | 0 |
| 2 | (,+) | 120 | 1 |

6903

CASE OF "X≠0 AND Y=0" OF MVD

| MVD SIGN SET INDEX | MVD SIGN SET | TEMPLATE MATCHING COST VALUE | ALLOCATED BINARY INFORMATION |
|---|---|---|---|
| 1 | (-,) | 100 | 0 |
| 2 | (+,) | 120 | 1 |

METHOD AND APPARATUS FOR ENCODING/DECODING IMAGE

CROSS REFERENCE TO RELATED APPLICATIONS

This application is a continuation of application Ser. No. 17/253,924 filed on Dec. 18, 2020, which is a U.S. National Stage Application of International Application No. PCT/KR2019/007328, filed on Jun. 18, 2019, which claims the benefit under 35 USC 119 (a) and 365(b) of Korean Patent Application No. 10-2018-0069604, filed on Jun. 18, 2018, Korean Patent Application No. 10-2018-0069605, filed on Jun. 18, 2018 and Korean Patent Application No. 10-2018-0069606, filed on Jun. 18, 2018, in the Korean Intellectual Property Office, the entire disclosures of which are incorporated herein by reference for all purposes.

TECHNICAL FIELD

The present invention relates to an image encoding/decoding method and apparatus, and, more particularly, to a method and apparatus for predicting a current block using a plurality of prediction blocks generated based on a plurality of prediction information.

BACKGROUND ART

Recently, the demand for multimedia data such as video is rapidly increasing on the Internet. However, it is difficult for the development speed of channel bandwidth to keep up with the rapidly increasing amount of multimedia data. Therefore, the video coding expert group (VCEG) of International Telecommunications Union-Telecommunication (ITU-T) which is an International Organization for Standardization and the moving picture expert group (MPEG) of the ISO/IEC established Version 1 of high efficiency video coding (HEVC), which is a video compression standard, on February 2014.

In HEVC, technologies such as intra prediction, inter prediction, transform, quantization, entropy encoding and in-loop filter are defined.

DISCLOSURE

Technical Problem

An object of the present invention is to provide a method and apparatus for predicting a current block using a plurality of prediction blocks generated based on a plurality of prediction information.

In addition, another object of the present invention is to provide an encoding and decoding method of deriving more accurate motion information.

In addition, another object of the present invention is to provide an efficient encoding/decoding method and apparatus of encoding information using a reconstructed region.

In addition, another object of the present invention is to provide an efficient encoding/decoding method and apparatus of motion vector difference information.

In addition, another object of the present invention is to provide a recording medium storing a bitstream generated by an image encoding method or apparatus of the present invention.

In addition, another object of the present invention is to provide a recording medium storing a bitstream decoded by an image decoding method or apparatus of the present invention.

The technical problems solved by the present invention are not limited to the above technical problems and other technical problems which are not described herein will become apparent to those skilled in the art from the following description.

Technical Solution

According to an aspect of the present invention, provided is an image decoding method including generating a first prediction block by performing inter prediction with respect to a current block, generating a second prediction block by performing intra prediction with respect to the current block, and generating a final prediction block by weighted-summing the first prediction block and the second prediction block.

In the image decoding method according to the present invention, the second prediction block may be predicted using only some of available intra prediction modes.

In the image decoding method according to the present invention, the generating of the first prediction block may include determining an initial motion vector of the current block using a motion vector of a reconstructed region, searching for the motion vector of the current block based on the initial motion vector, and generating a prediction sample of the current block using the motion vector, and the initial motion vector may include a motion vector in a past direction and a motion vector in a future direction.

In the image decoding method according to the present invention, the searching of the motion vector may include searching for the motion vector using a difference between a prediction block in a past direction indicated by the motion vector in the past direction and a prediction block in a future direction indicated by the motion vector in the future direction.

In the image decoding method according to the present invention, the searching of the motion vector may include searching for the motion vector based on prediction error generated by applying a difference between the prediction block in the past direction and the prediction block in the future direction to a sum of absolute difference (SAD) calculation method.

In the image decoding method according to the present invention, the searching of the motion vector may include searching for the motion vector in a search region having a predefined size.

In the image decoding method according to the present invention, the motion vector of the reconstructed region may be candidate motion information of a merge mode.

In the image decoding method according to the present invention, the candidate motion information of the merge mode may include at least one of motion information of spatial candidate blocks of the current block and motion information of a temporal candidate block.

The image decoding method according to the present invention may further include decoding decoder-side motion vector derivation (DMVD) mode operation information, and, when the DMVD mode operation information indicates DMVD mode operation, the motion vector of the current block may be searched based on the initial motion vector.

In the image decoding method according to the present invention, the searched motion vector may be used to derive a motion vector of a block decoded after the current block.

According to an aspect of the present invention, provided is an image encoding method including generating a first prediction block by performing inter prediction with respect to a current block, generating a second prediction block by performing intra prediction with respect to the current block, and generating a final prediction block by weighted-summing the first prediction block and the second prediction block.

In the image encoding method according to the present invention, the second prediction block may be predicted using only some of available intra prediction modes.

In the image encoding method according to the present invention, the generating of the first prediction block may include determining an initial motion vector of a current block using a motion vector of a reconstructed region, searching for an optimal motion vector of the current block based on the initial motion vector, and encoding decoder-side motion vector derivation (DMVD) mode operation information by determining whether to use the optimal motion vector, and the initial motion vector may include a motion vector in a past direction and a motion vector in a future direction.

In the image encoding method according to the present invention, the searching of the optimal motion vector may include searching for the optimal motion vector using a difference between a prediction block in a past direction indicated by the motion vector in the past direction and a prediction block in a future direction indicated by the motion vector in the future direction.

In the image encoding method according to the present invention, the searching of the optimal motion vector may include searching for the optimal motion vector based on prediction error generated by applying a difference between the prediction block in the past direction and the prediction block in the future direction to a sum of absolute difference (SAD) calculation method.

In the image encoding method according to the present invention, the searching of the optimal motion vector may include searching for the optimal motion vector in a search region having a predefined size.

In the image encoding method according to the present invention, the motion vector of the reconstructed region may be candidate motion information of a merge mode.

In the image encoding method according to the present invention, the candidate motion information of the merge mode may include at least one of motion information of spatial candidate blocks of the current block and motion information of a temporal candidate block.

In the image encoding method according to the present invention, the optimal motion vector may be used to derive a motion vector of a block decoded after the current block.

An image decoding method according to an embodiment of the present invention may include determining an initial motion vector of a current block using a motion vector of a reconstructed region, searching for the motion vector of the current block based on the initial motion vector, and generating a prediction sample of the current block using the motion vector, and the initial motion vector may include a motion vector in a past direction and a motion vector in a future direction.

In the image decoding method, the searching of the motion vector may include searching for the motion vector using a difference between a prediction block in a past direction indicated by the motion vector in the past direction and a prediction block in a future direction indicated by the motion vector in the future direction.

In the image decoding method, the searching of the motion vector may include searching for the motion vector based on prediction error generated by applying a difference between the prediction block in the past direction and the prediction block in the future direction to a sum of absolute difference (SAD) calculation method.

In the image decoding method, the searching of the motion vector may include searching for the motion vector in a search region having a predefined size.

In the image decoding method, the motion vector of the reconstructed region may be candidate motion information of a merge mode.

In the image decoding method, the candidate motion information of the merge mode may include at least one of motion information of spatial candidate blocks of the current block and motion information of a temporal candidate block.

The image decoding method may further include decoding decoder-side motion vector derivation (DMVD) mode operation information, and, when the DMVD mode operation information indicates DMVD mode operation, the motion vector of the current block may be searched based on the initial motion vector.

In the image decoding method, the searched motion vector may be used to derive a motion vector of a block decoded after the current block.

An image encoding method according to an embodiment of the present invention may include determining an initial motion vector of a current block using a motion vector of a reconstructed region, searching for an optimal motion vector of the current block based on the initial motion vector, and encoding decoder-side motion vector derivation (DMVD) mode operation information by determining whether to use the optimal motion vector, and the initial motion vector may include a motion vector in a past direction and a motion vector in a future direction.

In the image encoding method, the searching of the optimal motion vector may include searching for the optimal motion vector using a difference between a prediction block in a past direction indicated by the motion vector in the past direction and a prediction block in a future direction indicated by the motion vector in the future direction.

In the image encoding method, the searching of the optimal motion vector may include searching for the optimal motion vector based on prediction error generated by applying a difference between the prediction block in the past direction and the prediction block in the future direction to a sum of absolute difference (SAD) calculation method.

In the image encoding method, the searching of the optimal motion vector may include searching for the optimal motion vector in a search region having a predefined size.

In the image encoding method, the motion vector of the reconstructed region may be candidate motion information of a merge mode.

In the image encoding method, the candidate motion information of the merge mode may include at least one of motion information of spatial candidate blocks of the current block and motion information of a temporal candidate block.

In the image encoding method, the optimal motion vector may be used to derive a motion vector of a block decoded after the current block.

In a non-transitory computer-readable recording medium including a bitstream used for image decoding according to an embodiment of the present invention, the bitstream may include decoder-side motion vector derivation (DMVD) mode operation information, in the image encoding, a motion vector of a current block may be searched based on an initial motion vector when the DMVD mode operation information indicates DMVD mode operation, the initial motion vector may be determined using a motion vector of a reconstructed region, and the initial motion vector may include a motion vector in a past direction and a motion vector in a future direction.

An image decoding method according to another embodiment of the present invention may include deriving an initial motion vector of a current block, decoding motion vector difference information of the initial motion vector, deriving a motion vector difference of the motion vector using the motion vector difference information and deriving a final motion vector of the current block by adding the motion vector difference to the initial motion vector, and the motion vector difference information may include information on a sign set composed of any one of an X component sign and a Y component sign for the motion vector difference.

In the image decoding method, the motion vector difference information may include at least one of X component absolute value information of the motion vector difference or Y component absolute value information of the motion vector difference.

In the image decoding method, information on the sign set may indicate one of sign sets composed of any one of an X component sign and a Y component sign.

In the image decoding method, the sign sets may be allocated binary information for each sign set.

In the image decoding method, information on the sign set may be an index indicating one of sign sets composed of any one of an X component sign and a Y component sign.

In the image decoding method, the initial motion vector may be derived using a merge candidate list for the current block.

An image encoding method according to another embodiment of the present invention may include determining a final motion vector of a current block, determining a motion vector difference of the final motion vector, and encoding motion vector difference information of the motion vector difference, the motion vector difference is added to an initial motion vector of the current block and used to derive the final motion vector, and the motion vector difference information may include information on a sign set composed of any one of an X component sign and a Y component sign for the motion vector difference.

In the image encoding method, the motion vector difference information may include at least one of X component absolute value information of the motion vector difference or Y component absolute value information of the motion vector difference.

In the image encoding method, information on the sign set may indicate one of sign sets composed of any one of an X component sign and a Y component sign.

In the image encoding method, the sign sets may be allocated binary information for each sign set.

In the image encoding method, information on the sign set may be an index indicating one of sign sets composed of any one of an X component sign and a Y component sign.

In the image encoding method, the initial motion vector may be derived using a merge candidate list for the current block.

A computer-readable recording medium according to another embodiment of the present invention may store a bitstream received by an image decoding apparatus and used to reconstruct a current block included in an image, the bitstream may include initial motion vector information of the current block and motion vector difference information of the initial motion vector, the initial motion vector information may be used to derive the initial motion vector of the current block, the motion vector difference information may be used to derive a motion vector difference of the current block, a final motion vector of the current block may be derived by adding the initial motion vector and the motion vector difference, and the motion vector difference information may include information on a sign set composed of any one of an X component sign and a Y component sign for the motion vector difference.

A computer-readable recording medium according to another aspect of the present invention may store a bitstream generated by an image encoding method and/or apparatus according to the present invention.

A computer-readable recording medium according to another aspect of the present invention may store a bitstream decoded by an image decoding method and/or apparatus according to the present invention.

Advantageous Effects

According to the present invention, it is possible to provide an image encoding/decoding method and apparatus with improved compression efficiency.

According to the present invention, it is possible to provide a method and apparatus for predicting a current block using a plurality of prediction blocks generated based on a plurality of prediction information.

According to the present invention, it is possible to improve inter prediction performance by deriving more accurate motion information.

According to the present invention, it is possible to improve encoding efficiency by reducing the amount of coding information.

According to the present invention, it is possible to design an efficient parallel processing coding structure, by limiting a template region available in a reconstructed region around of a current block used upon performing motion information correction, when designing a method of correcting motion information without transmitting motion information using the same method in an image encoding/decoding apparatus.

According to the present invention, it is possible to provide an encoding/decoding method and apparatus for efficiently allocating binary information using template matching technology, and a recording medium storing a bitstream.

According to the present invention, it is possible to provide a method and apparatus for efficiently encoding/decoding motion vector difference information, and a recording medium storing a bitstream.

According to the present invention, it is possible to provide a computer-readable recording medium storing a bitstream generated by an image encoding method/apparatus.

According to the present invention, it is possible to provide a computer-readable recording medium storing a bitstream decoded by an image decoding method/apparatus.

DESCRIPTION OF DRAWINGS

FIG. 18 is a view showing a result list of an initial motion information search unit of a DMVD mode in a predictor of an image encoding/decoding apparatus.

FIG. 35 is a view illustrating a method of deriving a combined bidirectional candidate mode among candidate motion information of SKIP and MERGE modes.

FIG. 42 is a table illustrating a DMVD initial motion information search unit of a predictor of an image encoding/decoding apparatus according to an embodiment of the present invention.

FIG. 52 is a view illustrating a method of correcting motion information of a candidate motion list of SKIP and MERGE modes according to an embodiment of the present invention using a template matching mode.

FIG. 54 is a view illustrating a method of realigning motion information of a candidate motion list of SKIP and MERGE modes according to an embodiment of the present invention using a template matching mode.

FIG. 69 is a table showing a method of determining binary information using a template matching cost value when encoding motion vector difference information according to an embodiment of the present invention.

MODE FOR INVENTION

Figure 1:
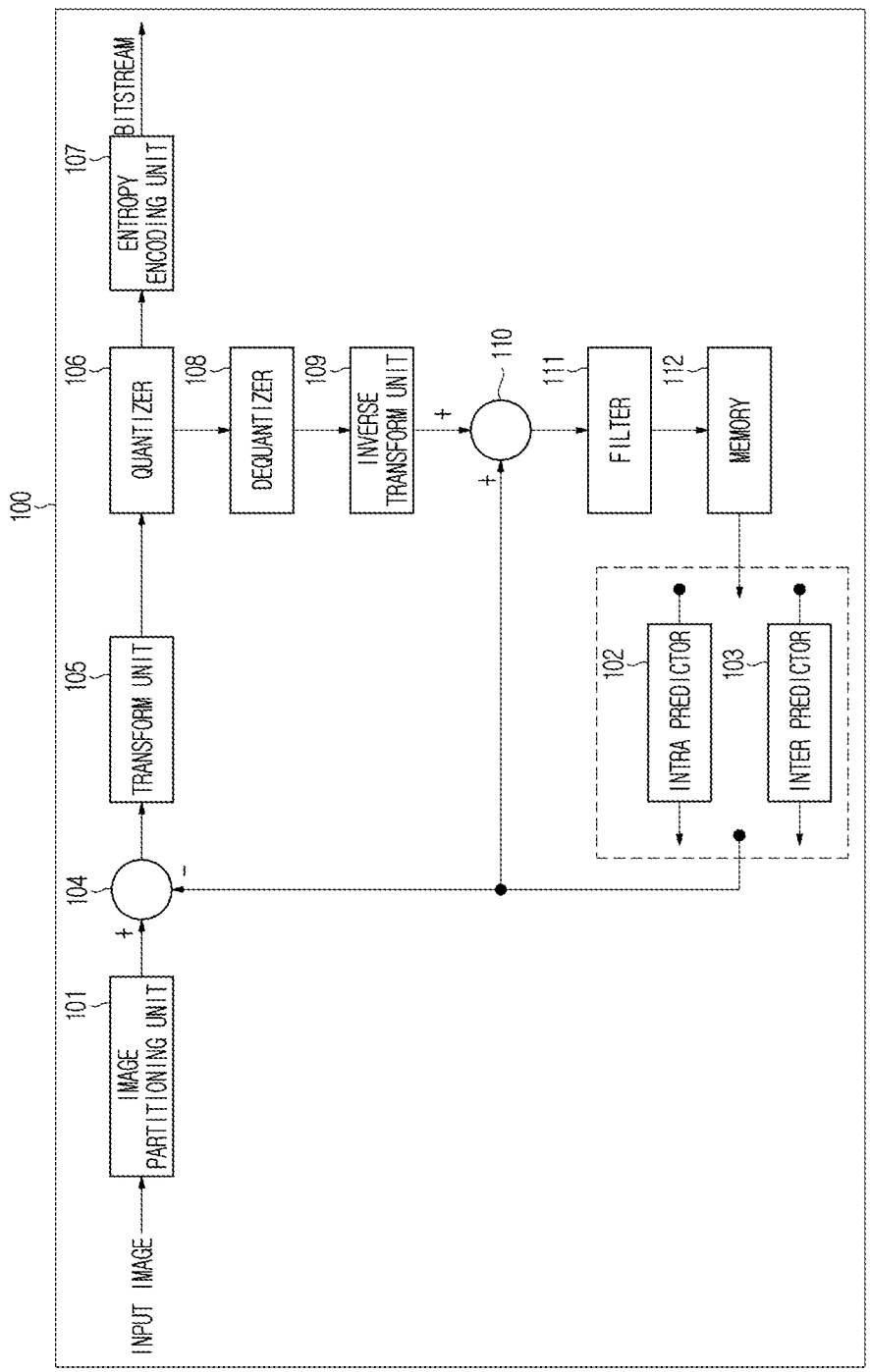
FIG. 1 is a schematic diagram showing the configuration of an image encoding apparatus 100.

Hereinafter, exemplary embodiments of the present invention will be described in detail with reference to the accompanying drawings so that those skilled in the art may easily implement the present disclosure. However, the present invention may be implemented in various different ways, and is not limited to the embodiments described therein. In the drawings, parts irrelevant to the description are omitted in order to clearly describe the present invention, and similar reference numerals are assigned to similar parts throughout the specification.

Throughout this specification, when a certain part is "connected" with another part, this includes not only a case in which the certain part is directly connected to another part but also a case in which the certain part is electrically connected with another element with the other part interposed therebetween.

In addition, when a part of the present specification "includes" a certain component, it means that other components may be further included, rather than excluding other components, unless otherwise stated.

Terms used in the specification, "first", "second", etc. can be used to describe various components, but the components are not to be construed as being limited to the terms. The terms are only used to differentiate one component from other components.

In addition, in the embodiments of the apparatus and method described in the present specification, some of the components of the apparatus or some of the steps of the method may be omitted. In addition, the order of some of the components of the apparatus or some of the steps of the method may be changed. In addition, other components or other steps may be inserted into some of the components of the apparatus or some of the steps of the method.

In addition, some components or some steps of the first embodiment of the present invention may be added to the second embodiment of the present invention or may replace some components or some steps of the second embodiment.

In addition, components shown in the embodiments of the present invention are independently shown to represent different characteristic functions, and it does not mean that each component is formed of separate hardware or a single software component. That is, each component is described by being listed as a respective component for convenience of description, and at least two of the components are combined to form one component, or one component may be divided into a plurality of components to perform a function. Integrated embodiments and separate embodiments of each of these components are also included in the scope of the present invention without departing from the essence of the present invention.

First, the terms used in this application will be briefly described.

A video decoding apparatus which will be described below may be included in a private security camera, a private security system, a military security camera, a military security system, a personal computer (PC), a laptop, a portable multimedia player (PMP), a wireless communication terminal, a smartphone, and a server terminal such as a TV application server and a service server, and may mean various apparatuses each including a user terminal such as various types of apparatuses, a communication device such as a communication modem for performing communication through a wired/wireless communication network, a memory for storing various types of programs and data for image decoding or inter or intra prediction for decoding, a microprocessor for performing operation and control by executing a program, etc.

In addition, an image encoded into a bitstream by an encoder may be transmitted to an image decoding apparatus via a wired/wireless communication network such as the Internet, a short-range wireless communication network, a wireless LAN network, a WiBro network or a mobile communication network or via various communication interfaces such as a cable or a universal serial bus (USB), decoded, reconstructed and reproduced as an image in real time or non-real-time. Alternatively, the bitstream generated by the encoder may be stored in the memory. The memory may include both a volatile memory and a nonvolatile memory. In this specification, the memory may be expressed as a recording medium storing a bitstream.

In general, a video may be composed of a series of pictures, and each picture may be divided into a coding unit such as a block. In addition, it will be understood by those of ordinary skill in the technical field, to which the present embodiment belongs, that the term picture described below may be replaced with other terms having an equivalent meaning such as an image and a frame. In addition, it will be understood by those of ordinary skill in the art that the term "coding unit" may be substituted with other terms having an equivalent meaning such as a unit block and a block.

Hereinafter, the embodiment of the present invention will be described in greater detail with reference to the accompanying drawings. In describing the present invention, a repeated description of the same component will be omitted.

FIG. 1 is a schematic diagram showing the configuration of an image encoding apparatus 100.

The image encoding apparatus 100 may encode an image and include an image partitioning unit 101, predictors 102 and 103, a transform unit 105, a quantizer 106, an entropy encoding unit 107, a dequantizer 108, an inverse transform unit 109, an adder 110, an in-loop filter 111, a memory 112 and a subtractor 104.

The image partitioning unit 101 partitions an input image from an encoding block having a maximum size (hereinafter referred to as a "maximum encoding block") to an encoding block having a minimum size (hereinafter referred to as a "minimum encoding block"). There are various methods of partitioning a block. Quadtree partitioning (hereinafter referred to as QT partitioning) refers to accurately partitioning a current encoding block in four. Binary-tree partitioning (hereinafter referred to as BT partitioning) refers to accurately partitioning an encoding block in two in a horizontal direction or a vertical direction. There are various other partitioning methods. In addition, a partitioning method simultaneously considering various partitioning methods is also possible.

The predictors 102 and 103 generate prediction blocks using neighboring pixels of a current prediction block in a current original block or pixels in a reference picture which has already been encoded/decoded. One or more prediction blocks may be generated for one encoding block. When there is one prediction block for a coding block, the prediction block may have the same shape as the coding block.

Video signal prediction technology may largely include intra prediction and inter prediction. Intra prediction refers to a method of generating a prediction block using neighboring pixels of a current block. Inter prediction refers to a method of generating a prediction block by finding a block most similar to a current block from a reference picture which has already been encoded/decoded.

When the prediction block is generated, a residual block may be generated by subtracting the prediction block from the original block. An optimal prediction mode for generating a prediction block by using various methods such as rate-distortion optimization (RDO) with respect to the generated residual block may be determined. For example, the RDO cost may be calculated as shown in Equation 1.

$$J(\emptyset,\lambda)=D(\emptyset)+\lambda R(\emptyset) \qquad \text{Equation 1}$$

In Equation 1, D, R and J denote deterioration due to quantization, the rate of a compressed stream and RD cost, respectively. In addition, ϕ denotes an encoding mode, and λ is a Lagrangian multiplier. λ is used as a scale correction coefficient for matching units between an error amount and a bit amount. For selection of an optimal encoding mode in the encoding process, J when the corresponding mode is applied, that is, the RD-cost value, should be less than when another mode is applied. As shown in Equation 1 above, the RD-cost value is calculated using both a bit rate R and error D.

Figure 2:
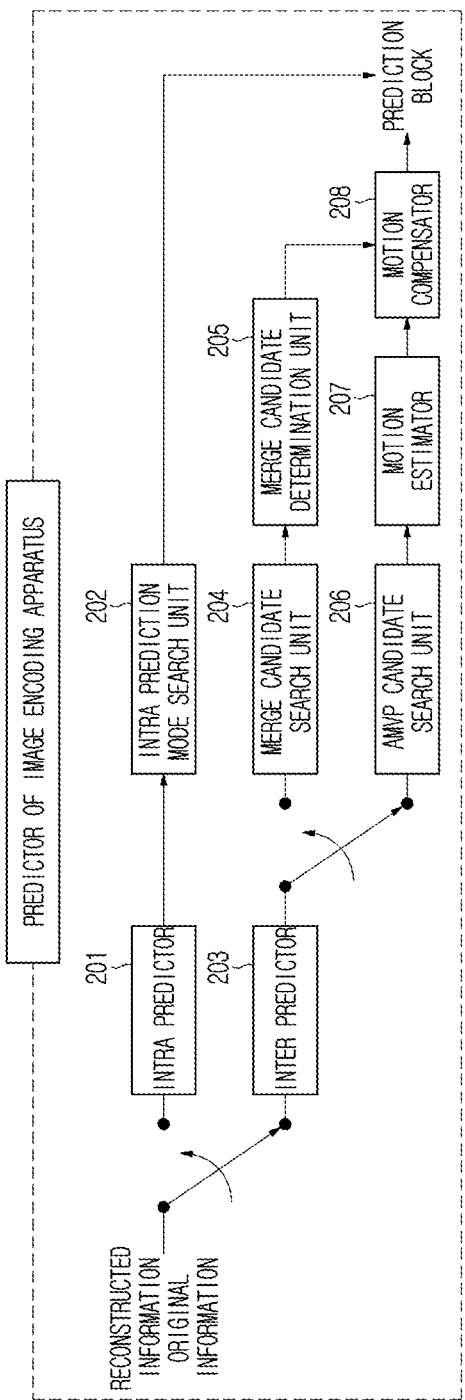
FIG. 2 is a view showing an embodiment of a predictor of an image encoding apparatus.

FIG. 2 is a view showing an embodiment of a predictor of an image encoding apparatus.

An intra predictor 201 may perform intra prediction using original information and reconstructed information. For example, selection of at least one reference pixel line from among a plurality of reference pixel lines, generation of a reference pixel, filtering of a reference pixel, generation of a prediction block using a reference pixel and/or filtering of the generated prediction block may be performed. An intra prediction mode search unit 202 may determine, for example, an optimal intra prediction mode using the RD-cost value calculated for each prediction mode and generate or select and finally output a prediction block.

An inter predictor 203 may perform inter prediction using original information and reconstructed information. The inter predictor 203 may calculate the RD-cost value with respect to each of a plurality of inter prediction modes including a SKIP mode, a MERGE mode, an AMVP mode, etc. A MERGE candidate search unit 204 configures a candidate motion information set for the SKIP mode and the MERGE mode. A MERGE candidate determination unit 205 determines, for example, optimal motion information of a candidate motion information set using the RD-cost value. An AMVP candidate search unit 206 configures a candidate motion information set for the AMVP mode. A motion estimator 207 performs motion estimation using the candidate motion information set and, for example, determines optimal motion information. A motion compensator 208 may generate a prediction block by performing motion compensation using the optimal motion information. Alternatively, the motion compensator 208 may finally select/output the prediction block which has already been generated in relation to the optimal motion information.

The above-described inter prediction mode includes three modes (SKIP mode, MERGE mode and AMVP mode). In each prediction mode, the prediction block of the current block may be generated using motion information (prediction direction information, reference picture information and motion vector). In addition, there may be an additional prediction mode using motion information.

In the case of the SKIP mode, the prediction information (e.g., optimal prediction information) of the current block may be determined using the motion information of an already reconstructed region. A motion information candidate group may be configured in the reconstructed region, and, for example, a candidate having a minimum RD-cost value of the candidate group may be used as the prediction information of the current block. A method of configuring the motion information candidate group of the SKIP mode is equal to a method of configuring a motion information candidate group of the MERGE mode which will be described below.

The MERGE mode is equal to the SKIP mode in that the prediction information (e.g., optimal prediction information) of the current block is determined using the motion information of the already reconstructed region. However, in the SKIP mode, motion information which causes prediction error to be 0 is searched in the motion information candidate group. In contrast, in the MERGE mode, motion information in which prediction error is not 0 is searched in the motion information candidate group. Therefore, the SKIP mode and the MERGE mode are different. Similarly to the SKIP mode, a motion information candidate group may be configured in the reconstructed region, and the prediction block may be generated using a candidate having a minimum RD-cost value of the candidate group as the prediction information of the current block.

Figure 3:
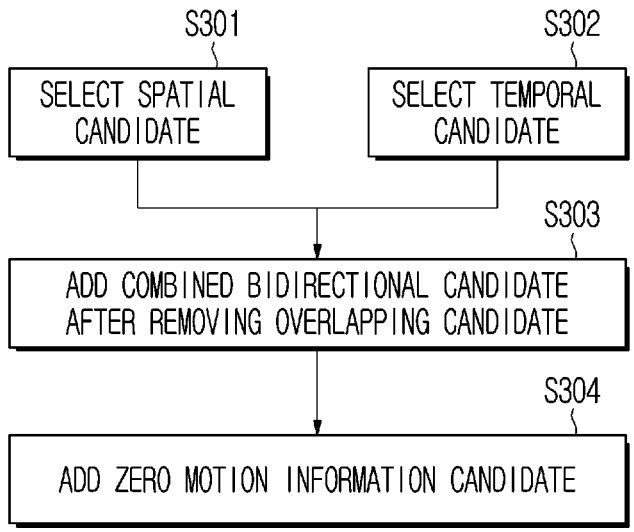
FIG. 3 is a view illustrating a method of generating a motion information candidate group in a SKIP mode or a MERGE mode.

FIG. 3 is a view illustrating a method of generating a motion information candidate group in a SKIP mode or a MERGE mode.

Figure 4:
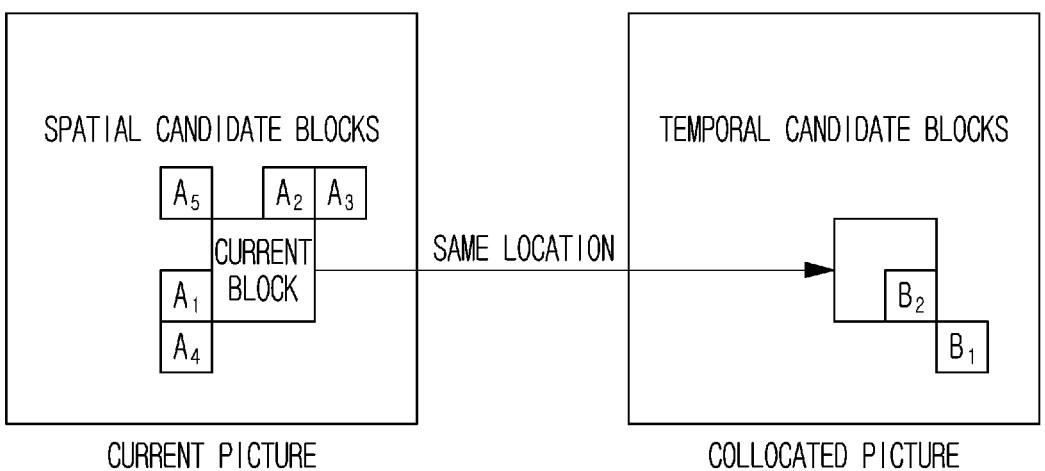
FIG. 4 is a view illustrating the location of a spatial candidate block and the location of a temporal candidate block.

FIG. 4 is a view illustrating the location of a spatial candidate block and the location of a temporal candidate block.

Figure 5:
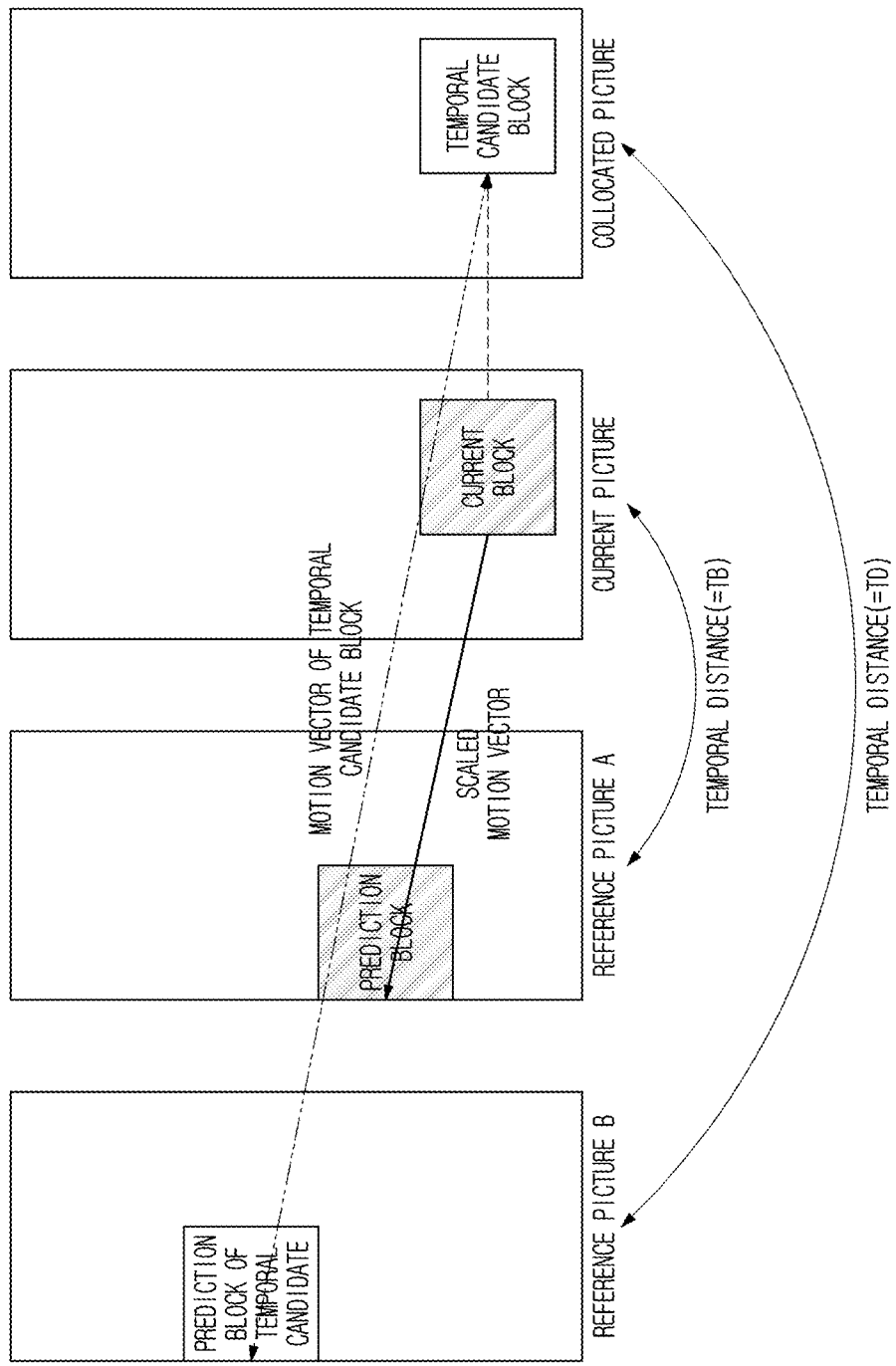
FIG. 5 is a view illustrating a method of determining motion information of a temporal candidate.

FIG. 5 is a view illustrating a method of determining motion information of a temporal candidate.

The maximum number of motion information candidate groups may be equally determined by an image encoding apparatus and an image decoding apparatus, and information on the number may be transmitted in an upper header (the upper header means parameters transmitted at a high level of a block, such as a video parameter set, a sequence parameter set, a picture parameter set, a tile header or a slice header) of the image encoding apparatus.

Only when a spatial candidate block and a temporal candidate block are encoded in an inter prediction mode in step S301 and step S302, motion information derived using the motion information may be included in the motion information candidate group.

In step S301, the spatial candidate may be selected from the neighbor of the current block in the same picture. For example, 4 out of 5 spatial candidate blocks may be selected as spatial candidates. The locations of the spatial candidate blocks may be, for example, locations $A_1$ to $A_5$ shown in FIG. 4. However, the number and location of spatial candidate blocks are not limited thereto, and change to any block within the reconstructed region is possible. The spatial candidates may be considered in order of $A_1$, $A_2$, $A_3$, $A_4$ and $A_5$ and the motion information of the spatial candidate block which may be first used may be determined as the spatial candidate. However, the order of consideration of the plurality of candidates is not limited to the above order. If the motion information of the plurality of spatial candidates overlap, only the motion information of a candidate having high priority may be considered.

In step S302, a temporal candidate may be selected within a picture encoded/decoded before a current picture. For example, one of two temporal candidate blocks in a collocated picture may be selected as a temporal candidate. The locations of the temporal candidate blocks may be $B_1$ and $B_2$ shown in FIG. 4. The location of each candidate may be determined based on the block at the same location as the current block of the current picture within the picture. Here, the collocated picture may be set under the same condition in the image encoding apparatus and the image decoding apparatus. For example, a reference picture corresponding to a predetermined reference picture index may be selected as a collocated picture. Alternatively, index information indicating the collocated picture may be signaled. The temporal candidates may be considered in order of blocks $B_1$ and $B_2$, and the motion information of the candidate blocks which may be first used may be determined as the temporal candidate. However, the number, location and order of consideration of temporal candidate blocks are not limited to the above-described embodiment.

As shown in FIGS. 4 and 5, for example, the motion information of the candidate block $B_1$ or $B_2$ in the collocated picture may indicate a prediction block in a reference picture B. The reference pictures of the candidate blocks may be different from each other, but may be referred to as reference pictures B for convenience in the present description. The motion vector may be scaled using a ratio of a distance TD between the collocated picture and the reference picture B and a distance TB between the current picture and the reference picture A, thereby being determined as the motion vector of the temporal candidate. For example, the scaling may be performed using Equation 2 below.

$$MV_{scale} = \left(\left(\left(TB \times \frac{2^{14} + (TD \gg 1)}{TD} + 2^5\right) \gg 6\right) \times MV + (2^7 - 1)\right) \gg 2^3 \quad \text{Equation 2}$$

MV denotes the motion vector of the motion information of the temporal candidate block, $MV_{scale}$ denotes a scaled motion vector, TB denotes a temporal distance between the collocated picture and the reference picture B, and TD denotes a temporal distance between the current picture and the reference picture A. At this time, the reference picture A and the reference picture B may be the same reference picture. The scaled motion vector may be determined as the motion vector of the temporal candidate. In addition, the reference picture information of the temporal candidate motion information may be determined as the reference picture of the current picture, thereby deriving the motion information of the temporal candidate.

Step S303 may be performed only when the number of motion information candidates derived in steps 301 and S302 is less than a maximum number. In step S303, overlapping candidates may be removed. In addition, a new bidirectional motion information candidate may be added by a combination of the motion information candidates derived in steps S301 and S302. The bidirectional motion information candidate means a new candidate derived by selecting and combining motion information previously derived in the past or future direction one by one.

Table 1 below shows the priorities of bidirectional motion information candidate combinations. However, Table 1 shows an example, and there may be combinations different from Table 1.

TABLE 1

| Order of construction | 0 | 1 | 2 | 3 | 4 | 5 | 6 | 7 | 8 | 9 | 10 | 11 |
|---|---|---|---|---|---|---|---|---|---|---|---|---|
| Candidate index (past) | 0 | 1 | 0 | 2 | 1 | 2 | 0 | 3 | 1 | 3 | 2 | 3 |
| Candidate index (future) | 1 | 0 | 2 | 0 | 2 | 1 | 3 | 0 | 3 | 1 | 3 | 2 |

When the maximum number of motion information candidates is not satisfied even it the bidirectional motion information candidates are used, step S304 is performed. In step S304, the motion vector of the motion information candidate may be fixed to a zero motion vector and the maximum number of motion information candidates may be satisfied by changing the reference picture according to the prediction direction. In the AMVP mode, the motion information (e.g., optimal motion information) of the current block may be determined through motion estimation for each reference picture according to the prediction direction. Here, the prediction direction may be a unidirection which uses one of the past and future directions or bidirection which use both the past and future directions. The prediction block is generated by performing motion compensation using the motion information determined through motion estimation. Here, a motion information candidate group for motion estimation is derived for each reference picture according to the prediction direction. The motion information candidate group is used as a starting point of motion estimation.

A method of deriving a motion information candidate group for motion estimation of the AMVP mode is partially similar to the method described with reference to FIG. 3. The maximum number of motion information candidates of the AMVP mode may be equally determined by the image encoding apparatus and the image decoding apparatus, and information on the number may be transmitted at a higher level of the block. Even in the AMVP mode, only when the spatial candidate blocks and the temporal candidate blocks are encoded in the inter prediction mode, the motion information derived using the motion information may be included in the motion information candidate group.

In the case of the AMVP mode, the number of spatial candidate blocks may be 2 and priority of selection of a spatial candidate may be different from that of the MERGE mode. However, the remaining description may be equal to the description of step S301. In addition, the temporal candidate of the AMVP mode may be derived in the same manner as described in step S306.

In the case of the AMVP mode, when there is overlapping information among the candidates derived so far, this may be removed. In addition, when the number of derived candidates is less than the maximum number of candidates, zero motion information candidates may be added as in step S308.

One of the motion information candidates derived as described above may be selected. For example, a motion information candidate having a minimum RD-cost value may be selected as an optimal motion information candidate and the optimal motion information of the AMVP mode may be obtained through a motion estimation process based on the motion information.

Figure 6:
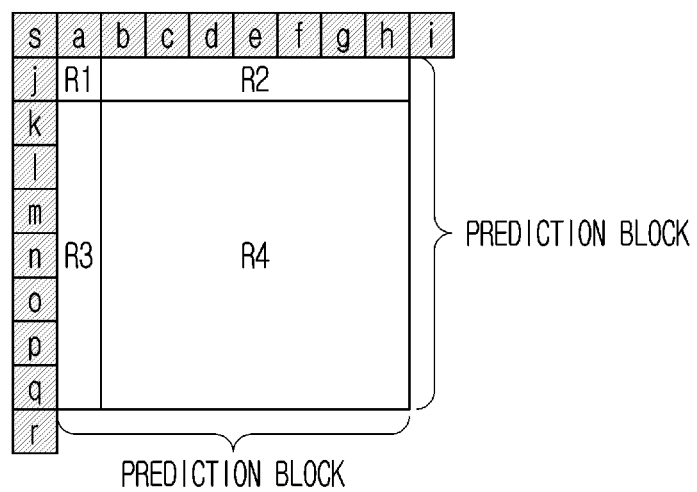
FIG. 6 is a view illustrating a method of generating an intra prediction block according to a DC mode.

FIG. 6 is a view illustrating a method of generating an intra prediction block according to a DC mode.

The intra prediction mode may include a total of (N+2) prediction modes including a Planar mode, a DC mode and N directional modes (Angular mode or directional mode). In the case of the DC mode, regions R1 to R4 configuring a current block may be predicted using different methods. For example, an average value of a reference pixel a to a preference pixel s may be calculated and applied to all prediction pixels of regions R1 to R4. Thereafter, for the region R1, a final prediction block may be generated through FIR filtering using two adjacent reference pixels a and j. In addition, for regions R2 and R3, a final prediction block may be generated through FIR filtering with one adjacent reference pixel (one of b to h or k to q).

Figure 7:
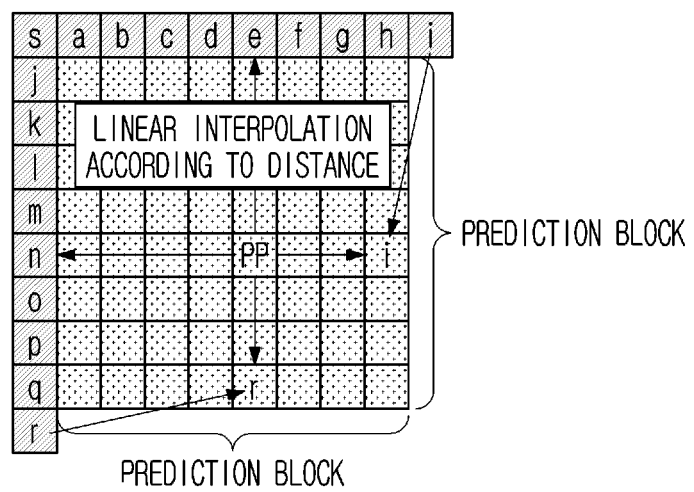
FIG. 7 is a view illustrating a method of generating an intra prediction block according to a Planar mode.

FIG. 7 is a view illustrating a method of generating an intra prediction block according to a Planar mode.

In the Planar mode, a final prediction block is generated using a linear interpolation method between reference pixels at the top and left locations and copied reference pixels corresponding to bottom and right locations for each prediction pixel location.

Figure 8:
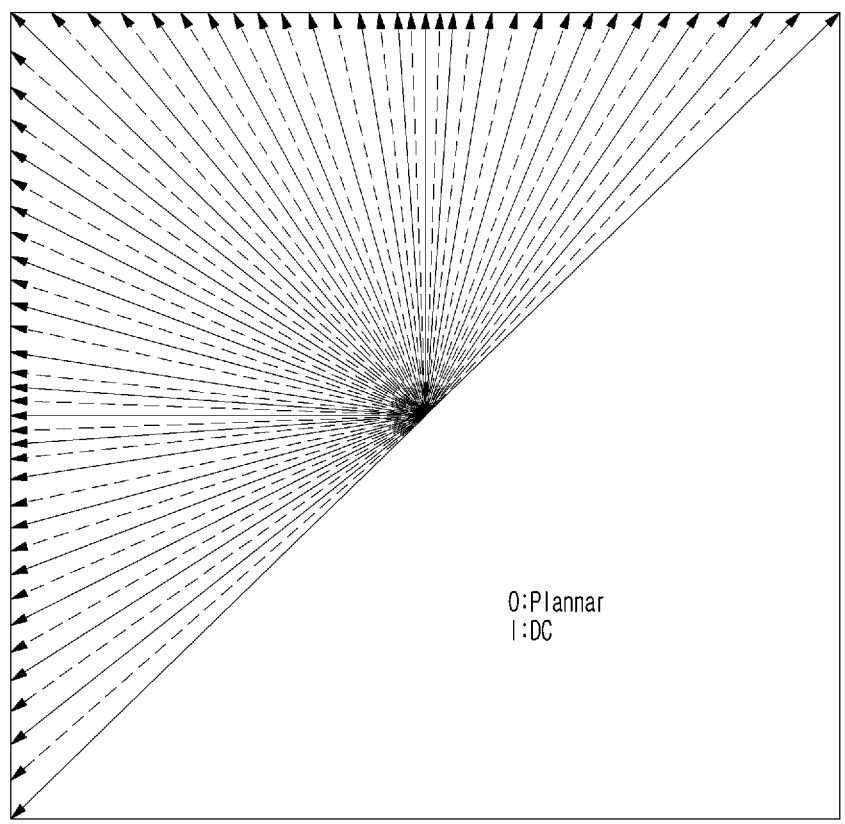
FIG. 8 is a view showing N directional prediction modes.

FIG. 8 is a view showing N directional prediction modes.

In the directional prediction mode, a final prediction block is generated by applying values of adjacent reference pixels to the prediction block for each prediction direction.

For efficient encoding/decoding of the intra prediction mode, a most probable mode (MPM) may be used. At this time, in order to configure the MPM candidate mode list of the current block, a candidate mode may be derived from the spatial candidate blocks around the current block. At this time, available spatial candidate blocks may be equal to the spatial candidate blocks of FIG. 4. However, the present invention is not limited thereto and the number and/or location of spatial candidate blocks may vary.

Figure 9:
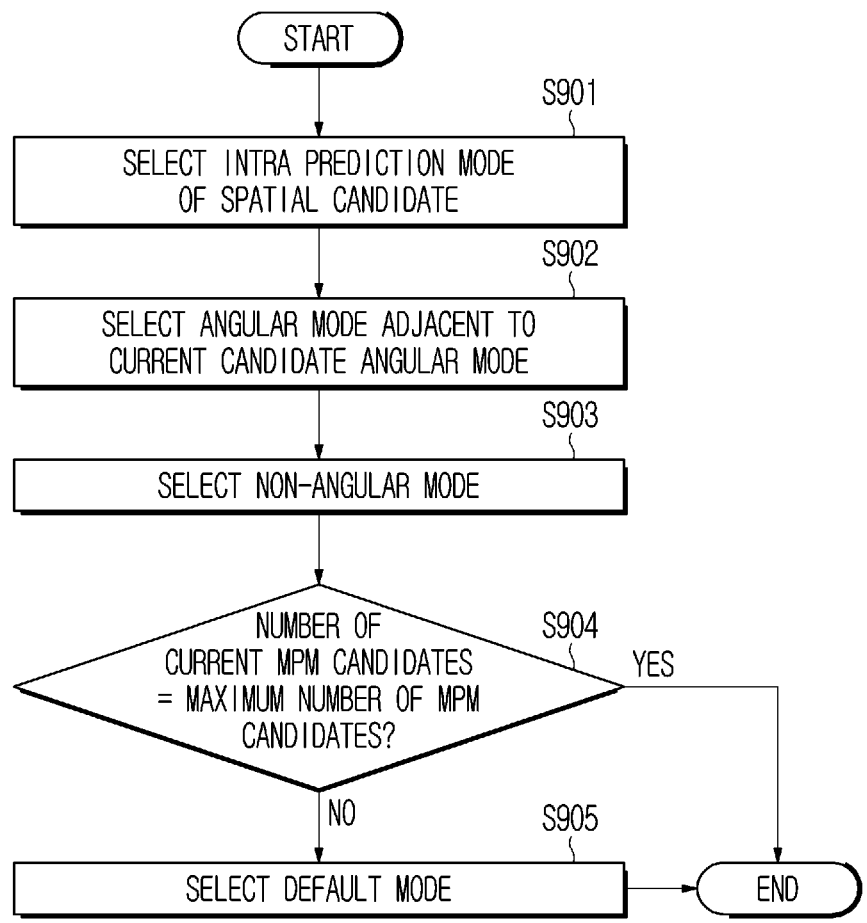
FIG. 9 is a view illustrating a method of configuring an MPM candidate mode list.

FIG. 9 is a view illustrating a method of configuring an MPM candidate mode list.

In step S901, reconstructed intra prediction modes of spatial candidate blocks are first derived as MPM candidate modes. In order of blocks $A_1$, $A_2$, $A_3$, $A_4$ and $A_5$, the intra prediction mode of each block may be an MPM candidate mode. Among them, candidate blocks which are not reconstructed in the intra prediction mode may be excluded. In addition, the priorities of the spatial candidate blocks may also vary as described above.

In step S902, an angular mode immediately adjacent to the angular mode is added as an MPM candidate mode in order of priority of the intra prediction modes derived in step S901. For example, when angular mode 4 and angular mode 11 are candidate modes in step S901, angular modes 3 and 5 adjacent to angular mode 4 and angular mode 10 and 12 adjacent to angular mode 11 may be added as MPM candidate modes.

In step S903, a non-angular mode may be added as an MPM candidate mode.

In step S904, it is determined whether the number of current MPM candidate modes is greater than or equal to a maximum number of MPM candidate modes. When the number of current MPM candidate modes is less than the maximum number of MPM candidate modes in step S904, an MPM candidate mode list may be configured by adding a default candidate mode until the maximum number of MPM candidate modes. At this time, the default candidate mode may include any intra prediction mode such as a vertical mode, a horizontal mode, a DC mode and a Planar mode. The priorities of the default candidate modes are not limited to the above order and may be changed. When the number of current MPM candidate modes is greater than or equal to the maximum number of MPM candidate modes, the MPM candidate mode list may be configured using the MPM candidate modes corresponding to the maximum number of MPM candidate modes in order of priority.

The transform unit 105 generates a transform block by transforming a residual block which is a difference between the original block and the prediction block. The transform block is a smallest unit used for a transform and quantization process. The transform unit 105 generates a transform block having a transform coefficient by transforming the residual signal from a spatial domain to a frequency domain. Here, as a method of transforming the residual signal into the frequency domain, various transform schemes such as discrete cosine transform (DCT), discrete sine transform (DST) or Karhunen Loeve Transform (KLT) may be used. By transform, the residual signal is transformed into the frequency domain, thereby generating a transform coefficient. In order to conveniently use a transform scheme, matrix operation is performed using a basis vector. Depending on in which prediction mode the prediction block is encoded, transform schemes may be variously mixed and used during matrix operation. For example, during intra prediction, discrete cosine transform may be used in the horizontal direction and discrete sine transform may be used in the vertical direction according to the prediction mode. Alternatively, different transform schemes may be used in the horizontal direction and the vertical direction according to the aspect ratio, size (one or both of the width and the height), shape, prediction mode (inter prediction or intra prediction) and inter prediction mode of the current block.

The quantizer 106 generates a quantized transform block by quantizing the transform block. That is, the quantizer generates a quantized transform block (Quantized Transform Coefficient) having a quantized transform coefficient by quantizing transform coefficients of the transform block generated by the transform unit 105. As a quantization method, a dead zone uniform threshold quantization (DZUTQ), quantization weighted matrix, etc. may be used. However, the present invention is not limited to the above example and, for example, various quantization methods obtained by improving the above quantization method may be used.

In the above description, the image encoding apparatus include the transform unit and the quantizer. However, the image encoding apparatus may optionally include the transform unit and/or the quantizer. That is, the image encoding apparatus may transmit the residual block and generate a transform block, but may not perform a quantization process. Alternatively, the image encoding apparatus may perform only quantization without transforming the residual block. Alternatively, the image encoding apparatus may not perform both transform and quantization. In the image encoding apparatus, although one of the transform unit and the quantizer may be performed or both processes are not performed, a block input to the entropy encoding unit 107 is generally referred to as a "quantized transform block".

The entropy encoding unit 107 encodes the quantized transform block and outputs a bitstream. That is, the entropy encoding unit encodes the coefficients of the quantized transform block output from the quantizer using various encoding methods such as entropy encoding and generates and outputs a bitstream including additional information (e.g., information on the prediction mode (the information on the prediction mode may include information indicating intra prediction or inter prediction, motion information, intra prediction mode information, etc.) necessary to decode the block in the image decoding apparatus.

The dequantizer 108 reconstructs a dequantized transform block by inversely performing the quantization method used upon quantization with respect to the quantized transform block.

The inverse transform unit 109 reconstructs the residual block by inversely transforming the dequantized transform block using the same method as the method used upon transform, and performs inverse transform by inversely performing the transform method used in the transform unit.

As described above, the dequantizer and the inverse transform unit may perform dequantization and inverse transform by inversely using the quantization method and the transform method used in the quantizer and the transform unit. In addition, when only quantization is performed but transform is not performed in the encoding step, only dequantization may be performed but inverse transform may not be performed in the reconstruction step. If both transform and quantization are not performed in the encoding step, both inverse transform and dequantization may not be performed in the decoding step. Alternatively, information on the block is not included in the image encoding apparatus and may be omitted.

The adder 110 reconstructs the current block by adding the residual signal generated by the inverse transform unit and the prediction block generated through prediction.

The filter 111 performs additional filtering, such as deblocking filtering or sample adaptive offset (SAO), with respect to the entire picture after all blocks in the current picture are reconstructed. Deblocking filtering reduces block distortion occurring when an image is encoded in block units. SAO refers to operation of minimizing a difference between a reconstructed image and an original image, by subtracting or adding a specific value from or to the reconstructed pixel.

The memory 112 may store the current block reconstructed through additional filtering by the in-loop filter after adding the residual signal generated by the inverse transform unit and the prediction block generated through prediction, and may be used to predict a next block or a next picture.

The subtractor 104 generates a residual block by subtracting the prediction block from the current original block.

Figure 10:
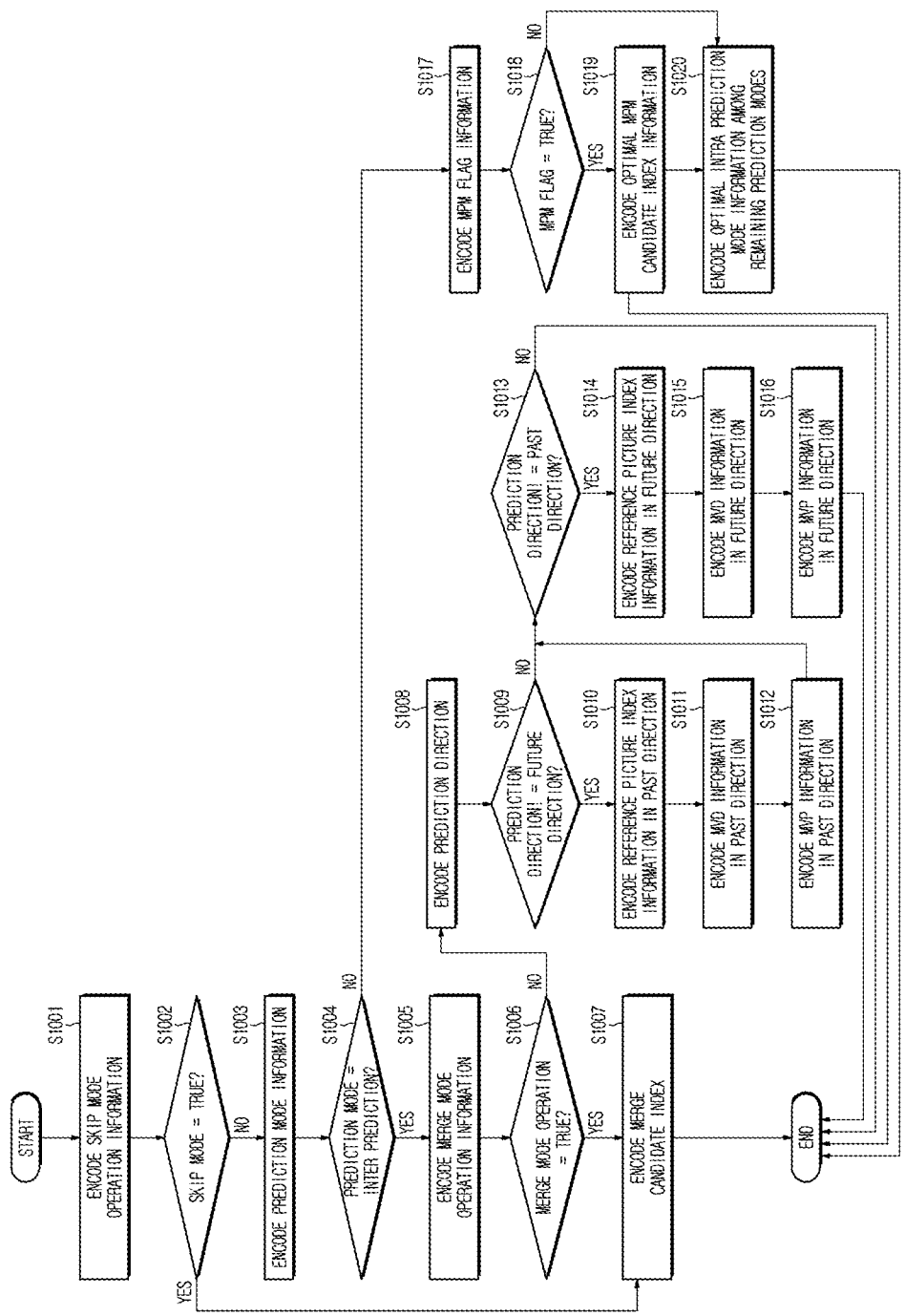
FIG. 10 is a view illustrating an embodiment of encoding coding information in an image encoding apparatus.

FIG. 10 is a view illustrating an embodiment of encoding coding information in an image encoding apparatus.

In step S1001, operation information of the SKIP mode is encoded. Prediction of the current block in the SKIP mode uses a Merge mode, and the decoding apparatus uses the prediction block of the current block as a reconstructed block. In step S1002 of inter prediction, it is determined whether the SKIP mode operates. When the SKIP mode operates in step S1002 (Yes), MERGE candidate index information for the SKIP mode is encoded in step S1007 and then this flow is finished. When the SKIP mode does not operate in step S1002 (No), a prediction mode is encoded in step S1003. In step S1004, it is determined whether the prediction mode is an inter prediction mode or intra prediction mode. When the prediction mode is an inter prediction mode in step S1004 (Yes), operation mode of the MERGE mode is encoded in step S1005. In step S1006, it is determined whether the MERGE mode operates. When the MERGE mode operates in step S1006 (Yes), MERGE candidate index information for the MERGE mode is encoded in step S1007 and then this flow is finished. When the MERGE mode does not operate in step S1006 (No), a prediction direction is encoded in step S1008. Here, the prediction direction may be one of a past direction, a future direction and both directions. In step S1009, it is determined whether the prediction direction is a future direction. When the prediction direction is not a future direction in step S1009 (Yes), reference picture index information in the past direction is encoded in step S1010. In step S1011, motion vector difference (MVD) information in the past direction is encoded. In step S1012, motion vector predictor (MVP) information in the past direction is encoded. When the prediction direction is a future direction or both directions in step S1009 (No) or when step S1012 is finished, it is determined whether the prediction direction is a past direction in step S1013. When the prediction direction is not a past direction in step S1013 (Yes), reference picture index information in a future direction is encoded in step S1014. In step S1015, MVD information in the future direction is encoded. In step S1016, MVP information in the future direction is encoded and then this flow is finished.

When the prediction mode is an intra prediction mode in step S1004 (No), most probable mode (MPM) operation information is encoded in step S1017. The MPM refers to a method of configuring an MPM candidate intra prediction mode using a reconstructed intra prediction mode around a current block and then transmitting MPM candidate intra prediction mode index information when optimal intra prediction mode information of the current block determined in the image encoding apparatus is present in the MPM candidate intra prediction mode. In step S1018, it is determined whether the MPM operates. The MPM refers to a mode in which index information is encoded when there is a mode identical to the prediction mode of the current block among the prediction modes of the reconstructed blocks around the current block. When operation of the MPM is true in step S1018 (Yes), index information of the MPM intra prediction mode is encoded in step S1019. When operation of the MPM is false in step S1018 (No), optimal intra prediction mode information of Luma among the remaining intra prediction modes except for the MPM candidate intra prediction mode is encoded in step S1020.

After steps S1019 and S1020 are finished, optimal intra prediction mode information of Chroma is encoded and the this flow may end. Here, a module for performing steps S1008 to S1016 may be referred to as a motion information encoding unit. In addition, a module for performing steps S1017 to S1020 may be referred to as a luma intra prediction mode encoding unit.

Figure 11:
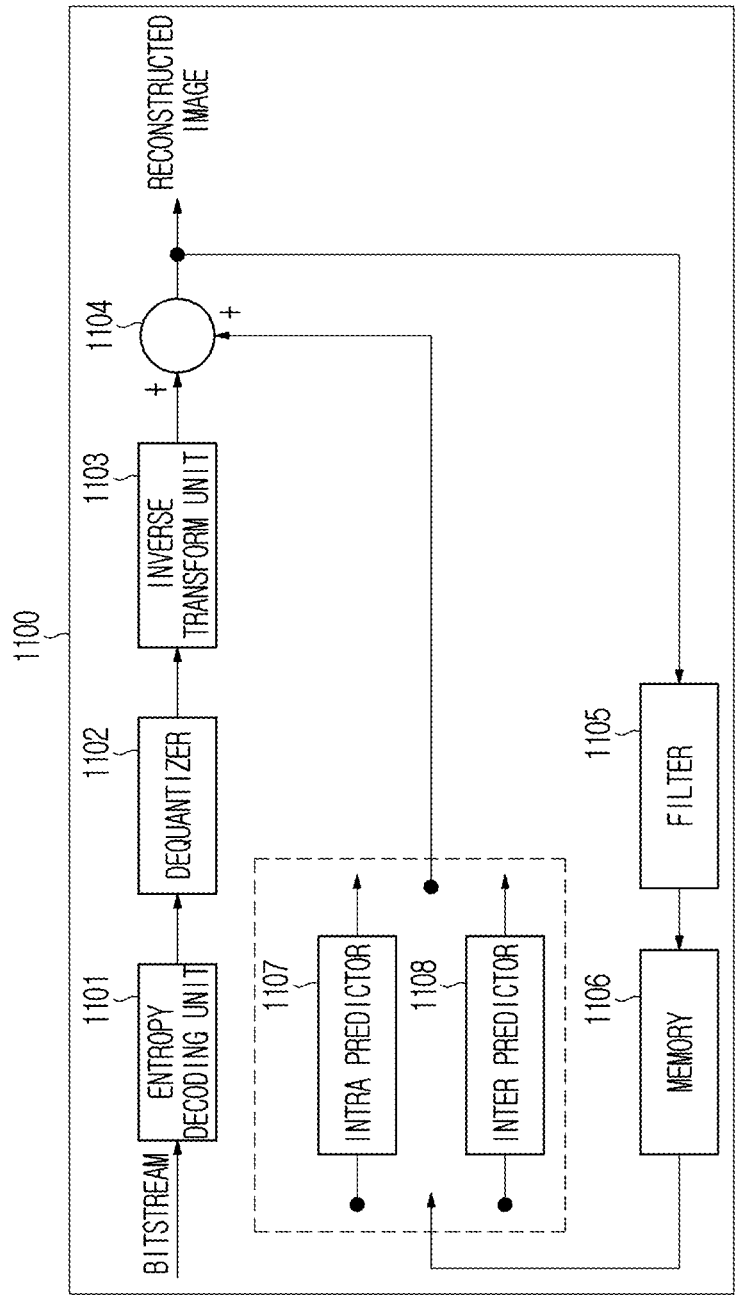
FIG. 11 is a view illustrating the configuration of an image decoding apparatus according to the present invention.

FIG. 11 is a view illustrating the configuration of an image decoding apparatus according to the present invention.

The image decoding apparatus decodes an image and may include an entropy decoding unit, a dequantizer, an inverse transform unit, a predictor, an adder, an in-loop filter and a memory. An encoding block in the image encoding apparatus may correspond to a decoding block in the image decoding apparatus.

The entropy encoding unit 1101 may analyze a bitstream received from the image encoding apparatus and reconstruct various pieces of information necessary to decode the block and a quantized transform coefficient.

The dequantizer 1102 inversely performs a quantization method used upon quantization with respect to the decoded quantization coefficient decoded by the entropy decoding unit and reconstructs the dequantized block having the dequantized coefficient.

The inverse transform unit 1103 inversely transforms the dequantized transform block using the same method as the method used upon transform to reconstruct a residual block having a difference signal, and performs inverse transform by inversely performing the transform scheme used in the transform unit.

The predictors 1107 and 1108 generate prediction blocks using prediction mode information decoded by the entropy decoding unit. The same method as the prediction method performed in the predictor of the image encoding apparatus is used.

The adder 1104 reconstructs the current block by adding the residual signal reconstructed by the inverse transform unit and the prediction block generated through prediction.

The filter 1105 performs filtering over the entire picture after all blocks in the current picture are reconstructed. Filtering may include deblocking filtering, sample adaptive offset (SAO), etc. A detailed description thereof is equal to the description of the filter 111 of the image encoding apparatus.

The memory 1106 may store the current block reconstructed through additional filtering by the in-loop filter after adding the residual signal generated by the inverse transform unit and the prediction block generated through prediction, and may be used to predict a next block or a next picture.

Figure 12:
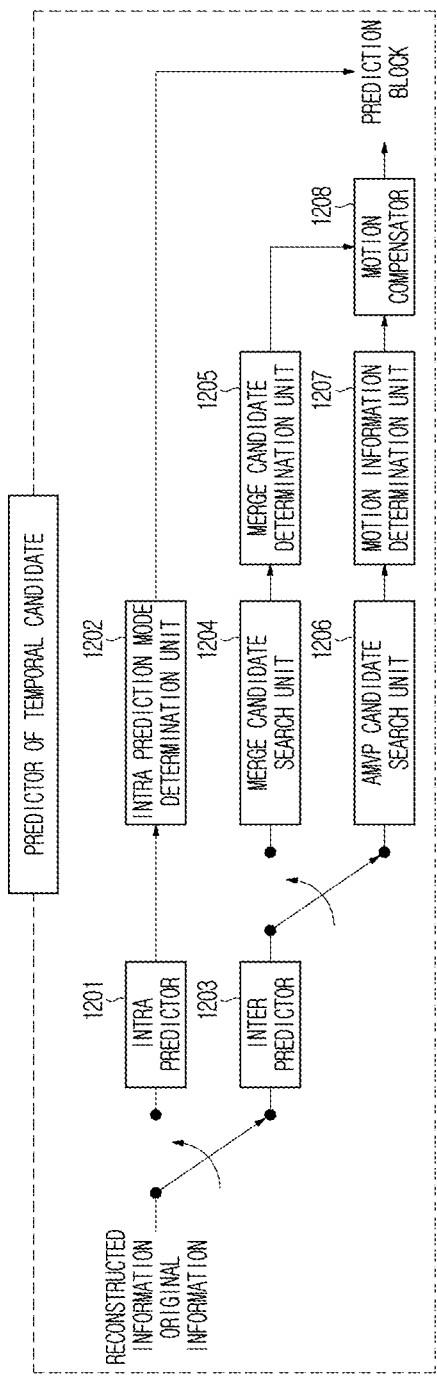
FIG. 12 is a view illustrating a predictor of an image decoding apparatus.

FIG. 12 is a view illustrating a predictor of an image decoding apparatus.

If the prediction mode in an intra predictor 1201 is intra prediction, an intra prediction mode determination unit 1202 determines intra prediction mode information and performs intra prediction, thereby generating a prediction block.

If the prediction mode in an inter predictor 1203 is inter prediction, the prediction mode of the current block among the SKIP, MERGE and AMVP modes is reconstructed. In the case of the SKIP mode or the MERGE mode, a MERGE candidate search unit 1204 configures candidate motion information sets for the SKIP mode and the MERGE mode. A MERGE candidate determination unit 1205 determines motion information of the current block among the candidate motion information sets. In the case of the AMVP mode, an AMVP candidate search unit 1206 configures candidate motion information sets for the AMVP mode. A motion information determination unit 1207 determines the motion information of the current block using the transmitted MVP information among the candidate motion information sets. Thereafter, a motion compensator 1208 performs motion compensation using the motion information of the current block determined in each mode, thereby generating a prediction block.

Figure 13:
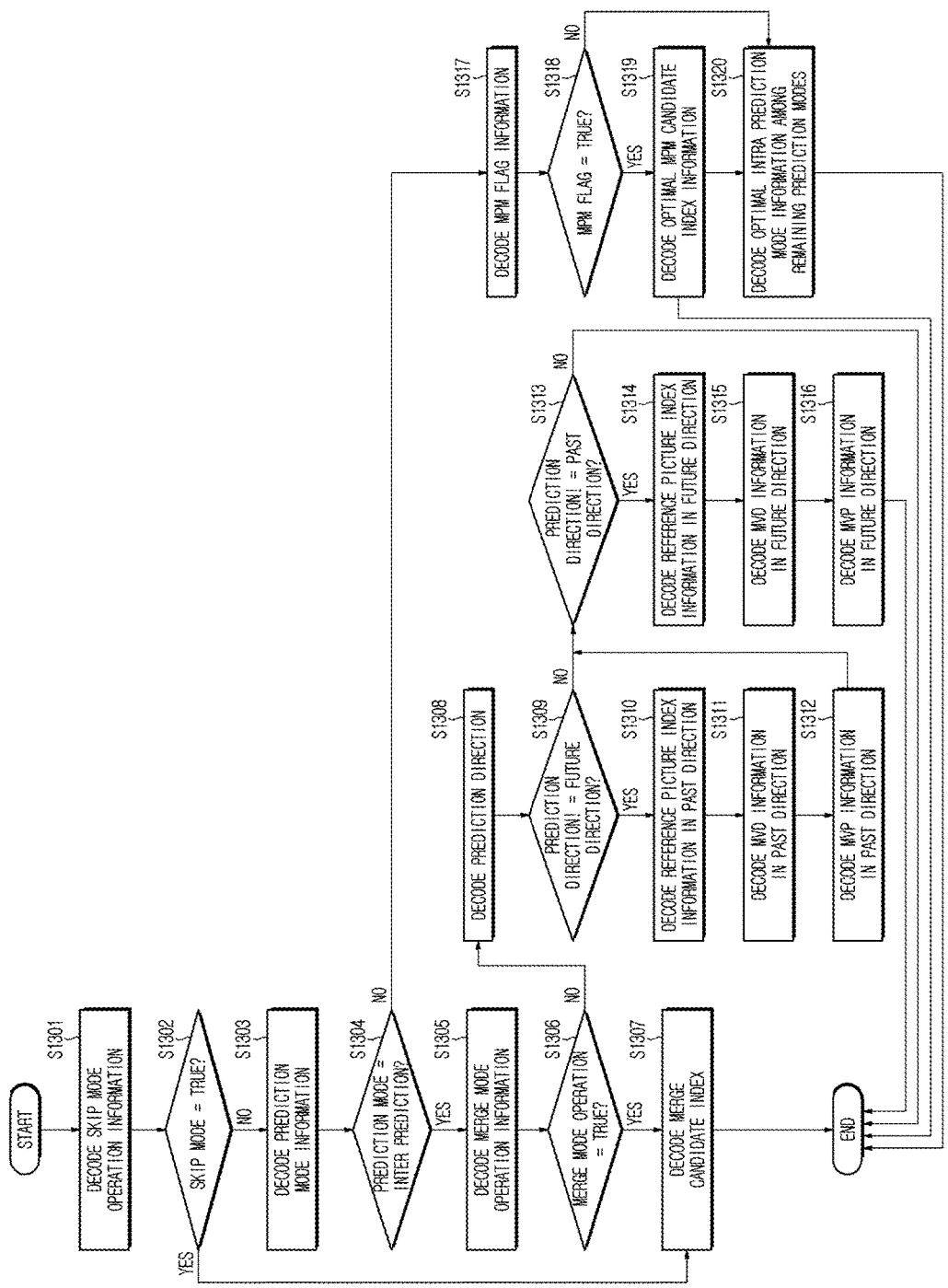
FIG. 13 is a view illustrating an embodiment of decoding coding information in an image decoding apparatus.

FIG. 13 is a view illustrating an embodiment of decoding coding information in an image decoding apparatus.

In step S1301, operation information of the SKIP mode is decoded. In step S1302, it is determined whether the SKIP mode operates. When the SKIP mode operates in step S1302 (Yes), MERGE candidate index information for the SKIP mode is encoded in step S1307 and then this flow is finished. When the SKIP mode does not operate in step S1302 (No), the prediction mode is decoded in step S1303. In step S1304, it is determined whether the prediction mode is an inter prediction or intra prediction mode. When the prediction mode is an inter prediction mode in step S1304 (Yes), operation information of the MERGE mode is decoded in step S1305. In step S1306, it is determined whether the MERGE mode operates. When the MERGE mode operates in step S1306 (Yes), MERGE candidate index information for the MERGE mode is decoded in step S1307 and then this flow is finished. When the MERGE mode does not operate in step S1306 (No), a prediction direction is decoded in step S1308. Here, the prediction direction may be one of a past direction, a future direction and both directions. In step S1309, it is determined whether the prediction direction is a future direction. When the prediction direction is not a future direction in step S1309 (Yes), reference picture index information in the past direction is decoded in step S1310. In step S1311, motion vector difference (MVD) information in the past direction is decoded. In step S1312, motion vector predictor (MVP) information in the past direction is decoded. When the prediction direction is a future direction or both directions in step S1309 (No) or when step S1312 is finished, it is determined whether the prediction direction is a past direction in step S1313. When the prediction direction is not a past direction in step S1313 (Yes), reference picture index information in the future direction is decoded in step S1314. In step S1315, MVD information in the future direction is decoded. In step S1316, MVP information in the future direction is decoded and then this flow is finished. When the prediction mode is an intra prediction mode in step S1304 (No), MPM operation information id decoded in step S1317. In step S1318, it is determined whether the MPM operates. When MPM operation is true in step S1318 (Yes), index information of the MPM candidate intra prediction mode is decoded in step S1319. When MPM operation is false in step S1318 (No), optimal intra prediction mode information of Luma among the remaining intra prediction modes except for the MPM candidate intra prediction mode is decoded in step S1320. After steps S1319 and S1320 are finished, optimal intra prediction mode information of Chroma may be decoded and then this flow may be finished. Here, a module for performing steps S1308 to S1316 may be referred to as a motion information decoding unit. In addition, a module for performing steps S1317 to S1320 may be referred to as a luma intra prediction mode decoding unit.

Hereinafter, an embodiment of generating a weighted-sum prediction block by weighted-summing prediction blocks generated using two or more pieces of prediction information will be described. FIGS. 14 to 17 commonly correspond to the below-described embodiments.

Figure 14:
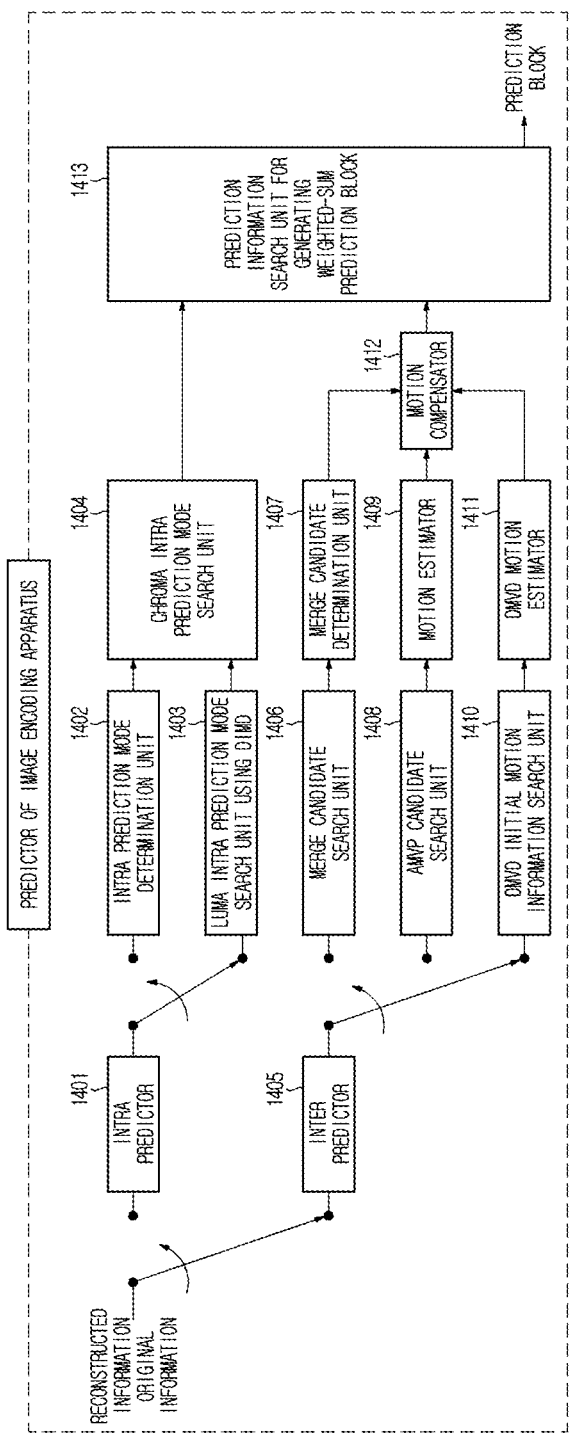
FIG. 14 is a view illustrating a predictor of an image encoding apparatus.

FIG. 14 is a view illustrating a predictor of an image encoding apparatus.

An intra predictor 1401 may perform intra prediction using original information and reconstructed information. Whether an intra prediction mode is determined using a DIMD mode is determined using an RD-cost value. When the DIMD mode is not used, a luma intra prediction mode search unit 1402 may determine an intra prediction mode which is optimal for a luma block among intra prediction modes using the RD-cost value. When the DIMD mode is used, a luma intra prediction mode search unit 1403 using the DIMD may set a template region in the reconstructed region around the current block, search for a luma intra prediction mode which is optimal for the template region using the reconstructed pixels around the template region, and determine the intra prediction mode which is optimal for the template region as an optimal luma intra prediction mode of the current block. Thereafter, a chroma intra prediction mode search unit 1404 may search for an intra prediction mode which is optimal for a chroma block using the RD-cost value.

An inter predictor 1405 may perform inter prediction using original information and reconstructed information. For the SKIP mode, the MERGE mode, the AMVP mode and the DMVD mode, the RD-cost value may be calculated and an optimal prediction mode may be determined. Description of reference numerals 1406 to 1409 is equal to description of reference numerals 204 to 207 of FIG. 2. A DMVD initial motion information search unit 1410 may derive initial motion information for the DMVD mode using an inter prediction mode of a reconstructed block around a current block and in a reference picture. A DMVD motion estimator 1411 may perform DMVD motion estimation using the derived initial motion information, thereby determining optimal motion information. A motion compensator 1412 may perform motion compensation using the optimal motion information determined in each mode, thereby generating a prediction block. Here, the motion information may include at least one of a motion vector, a reference picture index or prediction direction information.

A prediction information search unit 1413 for generating weighted-sum prediction block may search for additional prediction information (hereinafter referred to as "N-th prediction information", N being is an integer of 1 or more) for weighted-sum in addition to optimal prediction information (hereinafter referred to as "main prediction information") determined using an intra prediction mode and an inter prediction mode. The number of pieces of additional prediction information may be one or more and the additional prediction information may correspond to any one of the intra prediction mode and the inter prediction mode. For example, the main prediction information may be a Planar mode of the intra prediction mode, first sub prediction information may be first motion information of a Merge candidate list, and second sub prediction information may be a vertical mode of the intra prediction mode. In addition, weight information for each prediction block of each prediction information may be determined through the RD-cost value and may be included and transmitted in additional prediction information.

Figure 15:
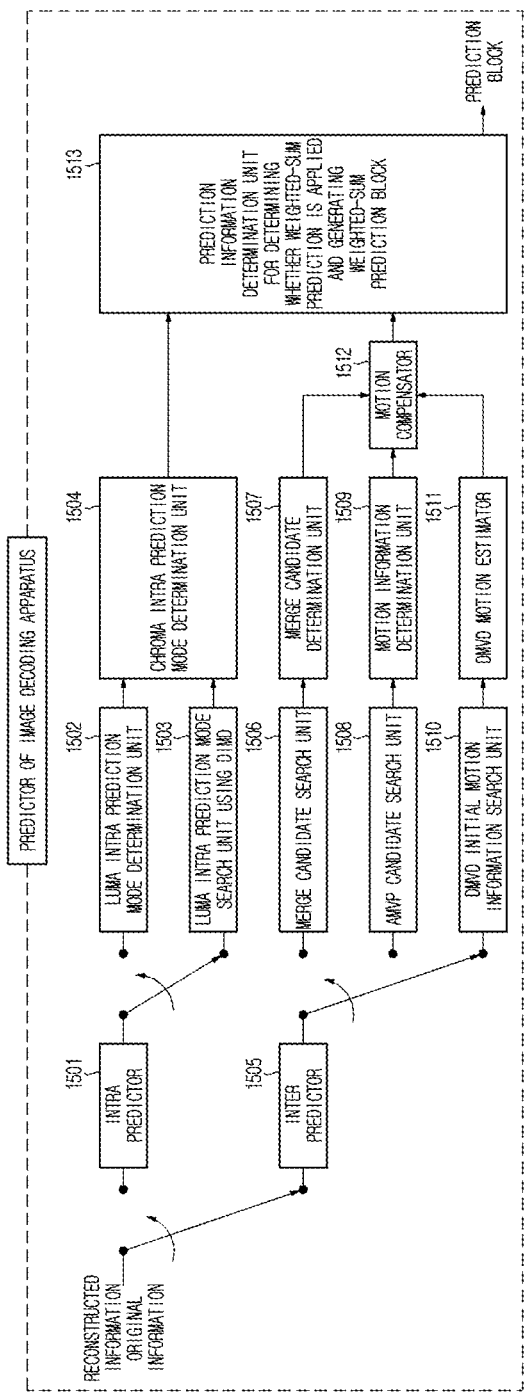
FIG. 15 is a view illustrating a predictor of an image decoding apparatus.

FIG. 15 is a view illustrating a predictor of an image decoding apparatus.

An intra predictor 1501 may determine whether an intra prediction mode is determined using a DIMD mode using reconstructed information. When the DIMD mode is not used, a luma intra prediction mode determination unit 1502 may determine the intra prediction mode of a luma block using the reconstructed information. When the DIMD mode is used, a luma intra prediction mode search unit 1503 using the DIMD may set a template region in a reconstructed region around the current block, search for a luma intra prediction mode which is optimal for the template region using reconstructed pixels around the template region, and determine an intra prediction mode which is optimal for the template region as a luma intra prediction mode of the current block. Thereafter, a chroma intra prediction mode determination unit 1504 may determine the intra prediction mode of the chroma block.

An inter predictor 1505 may determine one prediction mode among a SKIP mode, a MERGE mode, an AMVP mode and DMVD mode when inter prediction is performed using the reconstructed information. Description of reference numerals 1506 to 1509 is equal to description of reference numerals 1204 to 1207 of FIG. 12. Description of reference numerals 1510 to 1511 is equal to description of reference numerals 1410 to 1411 of FIG. 14. A motion compensator 1512 may perform motion compensation using motion information determined in each mode and generate a prediction block. A prediction information determination unit 1513 for determining whether weighted-sum prediction is applied and generating a weighted-sum prediction block may determine N pieces of sub prediction information (that is, N-th sub prediction information) for weighted-sum in addition to main prediction information determined using the intra prediction mode and the inter prediction mode.

Figure 16:
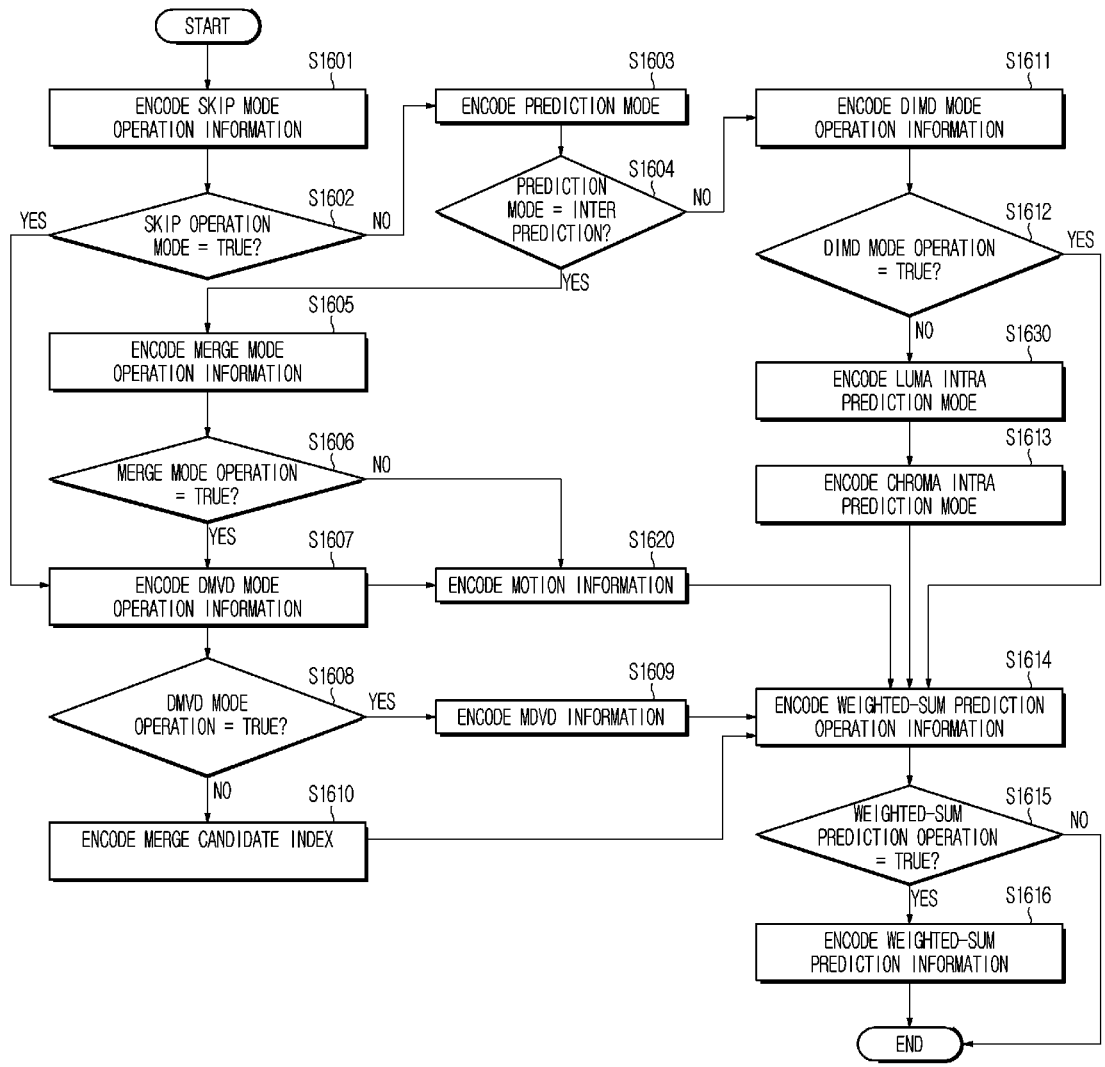
FIG. 16 is a view illustrating a method of encoding coding information according to an embodiment of the present invention.

FIG. 16 is a view illustrating a method of encoding coding information according to an embodiment of the present invention.

In step S1601, operation information of the SKIP mode is encoded. In step S1602, it is determined whether the SKIP mode operates. When SKIP mode operation is true, DMVD mode operation information is encoded in step S1607. In step S1608, it is determined whether the DMVD mode operates, and, when DMVD mode operation is true, DMVD mode information is encoded in step S1609. When DMVD mode operation is false, MERGE candidate index information for the SKIP mode is encoded in step S1610. When SKIP mode operation is false, a prediction mode is encoded in step S1603. In step S1604, it is determined whether a prediction mode is inter prediction. When the prediction mode is inter prediction, operation information of the MERGE mode is encoded in step S1605. In step S1606, whether the MERGE mode operates. When MERGE mode operation is true, steps S1607 to S1610 may be performed, description of which is equal to the above description. However, in step S1610, MERGE candidate index information is a candidate index information for the MERGE mode, not for the SKIP mode. When MERGE mode operation is false, a motion information encoding unit may encode motion information in step S1620. Step S1620 may correspond to a process of steps S1008 to S1010 of FIG. 10. When the prediction mode is not an inter prediction mode but is an intra prediction mode, DIMD mode operation information is encoded in step S1611. In step S1612, it is determined whether the DIMD mode operates. When DIMD mode operation is false, a luma intra prediction mode encoding unit encodes intra prediction mode information in step S1630. Step S1630 may correspond to steps S1017 to S1020 of FIG. 10. In step S1613, chroma intra prediction mode information may be encoded. Through the above-described encoding method, the main prediction information may be encoded.

In step S1614, weighted-sum prediction operation information for determining weighted-sum of the main prediction information may be encoded. Weighted-sum prediction may be applied unconditionally without encoding the information (weighted-sum prediction operation is unconditionally true) or may not be applied (weighted-sum prediction operation is unconditionally false). In step S1615, it is determined whether weighted-sum prediction operation is performed. When weighted-sum prediction operation is false, this flow is finished and, when weighted-sum prediction operation is true, weighted-sum prediction information is encoded in step S1616. The weighted-sum prediction information may include weight information allocated to each prediction block generated using main prediction information and sub prediction information, a weighted summing method, etc.

Figure 17:
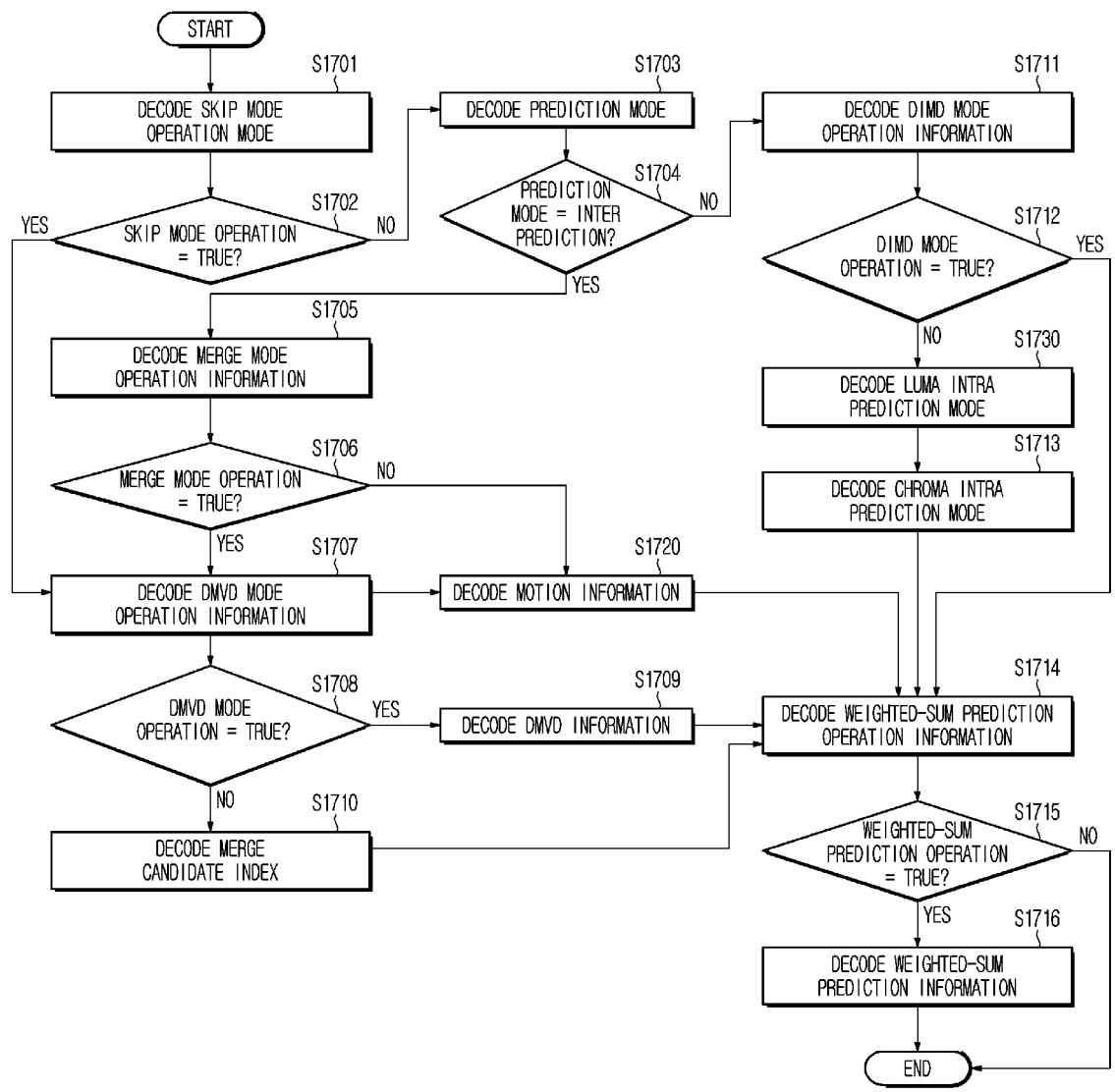
FIG. 17 is a view illustrating a method of decoding coding information according to an embodiment of the present invention.

FIG. 17 is a view illustrating a method of decoding coding information according to an embodiment of the present invention.

In step S1701, operation information of the SKIP mode is encoded. In step S1702, it is determined whether the SKIP mode operates. when SKIP mode operation is true, DMVD mode operation information is decoded in step S1707. In step S1708, it is determined whether the DMVD mode operates, and, when DMVD mode operation is true, DMVD mode information is decoded in step S1709. When DMVD mode operation is false, MERGE candidate index information for the SKIP mode is decoded in step S1710. SKIP mode operation is false, a prediction mode is decoded in step S1703. In step S1704, it is determined whether a prediction mode is inter prediction. When the prediction mode is inter prediction, MERGE mode operation information is decoded in step S1705. In step S1706, it is determined whether the MERGE mode operates. When MERGE mode operation is true, steps S1707 to S1710 may be performed, description of which is equal to the above description. However, in step S1710, MERGE candidate index information is candidate index information for the MERGE mode, not for the SKIP mode. When MERGE mode operation is false, a motion information decoding unit may decode motion information in step S1720. Step S1720 may correspond to a process of steps S1308 to S1310 of FIG. 13. When the prediction mode is not an inter prediction mode but is an intra prediction mode, DIMD mode operation information is decoded in step S1711. In step S1712, it is whether the DIMD mode operates. When DIMD mode operation is false, a luma intra prediction mode decoding unit may decode luma intra prediction mode information in step S1730. Step S1730 may correspond to a process of steps S1317 to S1320 of FIG. 13. In step S1713, chroma intra prediction mode information may be decoded. In step S1714, weighted-sum prediction operation information for determining weighted sum of main prediction information is decoded. When weighted-sum prediction operation is false, this flow is finished, and, when weighted-sum prediction operation is true, weighted-sum prediction information is decoded in step S1716.

Embodiment 1

Embodiment 1 relates to a method of generating a weighted-sum prediction block using prediction information of an inter prediction mode (SKIP mode, MERGE mode, AMVP mode, DMVD mode) and prediction information of an additional inter prediction mode.

Prior to the detailed description of the weighted-sum prediction block generation method, prediction modes for generating prediction information necessary for the present embodiment will be described in detail. The SKIP mode, the MERGE mode and the AMVP mode are the same as described above. The DMVD mode means a method of generating a prediction block by equally generating motion information without encoding/decoding motion information in the image encoding apparatus and the image decoding apparatus.

FIG. 18 is a view showing a result list of an initial motion information search unit of a DMVD mode in a predictor of an image encoding/decoding apparatus.

Additional motion information which is not included in this list may also be included in an initial motion information list.

Figure 19:
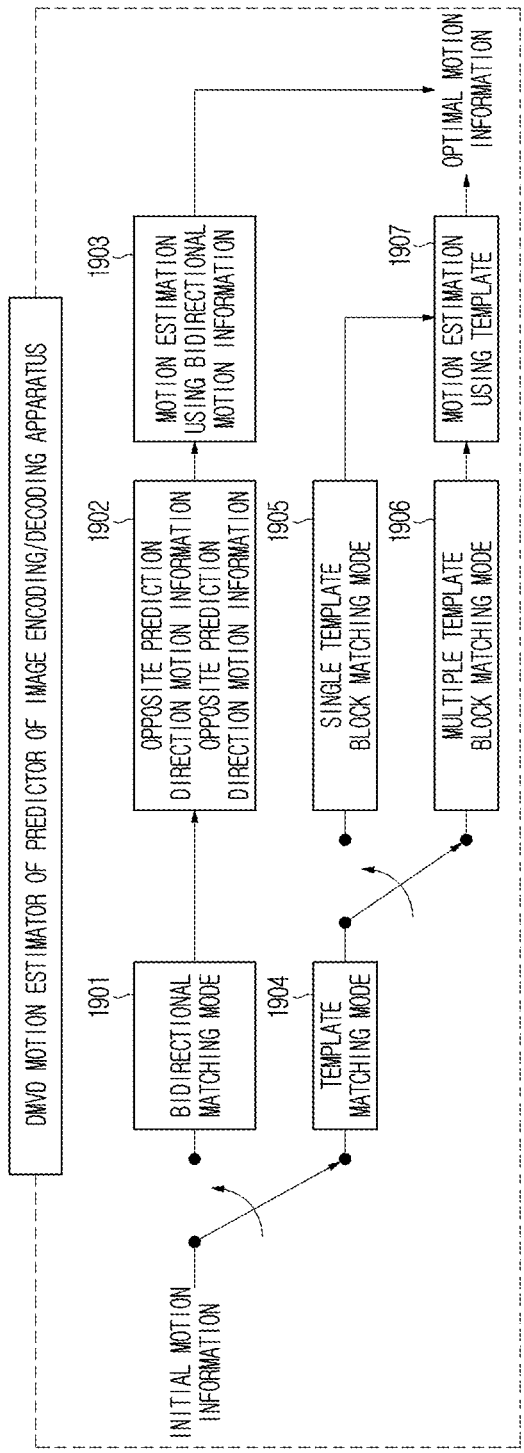
FIG. 19 is a view illustrating operation of a DMVD motion estimator in a predictor of an image encoding/decoding apparatus.

FIG. 19 is a view illustrating operation of a DMVD motion estimator in a predictor of an image encoding/decoding apparatus.

After the DMVD mode is performed using initial motion information determined in the DMVD initial motion information search unit in the image encoding/decoding apparatus, optimal motion information is determined. Here, performing the DMVD mode may mean that initial motion information is corrected.

The DMVD mode may include a mode which uses a template (hereinafter referred to as "template matching mode") and a mode which does not use a template (hereinafter referred to as "bidirectional matching mode").

When a bidirectional matching mode is used (1901), a unidirectional motion vector of each initial motion information is linearly scaled to a reference picture of an opposite prediction direction. Here, scaling of a motion vector is performed in proportion to a distance between a current picture and a reference picture in each direction. After the motion vector is bidirectionally determined (1902), a motion vector in each direction in which a difference between prediction blocks in a past direction and a future direction is minimized is determined as optimal motion information (1903).

Figure 20:
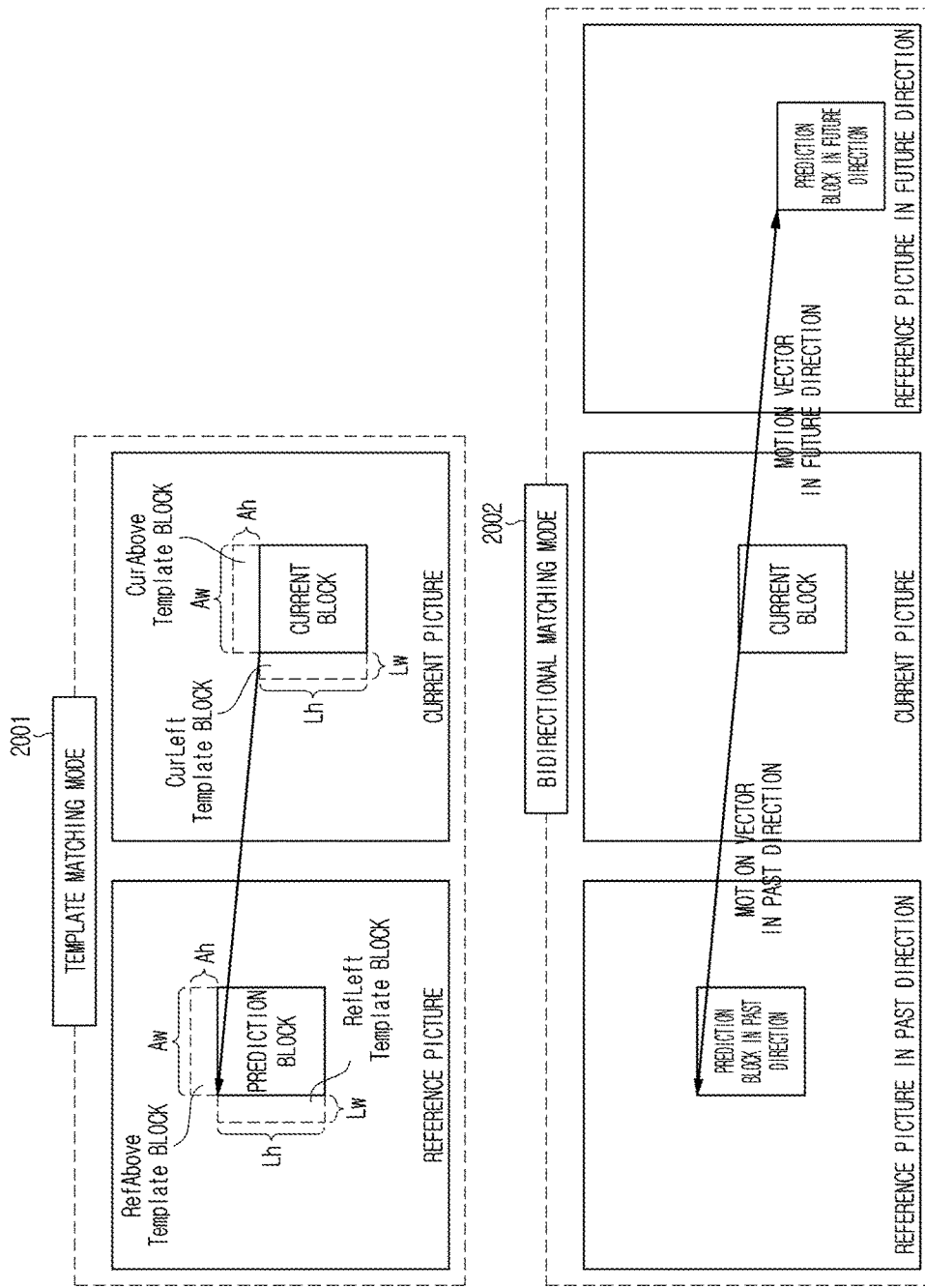
FIG. 20 is a view illustrating a template matching mode and a bidirectional matching mode.

FIG. 20 is a view illustrating a template matching mode and a bidirectional matching mode.

In a bidirectional matching mode (2002), after motion vectors in past and future directions of a current block are linearly generated, a prediction block of the current block may be generated by an average of two prediction blocks in both directions.

If a template matching mode is used (1904), the number of template blocks in a reconstructed region is determined. When a single template block is used (1905) (hereinafter referred to as a "single template matching mode"), reconstructed regions of the left and top adjacent to the neighbor of the current block are determined as a template block and optimal motion information is determined through motion estimation (1907) using the template block.

In a single template matching mode (2001), after searching for the prediction block of a template block most similar to the template block, a block adjacent to the template block may be determined as the prediction block of the current block. A motion estimation cost value means a sum of the amount of prediction error and the virtual bit amount of motion information. Prediction error may be obtained through various calculation methods such as Sum of Absolute Difference (SAD), Sum of Absolute Hadamard Transform Difference (SATD), Sum of Square Difference (SSD), etc. Equations 3, 4 and 5 show calculation methods of SAD, SATD and SSD, respectively.

$$SAD = \sum_{i,j} |(\text{Diff}(i,j)|, \quad \text{Diff}(i,j) = \text{Template}(i,j) - \text{PredBlk}(i,j) \quad \text{Equation 3}$$

$$SATD = \sum_{i,j} \frac{|(\text{Diff}(i,j)|}{2}, \quad \text{DiffT}(i,j) = HT(\text{Template}(i,j) - \text{PredBlk}(i,j)) \quad \text{Equation 4}$$

$$SSD = \sum_{i,j} (\text{Diff}(i,j))^2, \quad \text{Diff}(i,j) = \text{Template}(i,j) - \text{PredBlk}(i,j) \quad \text{Equation 5}$$

In Equations above, i and j denote locations of pixels, Template(i, j) denotes the pixel of the template block, and PredBlk(i, j) denotes the pixel of the prediction block. Here, the HT( ) function of Equation 4 means a function value obtained by Hadamard-transforming a difference value block between the template block and the prediction block. The virtual bit amount of the motion information is not actually transmitted information, but the virtual bit amount of the motion information which is equally expected in the image encoding apparatus and the image decoding apparatus is calculated. For example, a difference vector size of a motion vector in motion information which is currently being subjected to motion estimation and a motion vector of initial motion information may be calculated and determined as a virtual bit amount. In addition, a motion information virtual bit amount may be calculated using a bit amount for reference picture information. When a plurality of template blocks is used (1906) (hereinafter referred to as "multiple template matching mode"), a plurality of template blocks may be determined in the reconstructed region.

Figure 21:
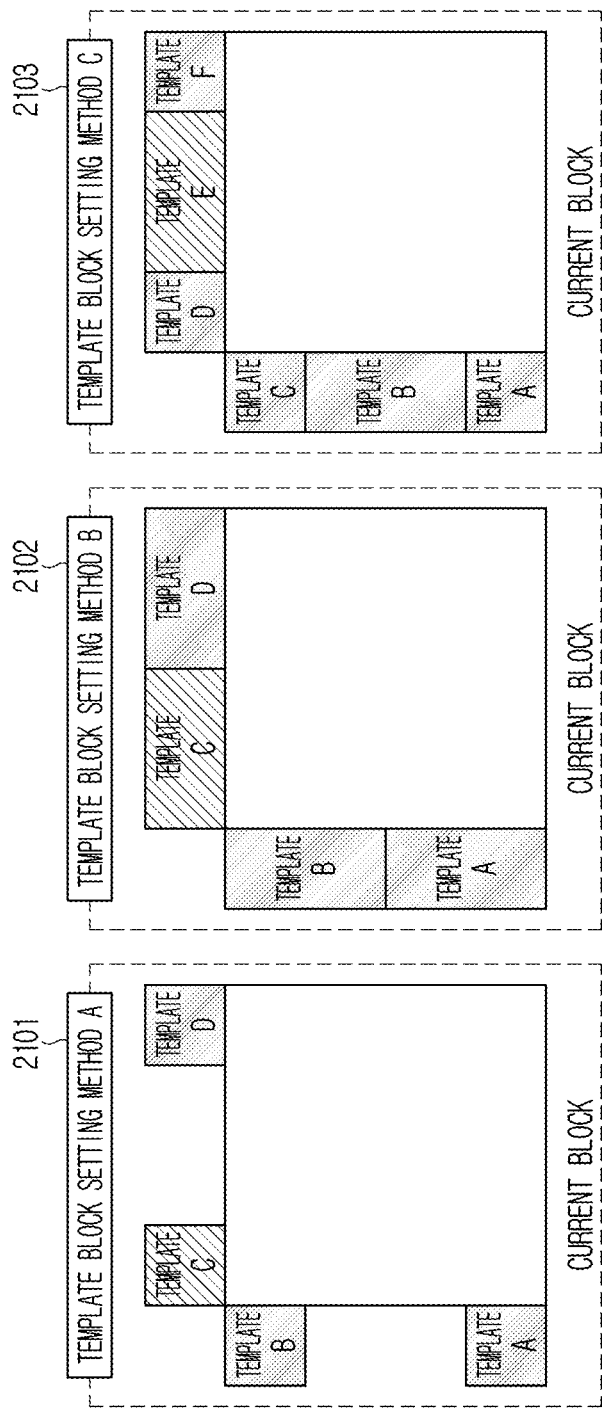
FIG. 21 is a view showing an example of a method of setting a template block.

FIG. 21 is a view showing an example of a method of setting a template block.

The template block may be set as illustrated in reference numerals 2101 to 2103 of FIG. 21. According to the template block setting method A (2101), the template block may be determined at the bottom left (Template A), the top left (Template B), the top left (Template C) and the top right (Template D) of the current block. The size and shape of each template block may be variously determined. According to the template block setting method B (2102), similarly to the template block setting method A, the template block may be determined at the bottom left (Template A), the top left (Template B), the top left (Template C) and the top right (Template D) of the current block, but there is a difference in that all the reconstructed regions of the left and top adjacent to the current block are used. According to the template block setting method C (2103), the template block may be generated in consideration of both the template block setting method A and the template block setting method B. In addition, the reconstructed regions of the left and top adjacent to the current block may be determined and used as one template block. As described with respect to FIG. 21, the template block may be generated in the reconstructed region around the current block using various methods. However, information indicating the shape and size of the template block may be transmitted by the image encoding apparatus and used. After performing motion estimation (1907) for searching for a prediction block most similar to each determined template block in the reference picture, motion information which is optimal for each template block is estimated and motion information most suitable for the current block of the motion information is searched and determined as optimal motion information. The index information of this optimal motion information may be transmitted (that is, this is equal to transmission of the index information of the template block.

In the inter prediction mode, main prediction information may be generated using four prediction modes. In addition to this, an additional inter prediction mode for generating main prediction information may be used. A method of deriving additional sub prediction information may be diversified.

When the main prediction information is motion information generated in the SKIP mode or the MERGE mode, in Method 1-a, a weighted sum with other candidate motion information in the candidate motion information list of the SKIP and MERGE modes may be performed. At this time, the index information of the other candidate motion information corresponding to sub prediction information may be transmitted and may be used as next-order motion information of the candidate motion information corresponding to the main prediction information without being transmitted, and preset candidate motion information may be determined as sub prediction information. In Method 1-b, a weighted sum with motion information determined by performing additional motion estimation using the reconstructed motion information around the current block as initial motion information may be performed. At this time, motion information corresponding to sub prediction information may express motion using parameters other than a prediction information, a reference picture and a 2D motion vector. For example, this may be expressed by 3D (distance between pictures, X coordinate and Y coordinate). In addition, only some motion information may be transmitted. For example, without transmitting a prediction direction, a direction opposite to the prediction information of the motion information of the SKIP and MERGE modes may be unconditionally determined. In Method 1-c, a weighted sum with the motion information generated in the DMVD mode may be performed. At this time, the motion information corresponding to sub prediction information may be derived using the template matching mode and bidirectional matching mode of the DMVD mode, and the mode information may be transmitted by determining in which mode the weighted sum of optimal motion information is better, among the motion information determined for each mode.

When the main prediction information is motion information generated in the AMVP mode, in Method 2-a, one of the candidate motion information of the SKIP and MERGE modes may be selected and weighted-summed. At this time, the index information of the candidate motion information corresponding to sub prediction information may be transmitted and preset candidate motion information may be unconditionally used. For example, a weighted sum with candidate motion information having highest priority may be unconditionally performed. In Method 2-b, as in Method 1-b, motion information determined through additional motion estimation may be determined sub prediction information. At this time, motion estimation is performed using initial motion information other than initial motion information used when the motion information of the main prediction information is derived. Except for this, this is the same as Method 1-b. Method 2-c is the same as Method 1-c.

When the main prediction information is motion information generated in the DMVD mode, Method 3-a is the same as Method 1-a. Method 3-b is the same as Method 1-b. In Method 3-c, when the DMVD mode determined as the main prediction information is a bidirectional matching mode, optimal motion information of a single template block matching mode is determined as sub prediction information. When the main prediction information is a single template block matching mode, optimal motion information of the bidirectional matching mode may be determined sub prediction information, and, in multiple template matching mode, motion information of a sub template block which is optimal for the current block in the multiple template matching mode may be determined as sub prediction information. When the main prediction information is in a multiple template block matching mode, except for the motion information of the sub template block corresponding to the main prediction information, the motion information of another sub template block may be determined as sub prediction information.

In the above-described method, the main prediction information and the sub prediction information should be different from each other. In addition, instead of one piece of sub prediction information, two or more pieces of sub prediction information may be used. Information on a weight applied for each prediction block generated using the main prediction information and the sub prediction information may be determined by transmitting any of weight sets of preset main prediction information and sub prediction information. The weight may have a negative value and a sum of weights given for each prediction block is 1.

FIGS. 24 to 28 are views illustrating a weighted-summing method between prediction blocks using main prediction information and sub prediction information when there is one sub prediction information. In these figures, a prediction block A is generated as main prediction information and a prediction block is generated as sub prediction information. In addition, it is assumed that the size of the prediction blocks A and B is 4×4, and a weighted sum is performed using a weight applied to the prediction pixels at the same location in the prediction block A and the prediction block B.

Figure 24:
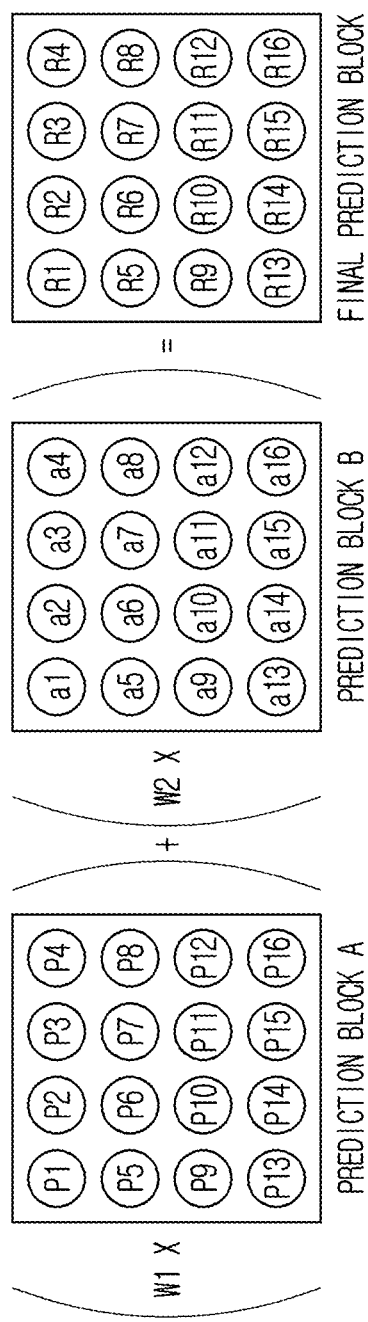
FIG. 24 is a view illustrating a method of applying a single weight to a prediction block.

FIG. 24 is a view illustrating a method of applying a single weight to a prediction block.

In FIG. 24, a weighted sum may be performed by applying a weight W1 to all pixels of a prediction block A and applying a weight W2 to all pixels of a prediction block B, thereby generating a final prediction block.

Figure 25:
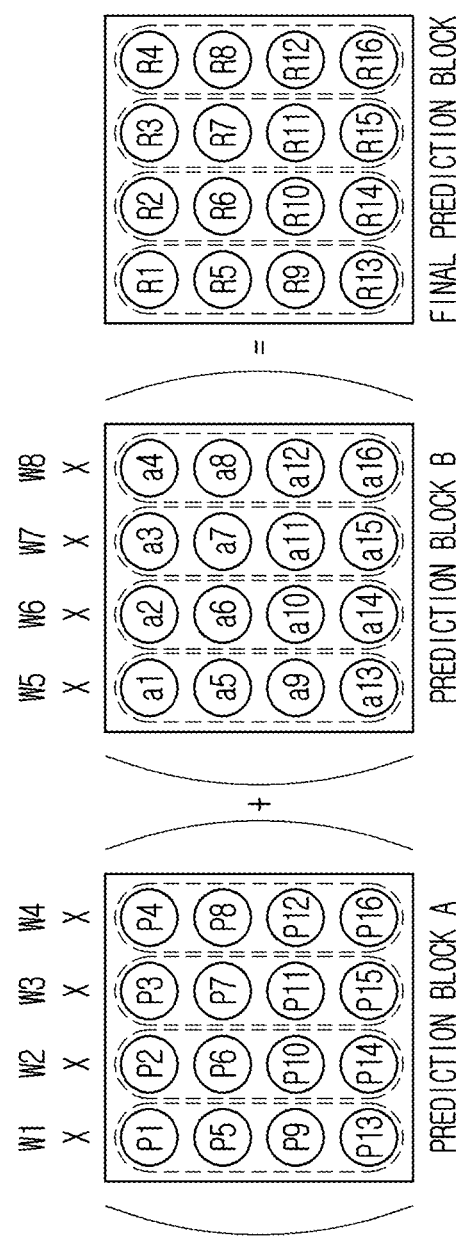
FIG. 25 is a view illustrating a method of applying a plurality of weights to a prediction block.

FIG. 25 is a view illustrating a method of applying a plurality of weights to a prediction block.

In FIG. 25, the prediction block A is divided into N regions in the vertical direction and weights differ between the regions. In this example, the prediction block A is divided into four regions, to which weights W1, W2, W3 and W4 are respectively applied from the left, and weights W5, W6, W7 and W8 are applied to the prediction block B from the left. Here, a sum of W1 and W5, a sum of W2 and W6, a sum of W3 and W7 or a sum of W4 and W9 is 1. After the weights are determined in this way, the weighed sum is performed and a final prediction block is generated.

Figure 26:
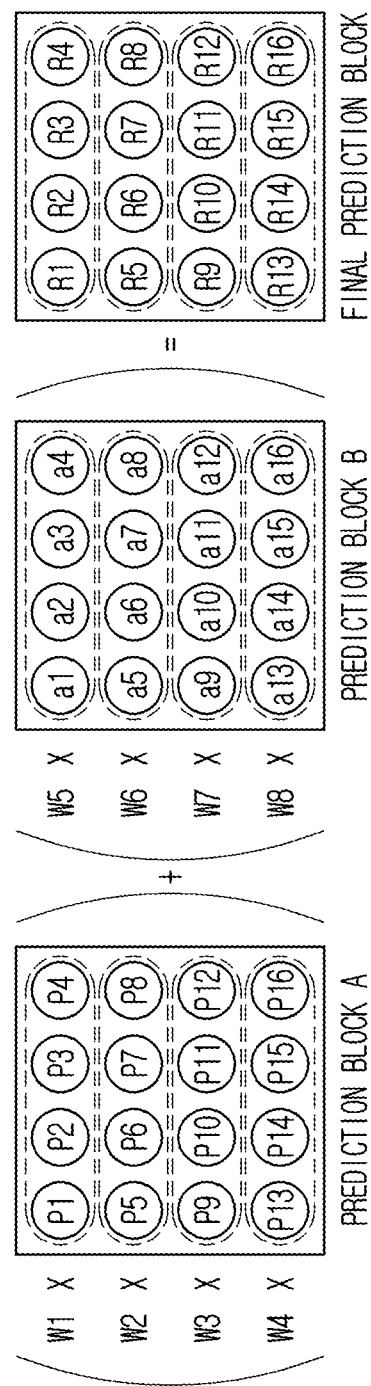
FIG. 26 is a view illustrating another method of applying a plurality of weights to a prediction block.

FIG. 26 is a view illustrating another method of applying a plurality of weights to a prediction block.

The method shown in FIG. 26 is equal to the method shown in FIG. 25 except that the block is divided into N regions in the horizontal direction.

Figure 27:
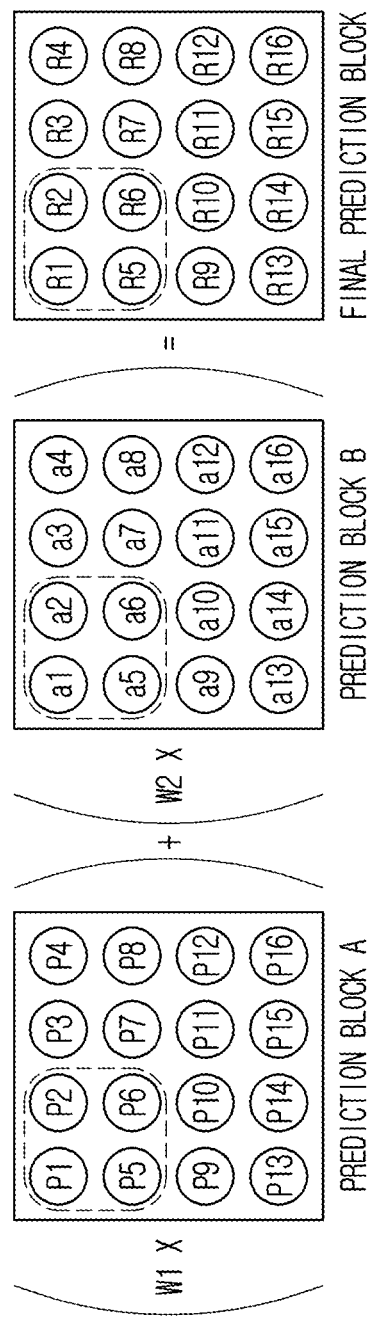
FIG. 27 is a view illustrating a method of applying a weight to only a partial region of a prediction block.
Figure 28:
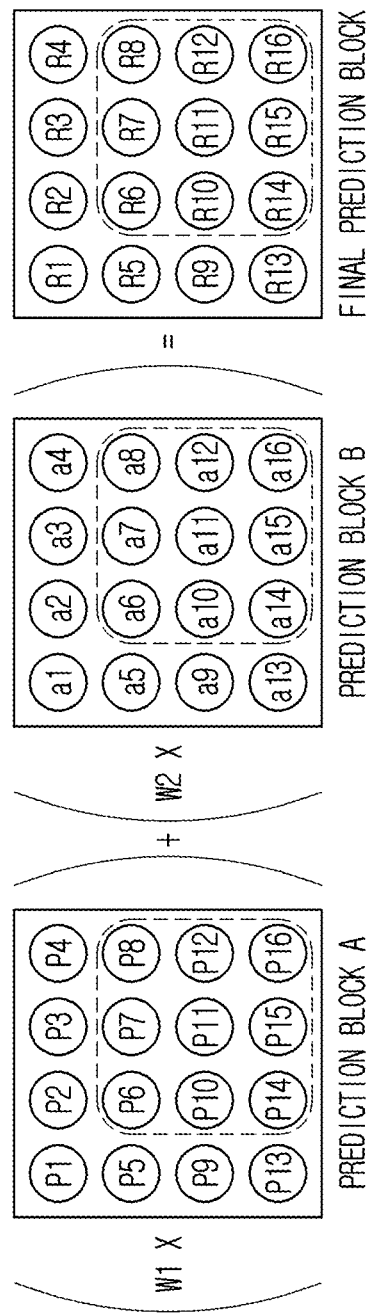
FIG. 28 is a view illustrating another method of applying a weight to only a partial region of a prediction block.

FIGS. 27 and 28 show examples of a method of applying a weighted sum to some regions rather than applying a weighted sum to the entire region of a prediction block.

FIG. 27 is a view illustrating a method of applying a weight to only a partial region of a prediction block.

In FIG. 27, a weight is applicable to only top left regions of the prediction blocks A and B. Referring to FIG. 27, four top left pixels are determined as a top left region and a weighted sum of only prediction pixels corresponding to the region in the prediction blocks A and B is performed, thereby generating a final prediction block.

FIG. 28 is a view illustrating another method of applying a weight to only a partial region of a prediction block.

The method shown in FIG. 28 is equal to the method shown in FIG. 27 except that a weighted-sum region is a bottom right region of the prediction block.

In addition, the weights applied to the prediction pixels of the prediction blocks A and B of FIGS. 27 and 28 are W1 and W2 and the sum of the weights is 1.

In a weighted-summing method, a preset weighted-summing method and weight information may be used according to the types of the main prediction information and the sub prediction information. In addition, when three or more prediction blocks are weighted-summed, each prediction block is not weighted-summed at once, but a method of first weighted-summing the main prediction information and first sub prediction information and then sequentially weighted-summing two prediction blocks, that is, second sub prediction information and third sub prediction information, with the resultant prediction block is also possible.

Embodiment 2

In the present embodiment, a method of generating a weighted-sum prediction block using prediction information of an intra prediction mode and prediction information of an additional intra prediction mode will be described.

Prior to the detailed description of the weighted-sum prediction block generation method, prediction modes for generating prediction information required in the present embodiment will be described in detail. A DIMD mode means a method of generating a prediction block by equally generating an intra prediction mode without encoding/decoding intra prediction information in the image encoding apparatus and the image decoding apparatus.

Figure 22:
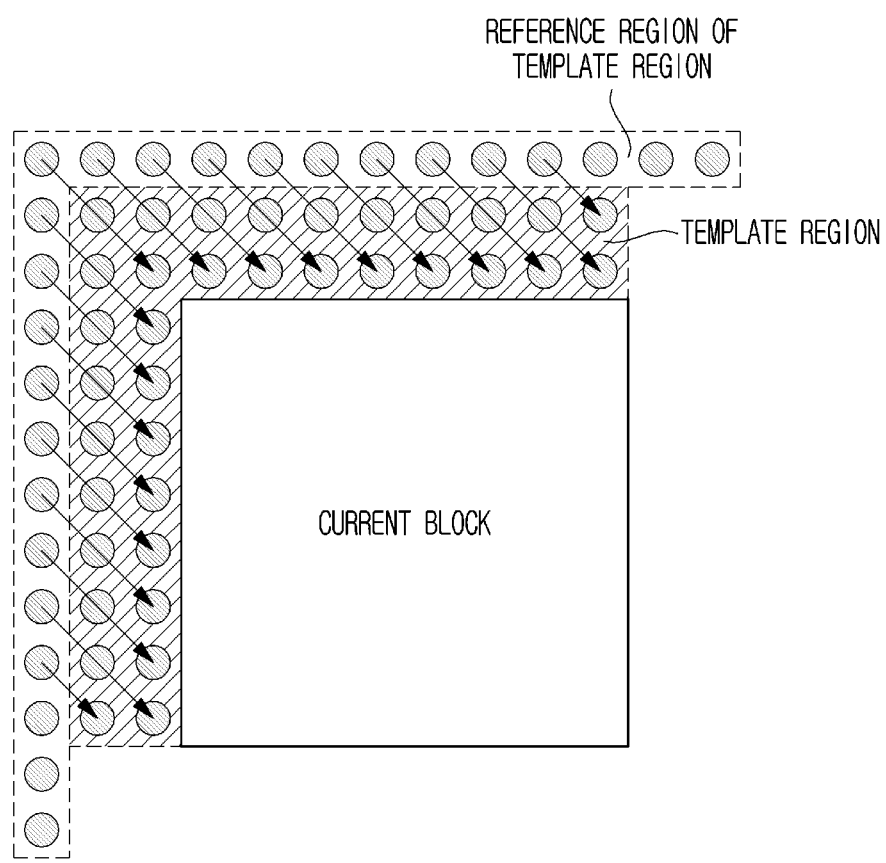
FIG. 22 is a view illustrating template matching technology using a template region in a reconstructed region around a current block in an intra prediction mode.

FIG. 22 is a view illustrating template matching technology using a template region in a reconstructed region around a current block in an intra prediction mode.

In FIG. 22, a template region is determined in the reconstructed region around the current block. The size of the template region may be variously determined. Thereafter, the reference region of the template region is determined around the template region. The template region is intra-predicted using the reconstructed pixels of this reference region and a difference between the predicted value and the reconstructed value of the template region, that is, a prediction error amount, is determined as a template matching cost value. As a method of calculating a prediction error amount, various methods such as SAD, SATD and SSD may be used.

Figure 23:
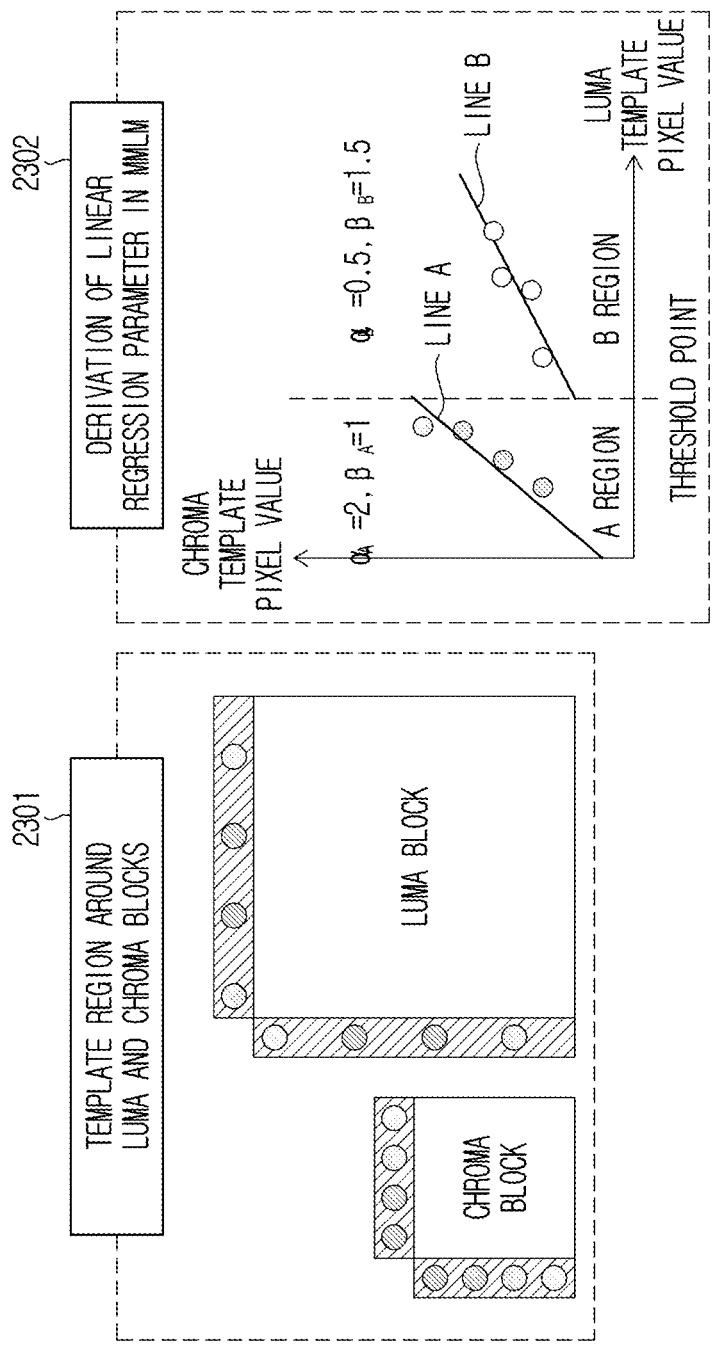
FIG. 23 is a view illustrating a linear mode (LM) for a chroma block.

FIG. 23 is a view illustrating a linear mode (LM) for a chroma block.

A prediction block using the LM mode in the chroma block may be generated by referring to Equation 6.

$$pred_C(i,j) = \alpha \cdot rec_L'(i,j) + \beta \qquad \text{Equation 6}$$

where, $pred_C(i, j)$ denotes a prediction pixel for each location (i, j) of the chroma block, and $rec_L'(i, j)$ denotes a down-sampled reconstructed pixel obtained using the optimal intra prediction mode of the luma block. $\alpha$ and $\beta$ are linear regression parameters for minimizing a difference between a reconstructed pixel of a template region around a luma block and a reconstructed pixel of a template region around a chroma block using a linear regression method. The linear regression parameters $\alpha$ and $\beta$ may be derived by referring to Equation 7.

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \qquad \text{Equation 7}$$

$$\beta = \frac{\sum C(n) - \alpha \cdot \sum L(n)}{N}$$

where, L(n) denotes a reconstructed pixel of a template region around a down-sampled luma block, and C(n) denotes a reconstructed pixel of a template region around a chroma block. A mode for generating the prediction block of the chroma block through such a method is an LM mode. The template region around the luma block and the template region around the chroma block may be determined as shown by reference numeral 2301.

In the intra prediction mode, the main prediction information of the luma block may be generated using a total of four prediction modes including DIMD including DC, Planar, angular mode (hereinafter referred to as "Normal Intra mode"), and, in the chroma block, the main prediction information may be generated using the LM mode. In addition to this, an additional inter prediction mode for generating the main prediction information may be used. Methods of deriving additional sub prediction information may be diversified.

When the main prediction information of the luma block is in an intra prediction mode generated as a normal intra mode, in Method 4-a, the other intra prediction mode except for the intra prediction mode corresponding to the main prediction information may be determined as sub prediction information. At this time, as the intra prediction mode which is the sub prediction information, a prediction mode which is one of the MPM candidate list may be selected. In this case, candidate index information may be transmitted and a candidate intra prediction mode having highest priority may be fixed and used as sub prediction information. In Method 4-b, except for the intra prediction mode corresponding to the main prediction information, the intra prediction mode determined as the DIMD mode may be used as sub prediction information.

When the main prediction information of the luma block is in the intra prediction mode generated as a DIMD mode, in Method 5-a, except for the intra prediction information corresponding to the main prediction information, one of the intra prediction modes in the MPM candidate list may be determined as sub prediction information. At this time, MPM candidate mode information may be transmitted, and a candidate intra prediction mode having highest priority may be fixed and used as sub prediction information. In Method 5-b, another intra prediction mode derived as the DIMD mode is used as sub prediction information. At this time, the intra prediction mode which is the sub prediction information may be derived using only a part or whole of the template when performing the DIMD mode.

When the main prediction information of the chroma block is in the intra prediction mode generated as an LM mode, for Method 6-a, refer to reference numeral 2303 of FIG. 23. In the LM mode, only one set of linear regression parameters may be derived from the template region within the reconstructed region of the luma block and the chroma block and the prediction block of the chroma block may be generated through Equation 6 using the linear regression parameters for each set or two or more sets of linear regression parameters are used and prediction blocks may be generated using Equation 6 and then weighted-summed. Reference numeral 2302 is an example of deriving two sets of linear regression parameters a and B in the LM mode. The reconstructed pixels of the template region around the luma block are divided based on an arbitrary threshold and the linear regression parameters are derived using pixels corresponding to the same location as the luma reconstructed pixels of a region A divided based on the threshold and the reconstructed pixels of the template region around the luma block included in the region A in the template region around the chroma block. The linear regression parameter of the region B is derived using the same method. Prediction blocks may be generated through Equation 6 using the derived two sets of linear regression parameters and weighted summed, thereby generating a final prediction block.

In the above-described method, the main prediction information and the sub prediction information should be different. In addition, two or more pieces of sub prediction information may be used instead of one piece of sub prediction information. Information on the weight applied for each prediction block generated using the main prediction information and the sub prediction information may be determined by transmitting any set information of a weight set of preset main prediction information and sub prediction information. The weight may be negative and the sum of weights given for each prediction block is 1.

The description of FIGS. 24 to 28 is equal to the above description and the determined main prediction information and sub prediction information, a weighted summing method, weight information, etc. may be determined and transmitted as weighted-sum prediction information, but some information may be preset and used in the image encoding apparatus and the image decoding apparatus.

As the weighted summing method, a preset weighted summing method and weight information may be used according to the types of the main prediction information and the sub prediction information to be weighed-summed. In addition, when three or more prediction blocks are weighed-summed, instead of weighted summing the prediction blocks at once, a method of first weighted-summing the main prediction information and first sub prediction information and then sequentially weighted-summing second sub prediction information and third sub prediction information with the resultant prediction block is possible.

Embodiment 3

In the present embodiment, a method of generating a weighted-summed prediction block using prediction information of an inter prediction mode and prediction information of an additional intra prediction mode or prediction information of an intra prediction mode and additional inter prediction information will be described.

When the main prediction information is in the intra prediction mode generated as a normal intra mode or a DIMD mode, an optimal prediction mode may be selected as sub prediction information from among the SKIP, MERGE, AMVP and DMVD mode and then the motion information of the mode may be determined as sub prediction information. The motion information of the sub prediction information may be transmitted using the same method as the main prediction mode, only some motion information may be transmitted or sub prediction information may be determined using only preset prediction information in the image encoding apparatus and the image decoding apparatus without transmission.

When the main prediction information is motion information generated in the SKIP, MERGE, AMVP or DMVD mode, the intra prediction mode determined as the normal intra mode or the DIMD mode may be determined as sub prediction information. For example, in the case of the MERGE mode, the main prediction information may be a merge index. As the intra prediction mode information which is the sub prediction information, only some intra prediction modes may be determined by reducing the number of intra prediction modes. Some intra prediction modes may mean only some of all available intra prediction modes. For example, some intra prediction modes may mean a non-angular mode. Alternatively, only one fixed intra prediction mode may be used as a default mode. For example, the default mode may be a Planar mode.

Two or more pieces of sub prediction information may be used instead of one piece of sub prediction information. Information on the weight applied for each prediction block generated using the main prediction information and the sub prediction information may be determined by transmitting any set information of the weight set of the preset main prediction information and sub prediction information. The weight may be negative and the sum of weights given for each prediction block is 1.

Alternatively, the weight may be determined based on the prediction mode of the neighboring blocks of the current block. For example, the neighboring blocks may be upper neighboring blocks and left neighboring blocks. For example, the upper neighboring blocks may be located at the rightmost side among the upper blocks of the current block. For example, when the top left coordinates of the current block having a size of W×H are (0, 0), the upper neighboring blocks include a pixel of coordinates (−1, H−1). For example, the left neighboring blocks may be located at the lowermost side of the left blocks of the current block. For example, when the top left coordinates of the current block having a size of W×H are (0, 0), the left neighboring blocks may include a pixel of coordinates (W−1,−1). For example, the weight may be determined based on the number of intra-predicted blocks and inter-predicted blocks among the neighboring blocks. For example, when there are many intra-predicted blocks in the neighboring blocks, a larger weight may be given to the intra prediction block of the current block than the inter prediction block. For example, when all the top neighboring blocks and the left neighboring blocks are intra-predicted, weights of 0.75:0.25 may be given to the intra prediction block and the inter prediction block of the current block. Conversely, when all the top neighboring blocks and the left neighboring blocks are inter-predicted, weights of 0.25:0.75 may be given to the intra prediction block and the inter prediction block of the current block. When the top neighboring blocks and the left neighboring blocks are inter-predicted and intra-predicted, weights of 0.5:0.5 may be given to the intra prediction block and the inter prediction block of the current block.

The description of FIGS. 24 to 28 is equal to the above description and the determined main prediction information and sub prediction information, a weighted summing method, weight information, etc. may be determined and transmitted as weighted-sum prediction information, but some information may be preset and used in the image encoding apparatus and the image decoding apparatus.

As the weighted summing method, a preset weighted summing method and weight information may be used according to the types of the main prediction information and the sub prediction information to be weighted-summed. In addition, when three or more prediction blocks are weighted-summed, instead of weighted summing the prediction blocks at once, a method of first weighted-summing the main prediction information and first sub prediction information and then sequentially weighted-summing second sub prediction information and third sub prediction information with the resultant prediction block is possible.

In FIGS. 25 and 26, when one of the main prediction mode or the sub prediction mode is an angular intra prediction mode, the weight information may be preset according to an angular mode direction. For example, the horizontal mode and the motion information are weighted-summed, the weighted summing method of FIG. 25 is used, a high weight is given in order of W1, W2, W3 and W4 in the prediction block corresponding to the angular mode and a high weight is given in order of W4, W3, W2 and W1 in the prediction block generated as motion information. In the case of the vertical mode, the weighted summing method of FIG. 26 is used and the other description is the same as the above-described example.

Figure 29:
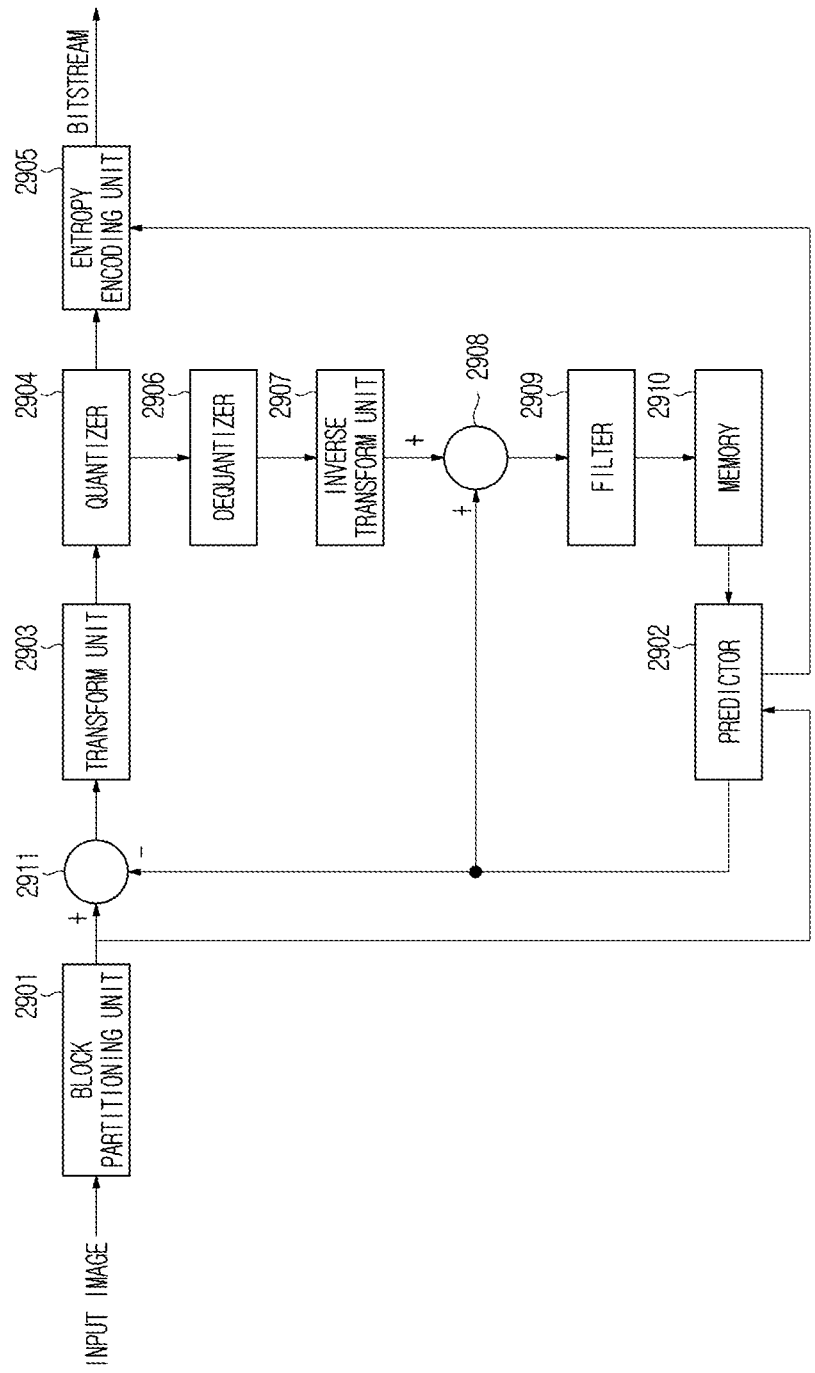
FIG. 29 is a view illustrating an image encoding apparatus.

FIG. 29 is a block diagram illustrating an image encoding apparatus.

Referring to FIG. 29, the image encoding apparatus encodes an image and may include a block partitioning unit 2901, a predictor 2902, a transform unit 2903, a quantizer 2904, an entropy encoding unit 2905, a dequantizer 2906, an inverse transform unit 2907, an adder 2908, an in-loop filter 2909, a memory 2910 and a subtractor 2911.

The components shown in FIG. 29 are independently shown to represent different characteristic functions in the image encoding apparatus, which does not mean that the components are configured in separated hardware or a single software component. That is, the components are listed and included for convenience of description and at least two components are combined into one component and one component may be divided into a plurality of components. Embodiments in which the components are combined and embodiments in which the component is divided are also included in the scope of the present invention without departing from the essence of the present invention.

In addition, some components are not essential components for performing the essential functions in the present invention, but are optional components for improving performance. The present invention may be implemented by including only components necessary to implement the essence of the present invention excluding the components used for performance essence, and a structure including only the essential components excluding the optional components used for performance improvement is also included in the scope of the present invention.

The block partitioning unit 2901 may partition an input image into at least one block. At this time, the input image may have various shapes and sizes, such as pictures, slices, tiles, bricks or segments. The block may mean a coding unit (CU), a prediction unit (PU) or a transform unit (TU). Partitioning may be performed based on at least one a quadtree, binary tree and ternary tree.

The quadtree means accurately partitioning a current coding block in four. The binary tree means accurately partitioning the coding block in two in a horizontal or vertical direction. Ternary tree means a method of partitioning an upper block into three lower blocks. For example, the three lower blocks may be obtained by partitioning the width or height of the upper block with a ratio of 1:2:1. Through the above-described binary tree partitioning, the block may have not only a square but also a non-square. In addition, a partitioning method considering various partitioning methods is also possible.

The block partitioning unit 2901 may partition a block to be encoded with a maximum size (hereinafter referred to as a maximum coding block) and a block to be encoded with a minimum size (hereinafter referred to as a minimum coding block).

The predictor 2902 may generate a prediction block using neighboring pixels of a block to be currently predicted (hereinafter referred to as a prediction block) in a current original block or pixels in a reference picture which has already been encoded/decoded.

As the prediction block, one or more prediction blocks may be generated in the coding block. When there is one prediction block in the coding block, the prediction block has the same shape as the coding block.

As the prediction technology of a video signal, there are intra prediction and inter prediction.

Intra prediction refers to a method of generating a prediction block using the neighboring pixels of the current block.

Inter prediction refers to a method of generating a prediction block by fining a block most similar to the current block from the reference picture which has already been encoded/decoded.

Meanwhile, the predictor 2902 may determine an optimal prediction mode of the prediction block by performing various methods such as rate-distortion optimization (RDO) with respect to a residual block obtained by subtracting the prediction block from the original block after generating the prediction block. The formula of calculating the RDO cost is shown in Equation 8.

$$J(\emptyset,\lambda)=D(\emptyset)+\lambda R(\emptyset) \quad \text{Equation 8}$$

where, D, R and J respectively denote deterioration due to quantization, the rate of the compression stream and RD cost, $\phi$ denotes an encoding mode, and $\lambda$ is Lagrangian multiplier, which is used as a scale correction coefficient for matching units between an error amount and a bit amount. In the encoding process, in order to select an optimal encoding mode, J when the corresponding mode is applied, that is, the RD-cost value, needs to be less than when another mode is applied, and the equation of obtaining the RD-cost value may be calculated in consideration of both the bit rate and error.

Figure 30:
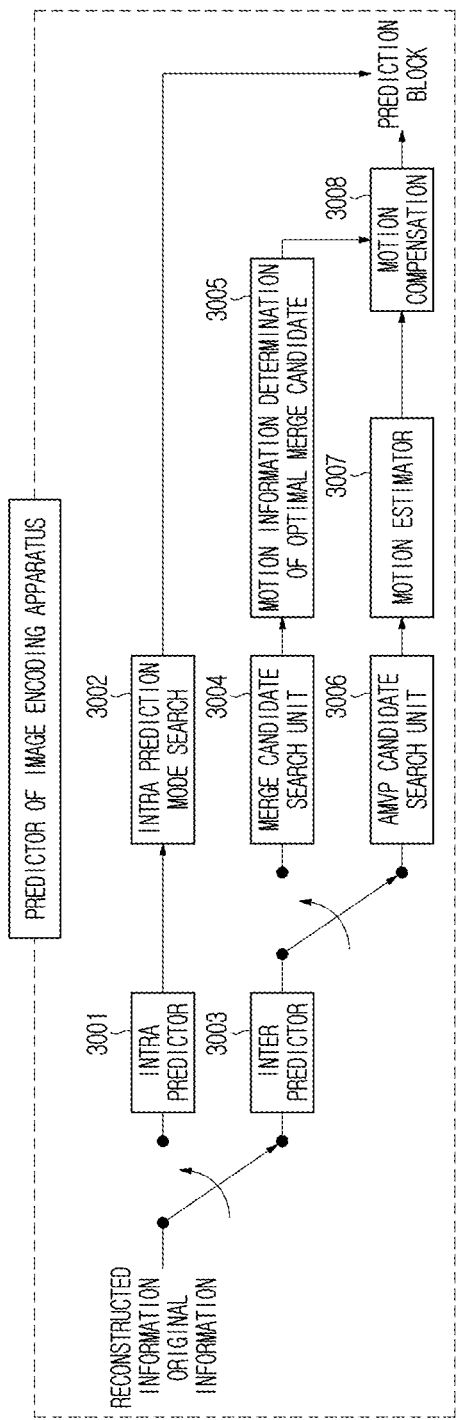
FIG. 30 is a view illustrating a predictor of an image encoding apparatus in detail.

FIG. 30 is a view illustrating a flow in a predictor of an image encoding apparatus.

When intra prediction is performed using original information and reconstructed information (3001), the optimal intra prediction mode may be determined for each prediction mode using the RD-cost value (3002), thereby generating the prediction block.

When inter prediction is performed using original information and reconstructed information (3003), the RD-cost value is calculated with respect to the SKIP mode, the MERGE mode and the AMVP mode.

In the MERGE candidate search unit 3004, candidate motion information sets for the SKIP mode and the MERGE mode may be configured. In addition, optimal motion information of the candidate motion information sets may be determined using the RD-cost value (3005).

In the AMVP candidate search unit 3006, a candidate motion information set for the AMVP mode may be configured. In addition, motion estimation is performed using the candidate motion information sets (3007), and optimal motion information may be determined.

The prediction block may be generated by performing motion compensation using the optimal motion information determined in each mode (3008).

The above-described inter prediction may be composed of three modes (SKIP mode, MERGE mode and AMVP mode). The motion information (prediction direction information, reference picture information and motion vector) may be encoded according to each prediction mode.

The SKIP mode may determine the optimal prediction information using the motion information of the already reconstructed region. In the SKIP mode, a motion information candidate group may be configured in a reconstructed region and a candidate having a minimum RD-cost value of the candidate group may be used as prediction information to generate a prediction block. Here, a method of configuring a motion information candidate group is equal to a method of configuring a motion information candidate group of a MERGE mode which will be described below and thus will be omitted in the present description.

The MERGE mode is equal to the SKIP mode in that the optimal prediction information is determined using the motion information of the already reconstructed region. However, in the SKIP mode, motion information which causes prediction error to become 0 is searched in the motion information candidate group, whereas, in the MERGE mode, motion information in which prediction error is not 0 is searched in the motion information candidate group. Similarly to the SKIP mode, the motion information candidate group may be configured in the reconstructed region and a candidate having a minimum RD-cost value of the candidate group may be used as prediction information, thereby generating a prediction block.

Figure 31:
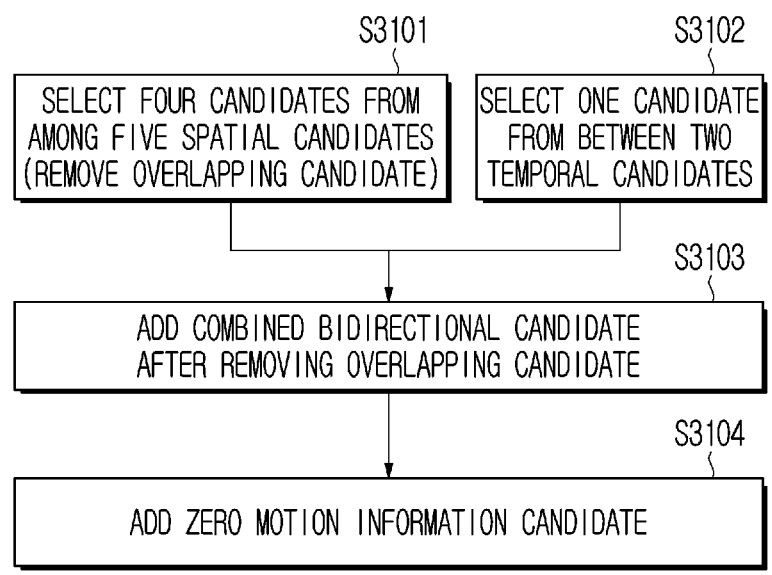
FIG. 31 is a flowchart illustrating a method of deriving candidate motion information of SKIP and MERGE modes.

FIG. 31 is a view showing a method of generating a motion information candidate group of a SKIP mode and a MERGE mode. The maximum number of motion information candidate groups may be equally determined in the image encoding apparatus and the image decoding apparatus, and information on the number may be previously transmitted in the upper header of the image encoding apparatus (the upper header means parameters transmitted in the upper end of a video parameter end, a sequence parameter end, a picture parameter end, etc.).

Figure 33:
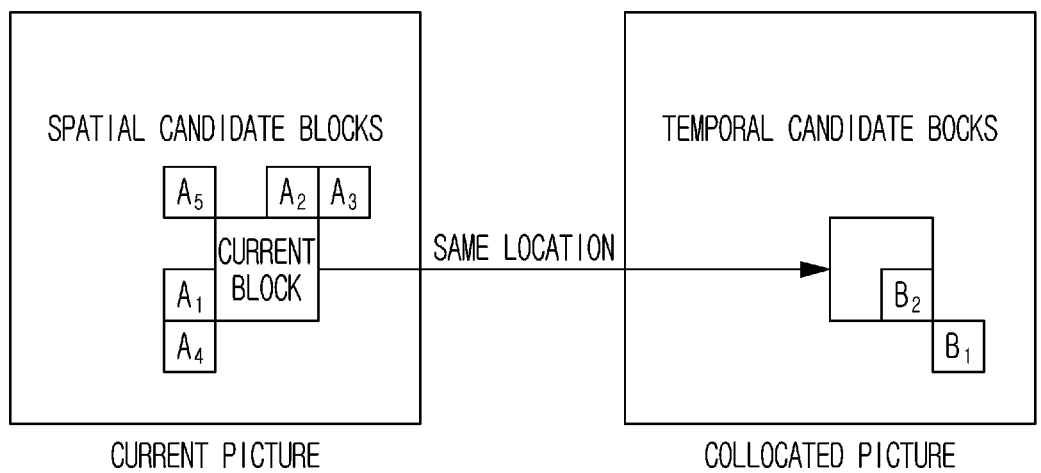
FIG. 33 is a view showing the locations of reconstructed blocks used to derive spatial/temporal candidates among candidate motion information of SKIP, MERGE and AMVP modes.

Referring to FIG. 31, in step S3101, four candidates may be selected from five spatial candidate blocks around the current block in the same picture. FIG. 33 is a view showing the locations of the spatial candidates. Meanwhile, the locations of the spatial candidates may be changed to any block in the reconstructed region. The spatial candidates may be considered in order of A1, A2, A3, A4 and A5 and the motion information of a spatial candidate block which is first available may be determined as a spatial candidate. Here, when there is overlapping motion information, only the motion information of a candidate having high priority may be considered.

In step S3102, one candidate may be selected from between two temporal candidate blocks. FIG. 33 shows the locations of the temporal candidates. The locations of the candidates may be determined based on the block at the same location as the current block location of the current picture in the collocated picture. Here, the collocated picture may be set under the same conditions in the reconstructed picture in the image encoding apparatus and the image decoding apparatus. The temporal candidates may be considered in order of blocks B1 and B2 and the motion information of a candidate block which is first available may be determined as a temporal candidate.

Figure 34:
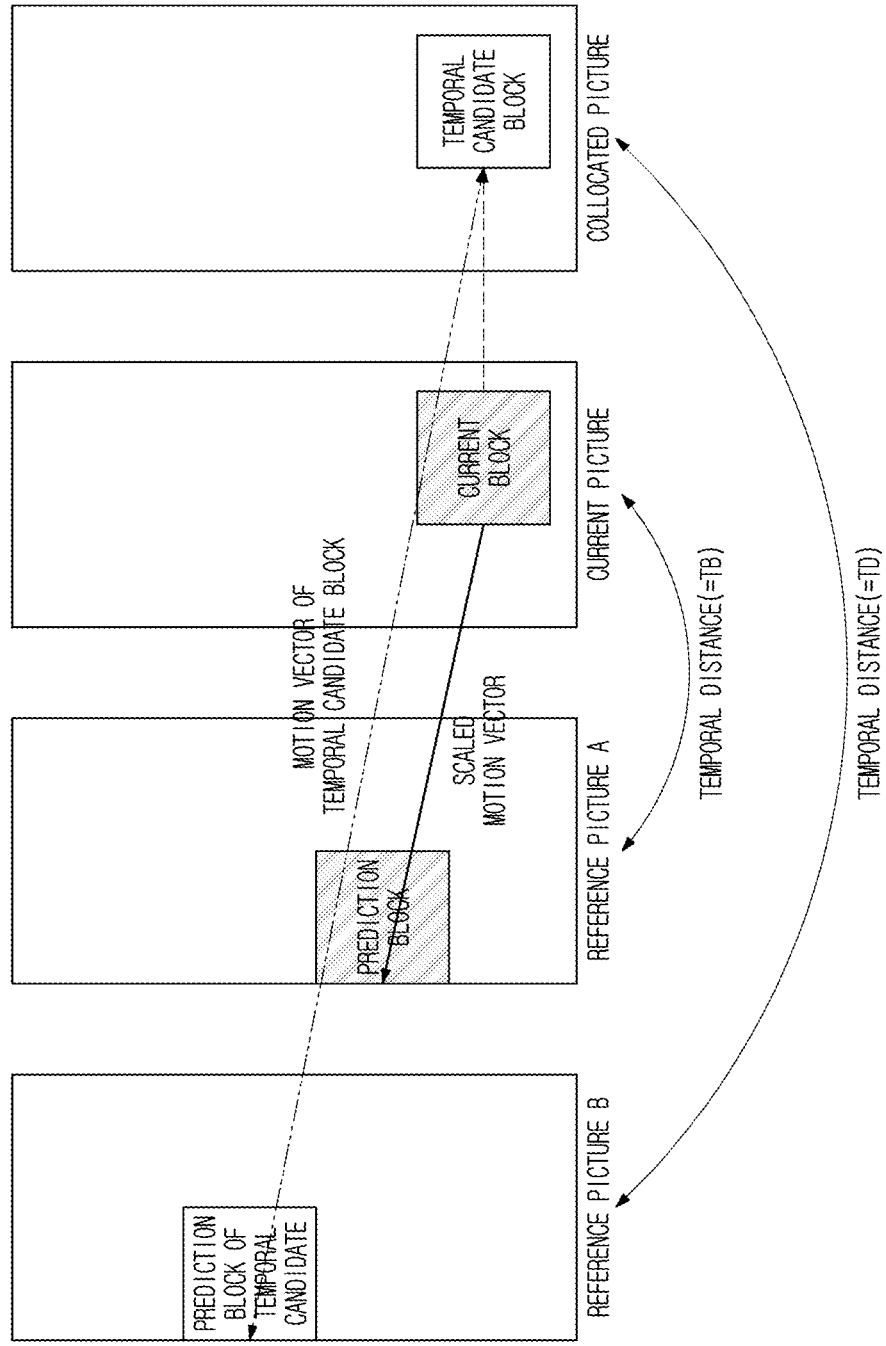
FIG. 34 is a view illustrating a method of deriving temporal candidates among candidate motion information of SKIP, MERGE and AMVP modes.

For the method of determining the motion information of the temporal candidate, refer to FIG. 34.

Referring to FIG. 34, the motion information of the candidate blocks B1 and B2 in the collocated picture indicates a prediction block in a reference picture B. (However, the preference pictures of the candidate blocks may be different from each other. In this description, for convenience, this is referred to as a reference picture B) A motion vector derived by scaling the motion vector of the candidate block by a ratio of a distance between the collocated picture and the reference picture B and a distance between the current picture and the reference picture A may be determined as the motion vector of the temporal candidate motion information. Equation 9 shows a scaling equation.

$$MV_{scale} = \left(\left(\left(TB \times \frac{2^{14} + (TD \gg 1)}{TD} + 2^5\right) \gg 6\right) \times MV + (2^7 - 1)\right) \gg 2^3 \quad \text{Equation 9}$$

where, MV denotes the motion vector of the temporal candidate block motion information, MVscale denotes a scaled motion vector, TB denotes a temporal distance between the collocated picture and the reference picture B, and TD denotes a temporal distance between the current picture and the reference picture A. In addition, the reference picture A and the reference picture B may be the same reference picture. The scaled motion vector may be determined as the motion vector of the temporal candidate and the reference picture information of the temporal candidate motion information may be determined as the reference picture of the current picture, thereby deriving the motion information of the temporal candidate.

Meanwhile, only when the spatial candidate block and the temporal candidate block are encoded in the inter prediction mode in steps S3101 and S3102, the motion information may be included in the motion information candidate group.

Step S3103 is performed only when the maximum number of motion information candidate groups is not satisfied in steps S3101 and S3102, and is a step of adding a new bidirectional motion information candidate group by a combination of motion information candidates derived in a previous step. The bidirectional motion information candidate is obtained by combining the motion information derived before in the past or future direction derived as a new candidate.

Table of FIG. 35 shows the priorities of bidirectional motion information candidate combinations. In addition to the combinations of Table of FIG. 35, additional combinations may be possible and this table shows one example. When the maximum number of motion information candidate groups is not satisfied even using the bidirectional motion information candidate, step S3104 may be performed. In step S3104, the motion vector of the motion information candidate may be fixed and the reference picture according to the prediction direction may be changed, thereby satisfying the maximum number of motion information candidate groups.

In the AMVP mode, optimal motion information may be determined through motion estimation for each reference picture according to the prediction direction. Here, the prediction direction may be a unidirection which uses only one of the past/future direction and bidirection which use both the past and future directions. Motion compensation may be performed using the optimal motion information determined through motion estimation, thereby generating the prediction block. Here, the motion information candidate group for motion estimation may be derived for each reference picture according to the prediction direction. The motion information candidate group may be used as a starting point of motion estimation.

Figure 32:
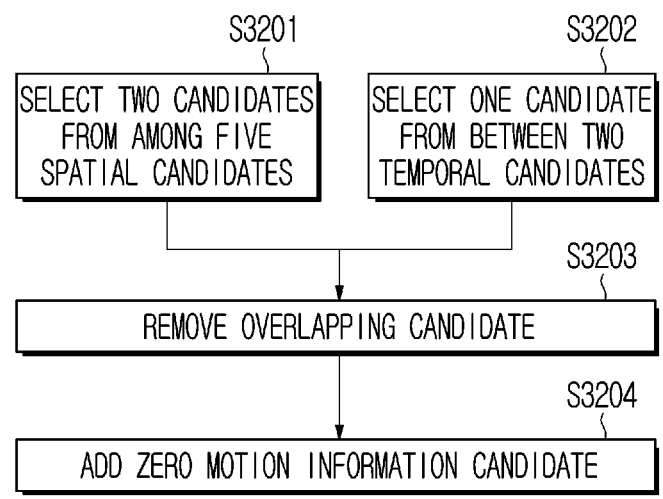
FIG. 32 is a flowchart illustrating a method of deriving candidate motion information of an AMVP mode.

FIG. 32 is a flowchart illustrating a method of deriving a motion information candidate group for motion estimation of the AMVP mode. Here, the maximum number of motion information candidate groups may be equally determined in the image encoding apparatus and the image decoding apparatus, and the information on the number may be previously transmitted in the upper header of the image encoding apparatus.

Referring to FIG. 32, in step S3201, unlike the description of step S3101 of FIG. 31, the number (two) of derived spatial candidates may be different and the priority for selecting the spatial candidate may also be different. The description of step S3201 is equal to that of step S3101 and thus a repeated description will be omitted.

Step S3202 is equal to step S3102 and thus a repeated description will be omitted.

In step S3203, when there is overlapping motion information in the candidates derived so far, this may be removed.

Step S3204 is equal to step S3104 and thus a repeated description will be omitted.

A motion information candidate having a minimum RD-cost value may be selected as an optimal motion information candidate from among the derived motion information candidates and the optimal motion information of the AMVP mode may be obtained through a motion estimation process based on the motion information.

Meanwhile, in the description of step S3201 and step S3202, only when the spatial candidate block and the temporal candidate block are encoded in the inter prediction mode, the motion information derived using the motion information may be included in the motion information candidate group.

The transform unit 2903 transforms a residual block, which is a difference between an original block and a prediction block, to generate a transform block. The transform block is a smallest unit used for the transform and quantization process. The transform unit 2903 transforms the residual signal into a frequency domain to generate a transform block having a transform coefficient. Here, as a method of transforming the residual signal into the frequency domain, various transform methods such as DCT (Discrete Cosine Transform), DST (Discrete Sine Transform) or KLT (Karhunen Loeve Transform) may be used and, using this, the residual signal may be transformed into the frequency domain, thereby generating the transform coefficient. In order to conveniently use the transform method, matrix operation is performed using a basis vector and transform methods may be variously mixed and used upon matrix operation depending on in which prediction mode the prediction block is encoded. For example, upon intra prediction, according to the prediction mode, discrete cosine transform may be used in the horizontal direction and discrete sine transform may be used in the vertical direction.

The quantizer 2904 quantizes the transform block to generate a quantized transform block. That is, the quantizer 2904 may quantize the transform coefficients of the transform block generated by the transform unit 2903 to generate a quantized transform block having the quantized transform coefficient. As a quantization method, a dead zone uniform threshold quantization (DZUTQ) or quantization weighted matrix may be used or various quantization methods which are obtained by improving the same may be used.

Meanwhile, although the image encoding apparatus includes the transform unit 2903 and the quantizer 2904 in the above description, the transform unit and the quantizer may be optionally included in the image encoding apparatus. That is, the image encoding apparatus may transform the residual block to generate the transform block but may not perform the quantization process, perform only the quantization process without transforming the residual block into the frequency coefficient, or may not perform both the transform and quantization processes. In the image encoding apparatus, although some or both of the processes of the transform unit and the quantizer may not be performed, a block input to the entropy encoding unit is generally referred to as a "quantized transform block".

The entropy encoding unit 2905 encodes the quantized transform block and outputs a bitstream. That is, the entropy encoding unit 2905 may encode the coefficients of the quantized transform block output from the quantizer 2904 using various encoding method such as entropy encoding, and generate and output a bitstream including additional information (e.g., information on the prediction mode (the information on the prediction mode may include the intra prediction mode information or motion information determined in the predictor), a quantization coefficient, etc.) necessary to encode the block.

The dequantizer 2906 inversely performs the quantization method used upon quantization with respect to the quantized transform block to reconstruct a dequantized transform block.

The inverse transform unit 2907 inversely transforms the dequantized transform block using the same method as the method used upon transform to reconstruct the residual block, and performs inverse transform by inversely performing the transform method used in the transform unit.

Meanwhile, in the above description, the dequantizer and the inverse transform unit may perform dequantization and inverse transform using inversely the quantization method and the transform method used in the quantizer and the transform unit. In addition, when only quantization is performed and transform is not performed in the transform unit and the quantizer, only dequantization may be performed and inverse transform may not be performed. When both transform and quantization are not performed, the dequantizer and the inverse transform unit may not perform inverse transform and dequantization or may be omitted without being included in the image encoding apparatus.

The adder 2908 adds the residual signal generated by the inverse transform unit and the prediction block generated through prediction, thereby reconstructing the current block.

The filter 2909 performs additional filtering, such as deblocking filtering or sample adaptive offset (SAO), with respect to the entire picture after all blocks in the current picture are reconstructed. Deblocking filtering reduces block distortion occurring when an image is encoded in block units. SAO refers to operation of minimizing a difference between a reconstructed image and an original image, by subtracting or adding a specific value from or to the reconstructed pixel.

The memory 2910 may store the current block reconstructed through additional filtering by the in-loop filter after adding the residual signal generated by the inverse transform unit and the prediction block generated through prediction, and may be used to predict a next block or a next picture.

The subtractor 2911 generates a residual block by subtracting the prediction block from the current original block.

Figure 36:
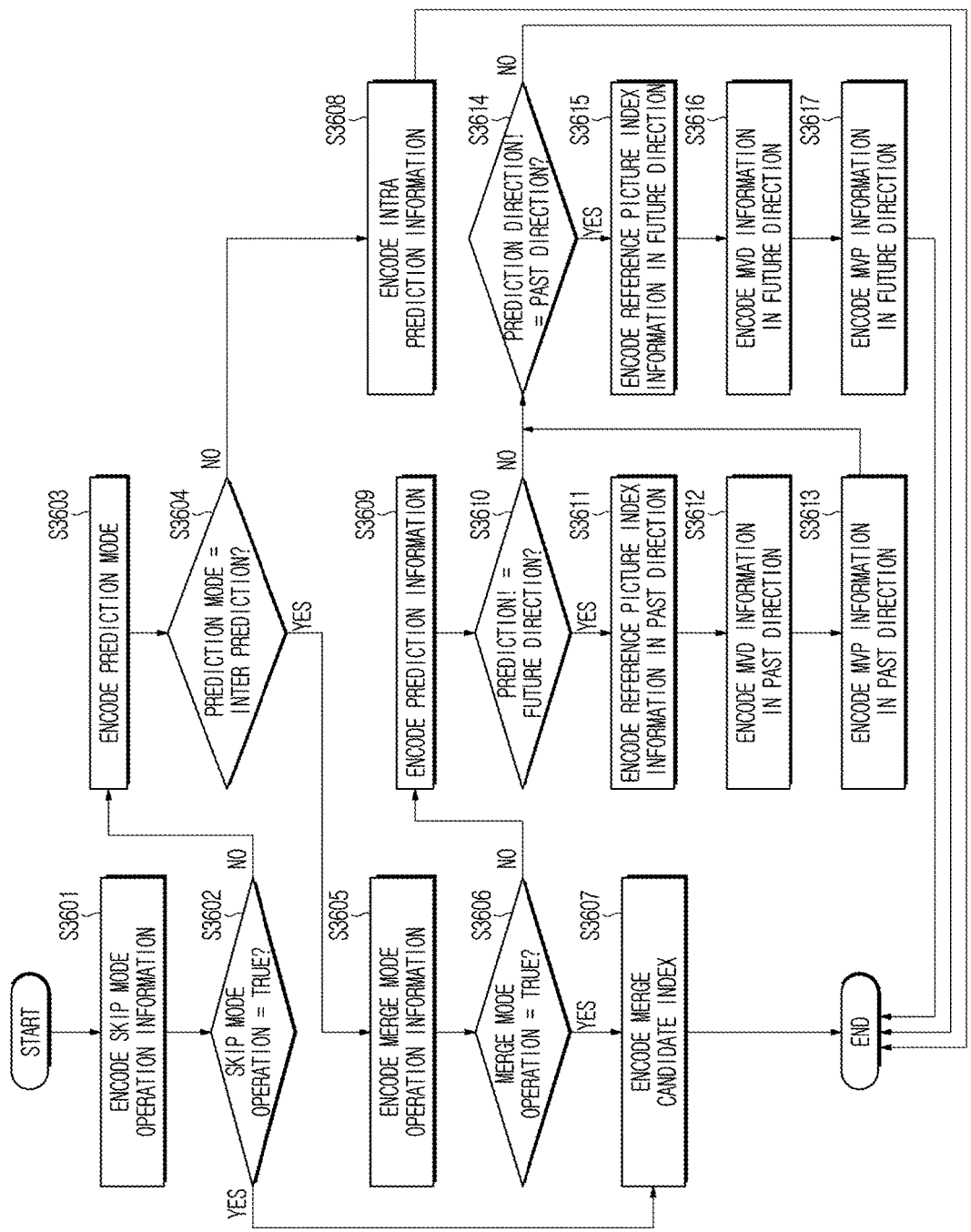
FIG. 36 is a flowchart illustrating a method of encoding prediction information.

FIG. 36 is a flowchart illustrating an encoding flow of encoding information in the image encoding apparatus.

Referring to FIG. 36, in step S3601, operation information of the SKIP mode is encoded.

In addition, in step S3602, it is determined whether the SKIP mode operates. When the SKIP mode operates in step S3602, MERGE candidate index information for the SKIP mode may be encoded in step S3607 and then this flow may be finished.

On the contrary, when the SKIP mode does not operate in step S3602, the prediction mode is encoded in step S3603.

In addition, in step S3604, it is determined whether the prediction mode is an inter prediction or intra prediction mode. When the prediction mode is an intra prediction mode in step S3604, intra prediction mode information may be encoded in step S3608 and then this flow may be finished.

On the contrary, when the prediction mode is an inter prediction mode in step S3604, operation information of the MERGE mode is encoded in step S3605.

In addition, in step S3606, it is determined whether the MERGE mode operates. When the MERGE mode operates in step S3606, the MERGE candidate index information for the MERGE mode may be encoded in step S3607 and then this flow may be finished.

On the contrary, when the MERGE mode does not operate in step S3606, the prediction direction is encoded in step S3609. Here, the prediction direction may be one of the past direction, the future direction or both directions.

In addition, in step S3610, it is determined whether the prediction direction is a future direction. When the prediction direction is not a future direction in step S3610, reference picture index information in the past direction is encoded in step S3611. In addition, motion vector difference (MVD) information in the past direction is encoded in step S3612. In addition, in step S3613, motion vector predictor (MVP) information in the past direction is encoded.

On the contrary, when the prediction direction is a future direction or both directions in step S3610 or when step S3613 is finished, it is determined whether the prediction direction is a past direction in step S3614. In addition, when the prediction direction is not the past direction in S3614, reference picture index information in the future direction is encoded in step S3615. In addition, in step S3616, the MVD information in the future direction is encoded. In step S3617, the MVP information in the future direction may be encoded and then this flow may be finished.

Figure 37:
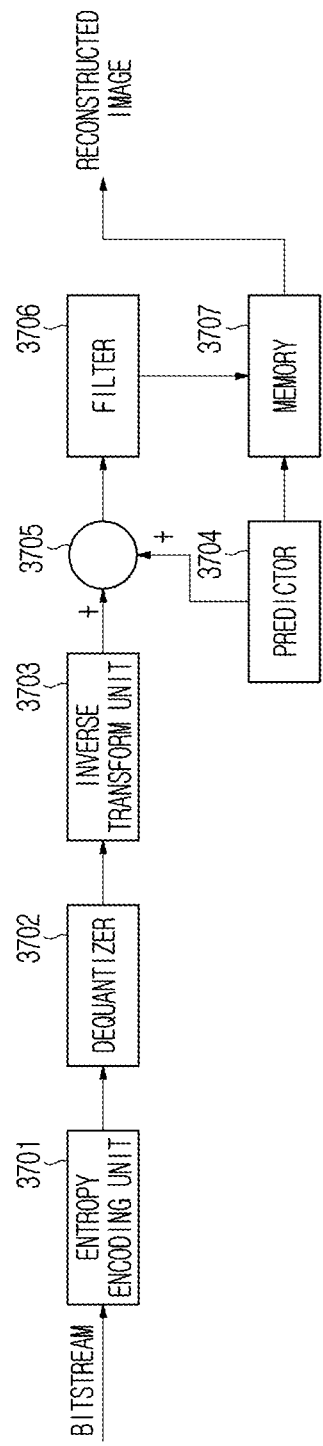
FIG. 37 is a view briefly showing an image decoding apparatus.

FIG. 37 is a block diagram schematically showing the configuration of the image decoding apparatus.

Referring to FIG. 37, the image decoding apparatus may decode an image and may include a quantizer 3702, an inverse transform unit 3703, a predictor 3704, an adder 3705, a dequantizer 3702, an inverse transform unit 3703, a predictor 3704, an adder 3705, an in-loop filter 3706 and a memory 3707.

The components shown in FIG. 37 are independently shown to represent different characteristic features in the image encoding apparatus, which does not mean that the components are configured in separated hardware or a single software component. That is, the components are listed and included for convenience of description and at least two components are combined into one component and one component may be divided into a plurality of components. Embodiments in which the components are combined and embodiments in which the component is divided are also included in the scope of the present invention without departing from the essence of the present invention.

In addition, some components are not essential components for performing the essential functions in the present invention, but are optional components for improving performance. The present invention may be implemented by including only components necessary to implement the essence of the present invention excluding the components used for performance essence, and a structure including only the essential components excluding the optional components used for performance improvement is also included in the scope of the present invention.

The encoding block in the image encoding apparatus may be referred to as a decoding block or an encoding block in the image decoding apparatus.

The entropy decoding unit 3701 may analyze the bitstream received from the image encoding apparatus to read a variety of information necessary to decode the block and a quantized transform coefficient.

The dequantizer 3702 may inversely perform the quantization method used upon quantization with respect to the quantization coefficient decoded by the entropy decoding unit to reconstruct the dequantized block having the dequantized coefficient.

The inverse transform unit 3703 may inversely transform the dequantized transform block using the same method as the method used upon transform to reconstruct a residual block having a difference signal, and may perform inverse transform by inversely performing the transform scheme used in the transform unit.

The predictor 3704 generates the prediction block using the prediction mode information decoded by the entropy decoding unit, using the same method as the prediction method performed in the predictor of the image encoding apparatus.

The adder 3705 may add the residual signal reconstructed by the inverse transform unit and the prediction block generated through prediction, thereby reconstructing the current block.

The filter 3706 performs additional filtering, such as deblocking filtering or sample adaptive offset (SAO), with respect to the entire picture after all blocks in the current picture are reconstructed, and the details thereof are the same as those described in the in-loop filter of the image encoding apparatus.

The memory 3707 may store the current block reconstructed through additional filtering by the in-loop filter after adding the residual signal generated by the inverse transform unit and the prediction block generated through prediction, and may be used to predict a next block or a next picture.

Figure 38:
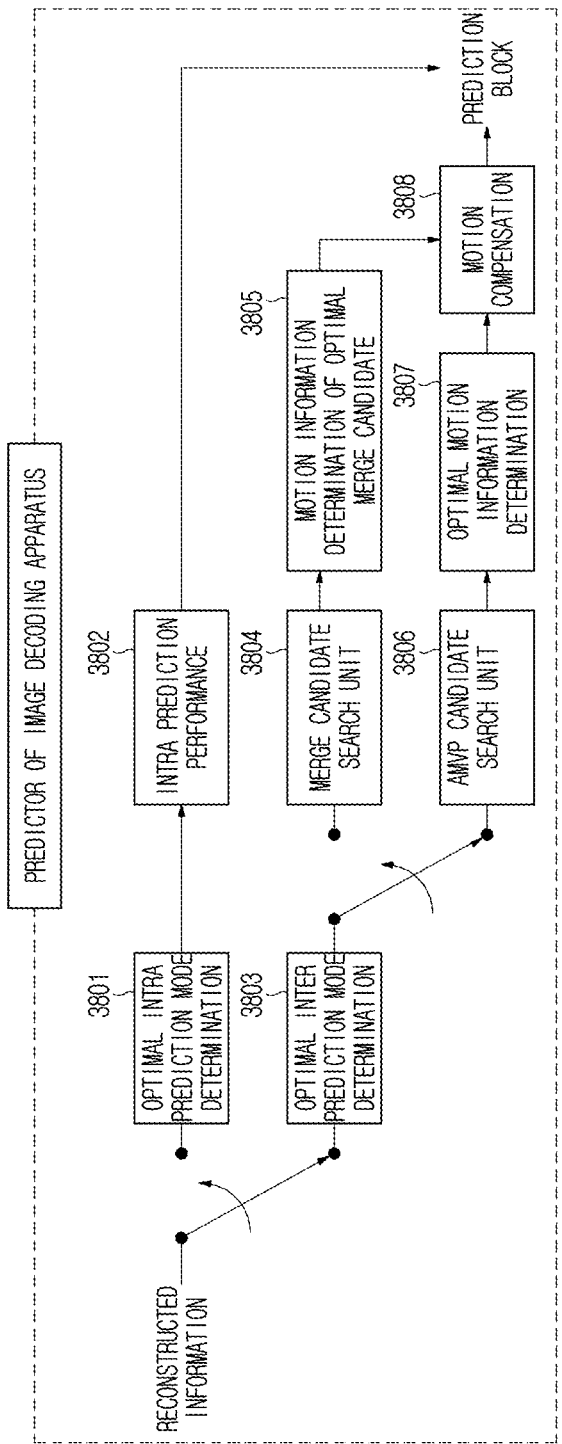
FIG. 38 is a view illustrating a predictor of an image decoding apparatus.

FIG. 38 is a flowchart illustrating a flow in the predictor of the image decoding apparatus.

Referring to FIG. 38, when the prediction mode is intra prediction, optimal intra prediction mode information may be determined (3801), and intra prediction may be performed (3802), thereby generating the prediction block.

When the prediction mode is inter prediction, an optimal prediction mode is determined from among the SKIP, MERGE and AMVP modes (3803). In addition, when decoding is performed in the SKIP mode or the MERGE mode, a candidate motion information set for the SKIP mode and the MERGE mode may be configured in the MERGE candidate search unit 3804. Optimal motion information may be determined from the candidate motion information set (3805).

When decoding is performed in the AMVP mode, a candidate motion information set for the AMVP mode may be configured in the AMVP candidate search unit 3806. Optimal motion information may be determined from the candidate motion information candidates using the transmitted MVP information (3807). Thereafter, motion compensation may be performed (3808) using the optimal motion information determined in each mode, thereby generating the prediction block.

Figure 39:
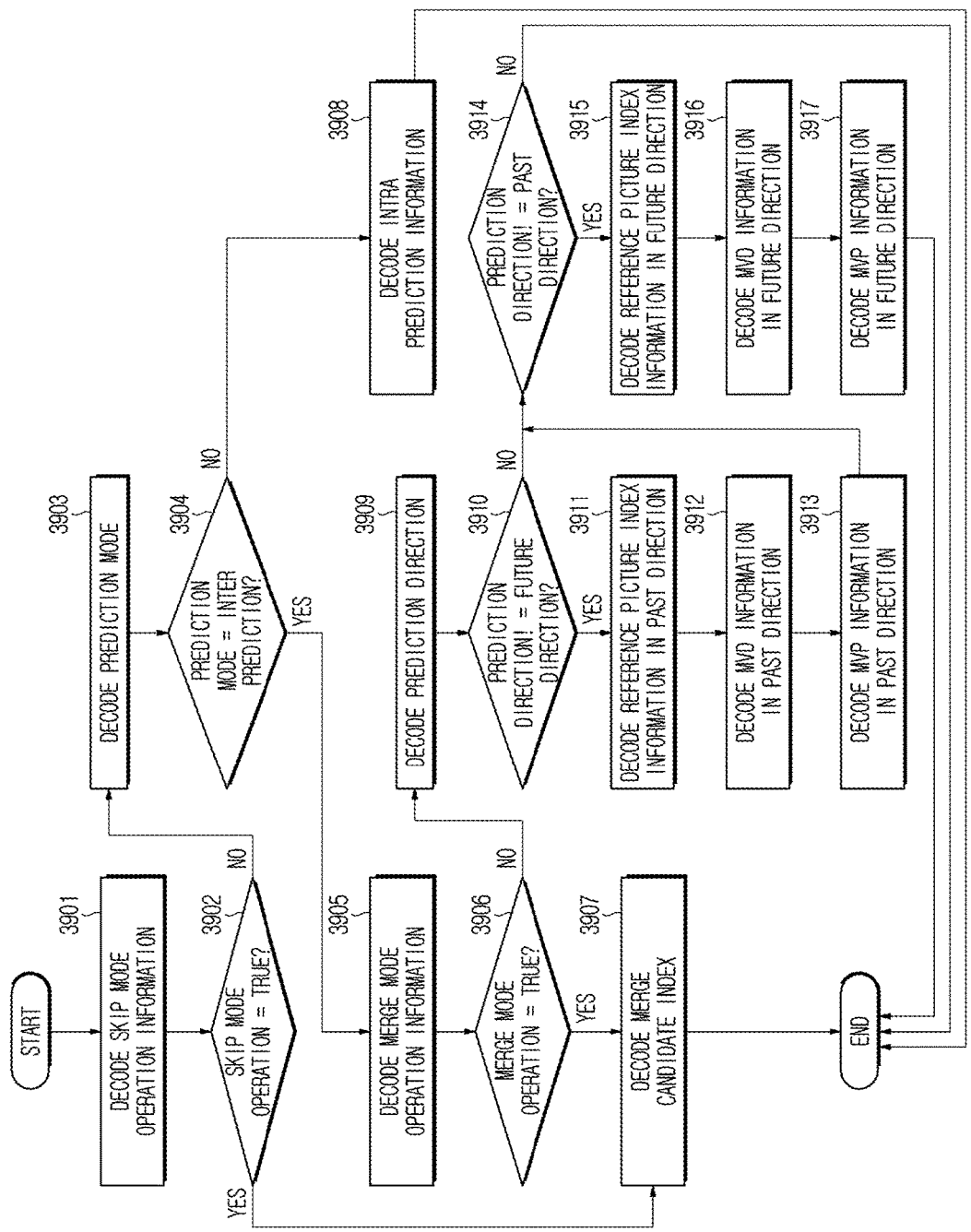
FIG. 39 is a flowchart illustrating a method of decoding prediction information.

FIG. 39 is a flowchart illustrating a decoding flow of coding information in the image decoding apparatus.

Referring to FIG. 39, in step S3901, operation information of the SKIP mode is decoded.

In addition, in step S3902, it is determined whether the SKIP mode operates. When the SKIP mode operates in step S3902, MERGE candidate index information for the SKIP mode may be decoded in step S3907 and then this flow may be finished.

On the contrary, when the SKIP mode does not operate in step S3902, the prediction mode is decoded in step S3903.

In addition, in step S3904, it is determined whether the prediction mode is an inter prediction or intra prediction mode. When the prediction mode is an intra prediction mode in step S3904, intra prediction mode information may be decoded in step S3908 and then this flow may be finished.

On the contrary, when the prediction mode is an inter prediction mode in step S3904, operation information of the MERGE mode is decoded in step S3605.

In addition, in step S3906, it is determined whether the MERGE mode operates. When the MERGE mode operates in step S3906, the MERGE candidate index information for the MERGE mode may be decoded in step S3907 and then this flow may be finished.

On the contrary, when the MERGE mode does not operate in step S3906, the prediction direction is decoded in step S3909. Here, the prediction direction may be one of the past direction, the future direction or both directions.

In addition, in step S3910, it is determined whether the prediction direction is a future direction. When the prediction direction is not a future direction in step S3910, reference picture index information in the past direction is decoded in step S3911. In addition, motion vector difference (MVD) information in the past direction is decoded in step S3912. In addition, in step S3913, motion vector predictor (MVP) information in the past direction is decoded.

Meanwhile, when the prediction direction is a future direction or both directions in step S3910 or when step S3913 is finished, it is determined whether the prediction direction is a past direction in step S3914. In addition, when the prediction direction is not the past direction in S3914, reference picture index information in the future direction is decoded in step S3915. In addition, in step S3916, the MVD information in the future direction is decoded. In step S3917, the MVP information in the future direction may be decoded and then this flow may be finished.

Hereinafter, various embodiments of the present invention will be described in greater detail with reference to the drawings.

The image encoding/decoding method according to one embodiment of the present invention may include a decoder-side motion vector derivation (DMVD) mode as an inter prediction mode.

The DMVD mode may mean a mode in which the image encoding apparatus does not transmit some or all motion information and the image decoding apparatus directly derives some or all motion information.

That is, the DMVD mode may mean a mode in which the image decoding apparatus derives motion information. Alternatively, the DMVD mode may mean a mode in which the image decoding apparatus corrects derived initial motion information based on the information transmitted from the image encoding apparatus.

Figure 40:
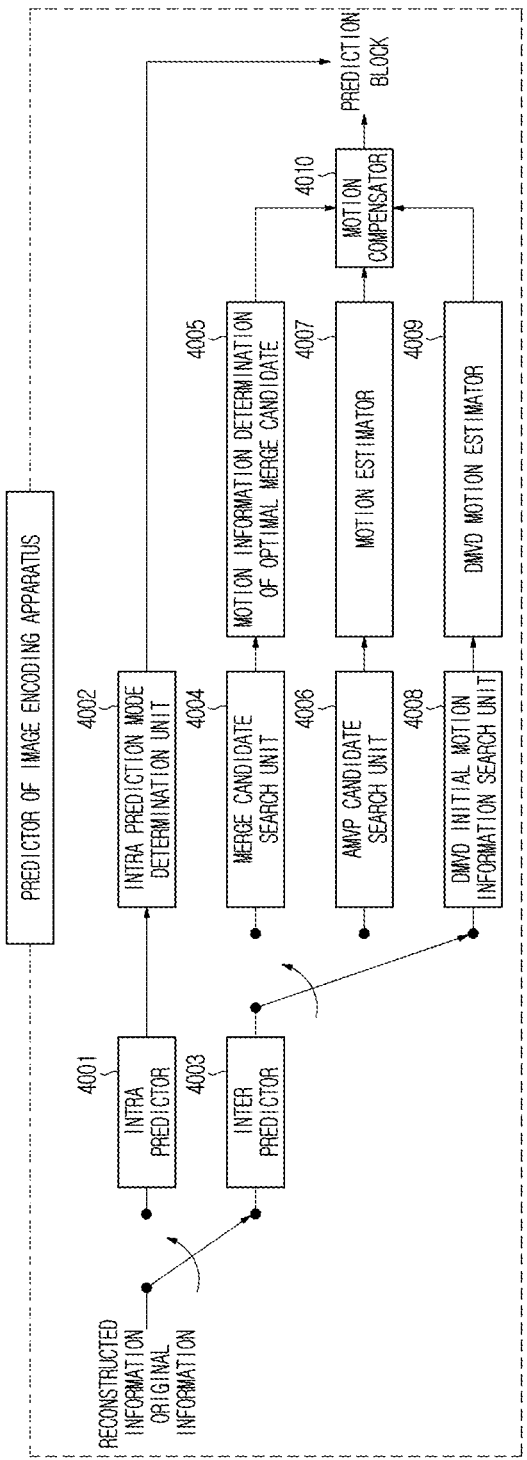
FIG. 40 is a view illustrating a predictor of an image encoding apparatus according to an embodiment of the present invention.

FIG. 40 is a view illustrating the predictor of the image encoding apparatus according to one embodiment of the present invention.

Referring to FIG. 40, processes 4001 to 4007 may be the same as the processes 3001 to 3007 of FIG. 30. That is, the prediction block may be generated using the optimal intra prediction mode determined through the processes 4001 to 4002 or motion compensation (4010) may be performed using the optimal motion information determined through the processes 4003 to 4007, thereby generating the prediction block.

The image encoding apparatus of FIG. 40 may perform a motion information determination method using a DMVD mode when inter prediction is additionally performed. In order to equally perform motion estimation in the image encoding/decoding apparatus, initial motion information may be determined (4008) using the motion information of the reconstructed region. In addition, optimal motion information may be determined by performing motion estimation (4009) using the determined initial motion information and the prediction block may be generated by performing motion compensation (4010) using the determined optimal motion information. Here, the motion information may include at least one of a motion vector, a reference picture index or prediction direction information.

Figure 41:
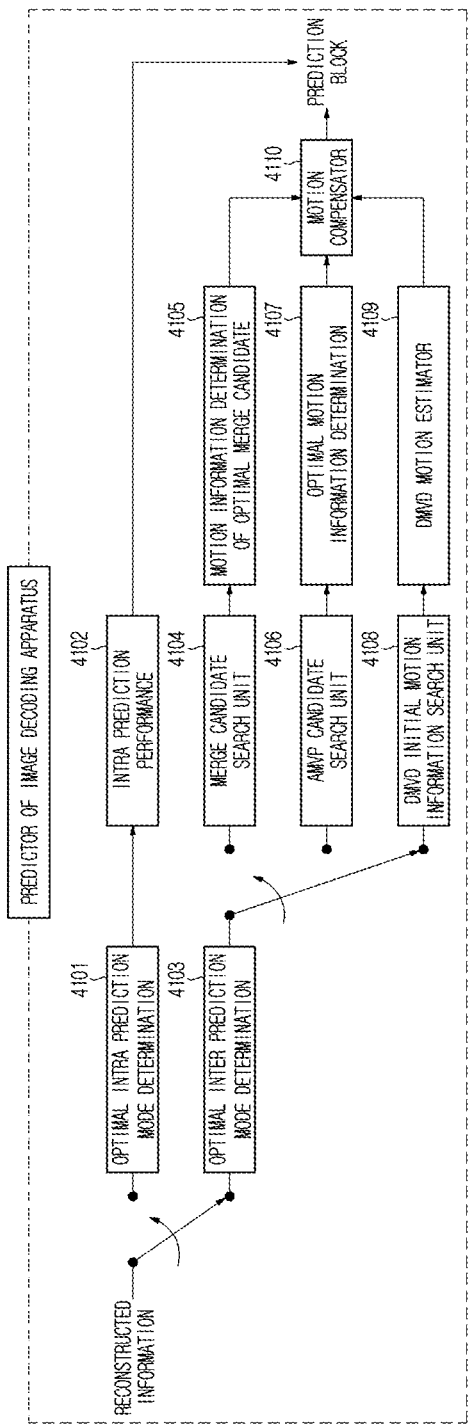
FIG. 41 is a view illustrating a predictor of an image decoding apparatus according to an embodiment of the present invention.

FIG. 41 is a view illustrating a predictor of an image decoding apparatus according to one embodiment.

Referring to FIG. 41, processes 4101 to 4107 may be the same as the processes 3801 to 3807 of FIG. 38. The prediction block may be generated using the intra prediction mode determined through the processes 4101 to 4102 or the prediction block may be generated by performing motion compensation (4110) using the motion information determined through the processes 4103 to 4107.

The image decoding apparatus of FIG. 41 may perform a motion information determination method using a DMVD mode when inter prediction is additionally performed. In order to equally perform motion estimation in the image encoding/decoding apparatus, initial motion information may be determined (4108) using the motion information of the reconstructed region. In addition, motion information may be determined by performing motion estimation (4109) using the determined initial motion information and the prediction block may be generated by performing motion compensation (4010) using the determined motion information. That is, in the case of the DMVD mode, the image decoding apparatus may derive the motion information used for motion compensation by correcting the initial motion information without signaling information.

Meanwhile, the DMVD initial motion information search unit 4108 of FIG. 41 may determine the motion information of the MERGE candidate derived in the processes 4104 to 4105 as DMVD initial motion information or determine the motion information derived in the processes 4106 to 4107 as DMVD initial motion information.

FIG. 42 is a view illustrating the DMVD initial motion information search units 4008 and 4108.

Referring to the table of FIG. 42, the index of the table of FIG. 42 may mean initial motion information priority. At least one of the candidate motion information of the SKIP mode, the candidate motion information of the AMVP mode, the candidate motion information of the MERGE mode, the motion information of the sub block in the reconstructed region in the top, left, top left, top right and bottom left directions around the current block or zero motion information may be used as initial motion information. In addition, various motion information candidates derived using the reconstructed information may be used.

The initial motion information may be derived using the inter prediction mode such as the SKIP mode, the AMVP mode or the MERGE mode described with respect to FIGS. 31 to 35.

Figure 43:
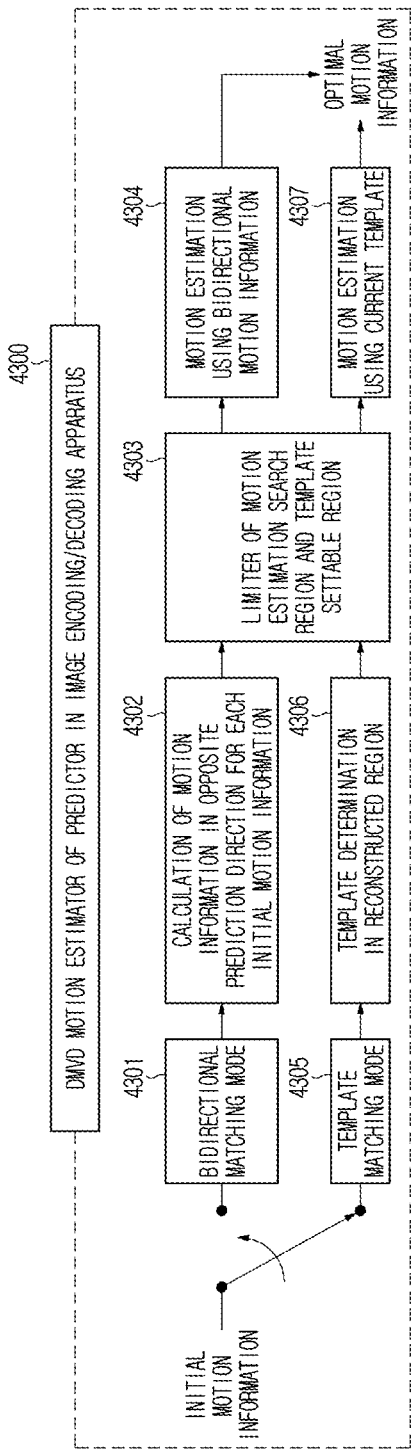
FIG. 43 is a view illustrating a DMVD motion estimator of a predictor of an image encoding/decoding apparatus according to an embodiment of the present invention.

FIG. 43 is a view illustrating the DMVD motion estimators 4009 and 4109 of the predictors of the image encoding/decoding apparatus.

The image encoding apparatus may determine optimal motion information, after performing the DMVD mode using the initial motion information determined in the DMVD initial motion information search unit.

The image decoding apparatus may determine motion information to be used for motion compensation, after performing the DMVD mode using the initial motion information determined in the DMVD initial motion information search unit. Here, performing the DMVD mode may mean that initial motion information is corrected.

The DMVD mode may include a mode which uses a template (hereinafter referred to as a "template matching mode") and a mode which does not use a template (hereinafter referred to as a "bidirectional matching mode").

When the bidirectional matching mode is used (4301), a unidirectional motion vector of each initial motion information may be linearly scaled to a reference picture in an opposite prediction direction. Here, scaling of the motion vector may be performed in proportion to a distance between a current picture and a reference picture in each direction. After the motion vector is bidirectionally determined (4302), the motion vector in each direction in which a difference between prediction blocks in the past and future directions is minimized may be determined (4304) as optimal motion information.

Meanwhile, when the initial motion information is bidirectional motion information having both the motion information in the past direction and the motion information in the future direction, motion information in which the difference between the prediction blocks indicated by the motion information in each direction is minimized may be determined (4304) as optimal motion information.

For example, a motion vector in which the difference between the prediction block indicated by the initial motion vector in the past direction and the prediction block indicated by the initial motion vector in the future direction is minimized may be determined as an optimal motion vector. Here, the determined optimal motion vector may be used as the motion information of the current block.

Figure 45:
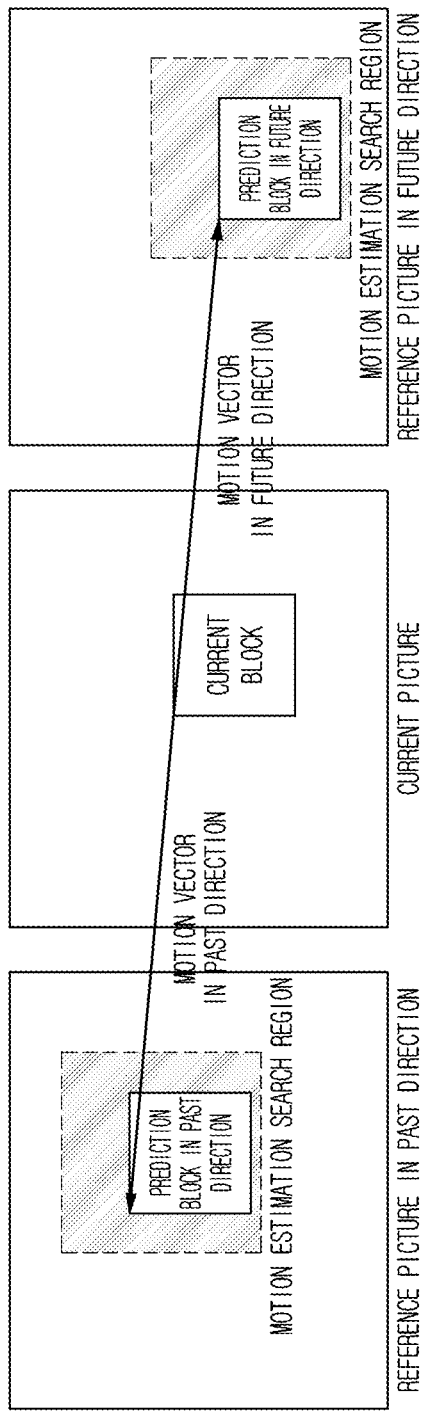
FIG. 45 is a view illustrating a bidirectional matching mode of a DMVD mode according to an embodiment of the present invention.

FIG. 45 is a view illustrating a method of searching for a motion vector based on the prediction blocks indicated by the motion vectors in the past and future directions of the current block in the bidirectional matching mode. A point where the difference between the prediction blocks in the respective directions of FIG. 45 is minimized may be searched and the motion vectors in the respective directions may be corrected to indicate the searched point. At this time, the corrected motion vector may be used as an optimal motion vector or a motion vector used for motion compensation (or inter prediction).

Figure 44:
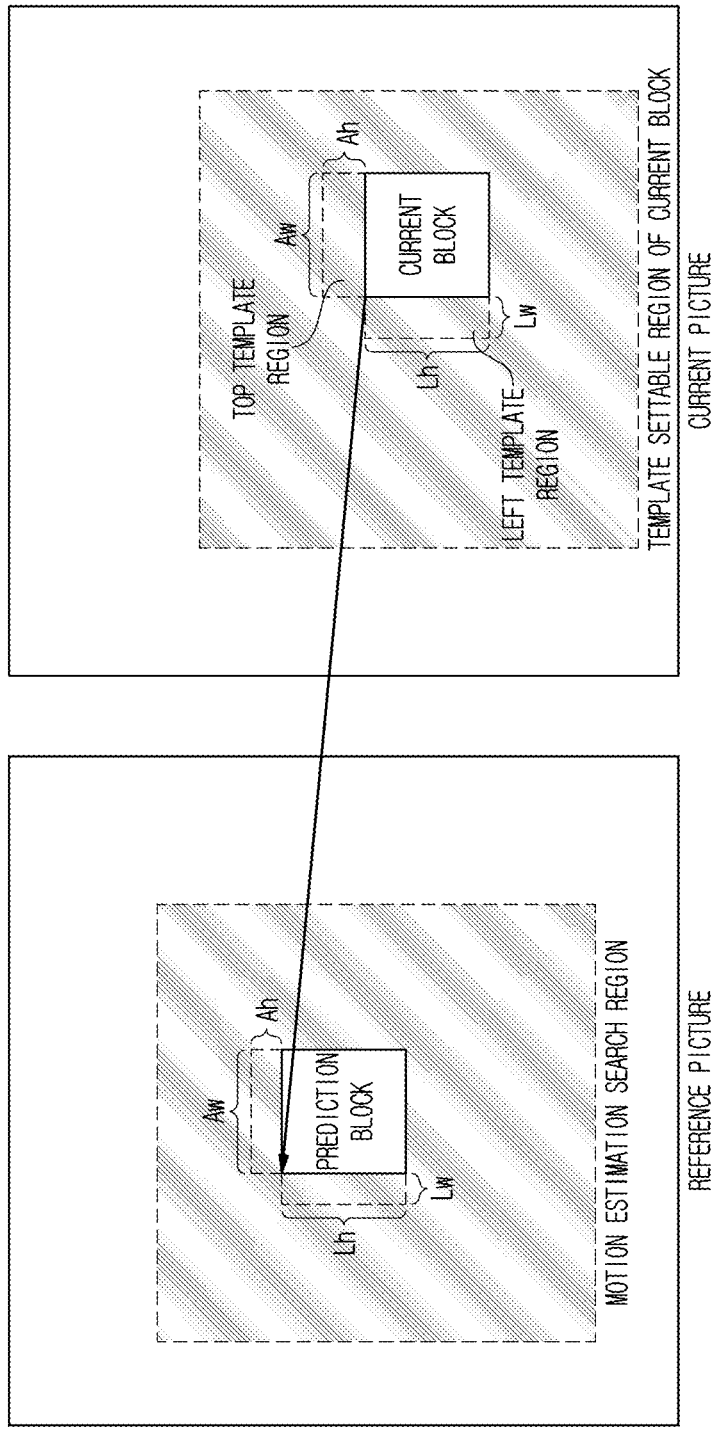
FIG. 44 is a view illustrating a template matching mode of a DMVD mode according to an embodiment of the present invention.

When the template matching mode is used (4305), a template region may be determined in the reconstructed region (4306). The size and shape of the template block may be determined using various methods such as determination of the reconstructed region on the left and top sides adjacent to the current block as the template block. Optimal motion information may be determined through motion estimation (4307) using the template block. FIG. 44 is a view illustrating a method of searching for the prediction block of a template block most similar to the template block in the template matching mode and then determining a block adjacent to the template block as the prediction block of the current block.

In the process of searching for the optimal motion information of the bidirectional matching mode and the template matching mode, search patterns may be variously determined. Here, the process of searching for the optimal motion information may be a motion estimation process.

Figure 46:
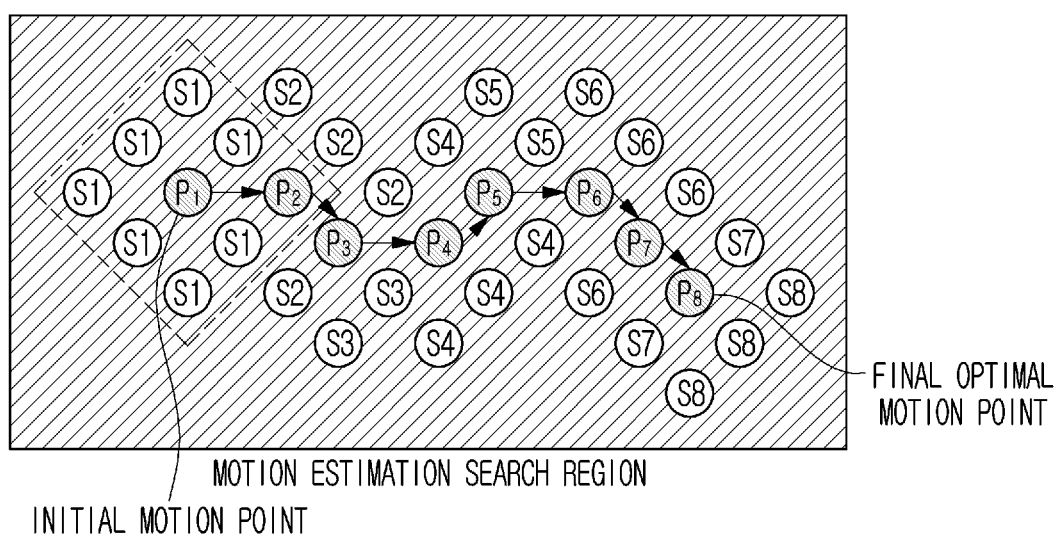
FIG. 46 is a view illustrating a motion estimation method of a DMVD mode according to an embodiment of the present invention.

FIG. 46 is a view showing a search process with a diamond-shaped search pattern.

Referring to FIG. 46, P1 is a search starting point and the cost value of motion estimation may be calculated with respect to pixels S1 located in the diamond shape including P1. Here, P1 may be determined based on initial motion information.

After calculation thereof, the cost value of motion estimation may be calculated with respect to pixels S2 located in the diamond shape again based on a point P2 having a smallest cost value and a point P3 having a smallest cost value may be determined. By repeating the above-described process, the above process may be performed in the search region and the search process may be performed until the cost value of the center pixel located in the diamond shape is minimized, thereby determining motion information indicating an optimal point as the motion information of the template matching mode or the bidirectional matching mode. Meanwhile, in FIG. 46, the process of searching for the point having the minimum cost value in the search pattern may be repeated by a predefined number.

As shown in FIGS. 44 and 45, when the optimal motion information is searched (or motion estimation) in the bidirectional matching mode and the template matching mode, the search region (or the motion estimation region) in the reference picture may be limited (4303).

In particular, when the template matching mode is performed, the template settable region (hereinafter referred to as a "template estimation region") of the current block in the current picture may be limited (4303).

In the image decoding apparatus, if search is repeated until the optimal motion point is found without limiting the search region, computational complexity of the image decoding apparatus is inevitably high. In addition, if the template estimation region is not limited, since the parallel processing design of the current picture is difficult, it is necessary to increase the processing speed by limiting the template estimation region.

Limitation may be set such that the prediction block in the past/future direction should not be out of the motion estimation region in the case of the bidirectional matching mode and the template block of the prediction block in the reference picture should not be out of the motion estimation region in the case of the template matching mode. In addition, in the template matching mode, limitation may be set such that the template block of the current block in the current picture should not be out of the template estimation region.

Meanwhile, the search region may be set to a window (I×J) having an arbitrary size. The size of this window may be changed according to the distance between the current picture and the reference picture and the size of this window may be transmitted in an upper header (video parameter end, sequence parameter end, picture parameter end, slice end, etc.).

In addition, the search region may equally use the size preset in the image encoding apparatus and the image decoding apparatus.

In addition, the search region cannot be determined by invading the portioning boundary determined in the upper header such as a slice and a tile.

However, in the case of the bidirectional matching mode, since it is assumed that the motion vector has a linear direction for each direction, the search region may differ between directions.

In addition, the search region may be determined as a maximum coding block including the current block.

Meanwhile, like the search region, a window K×L having an arbitrary size may be set and determined as a template estimation search region. The size of this window may be transmitted in the upper header and a preset size may be equally used in the image encoding/decoding apparatus. In addition, determination may not be made by invading the partitioning boundary determined in the upper header such as a slice and a tile. A template region which is not included in the template estimation region may not be used as the template of the template matching mode.

A cost value of a motion information search process means a sum of the amount of prediction error and the virtual bit amount of motion information. Prediction error may be obtained through various calculation methods such as SAD (Sum of Absolute Difference), SATD (Sum of Absolute Hadamard Transform Difference), SSD (Sum of Square Difference), etc. Equations 10, 11 and 12 show calculation methods of SAD, SATD and SSD, respectively.

$$SAD = \sum_{i,j}|(Diff(i, j)|, \quad Diff(i, j) = Template(i, j) - PredBlk(i, j) \quad \text{Equation 10}$$

$$SATD = \sum_{i,j}\frac{|(Diff(i, j)|}{2}, \quad DiffT(i, j) = HT(Template(i, j) - PredBlk(i, j)) \quad \text{Equation 11}$$

$$SSD = \sum_{i,j}(Diff(i, j)^2, \quad Diff(i, j) = Template(i, j) - PredBlk(i, j) \quad \text{Equation 12}$$

i and j denote locations of pixels, Template(i, j) denotes the pixel of the template block, and PredBlk(i, j) denotes the pixel of the prediction block. Here, the HT( ) function of Equation 4 means a function value obtained by Hadamard-transforming a difference value block between the template block and the prediction block. The virtual bit amount of the motion information is not actually transmitted information, but the virtual bit amount of the motion information which is equally expected in the image encoding apparatus and the image decoding apparatus. For example, a difference vector size of a motion vector in motion information which is currently being subjected to motion estimation and a motion vector of initial motion information may be calculated and determined as a virtual bit amount. In addition, a motion information virtual bit amount may be calculated using a bit amount for reference picture information.

Figure 47:
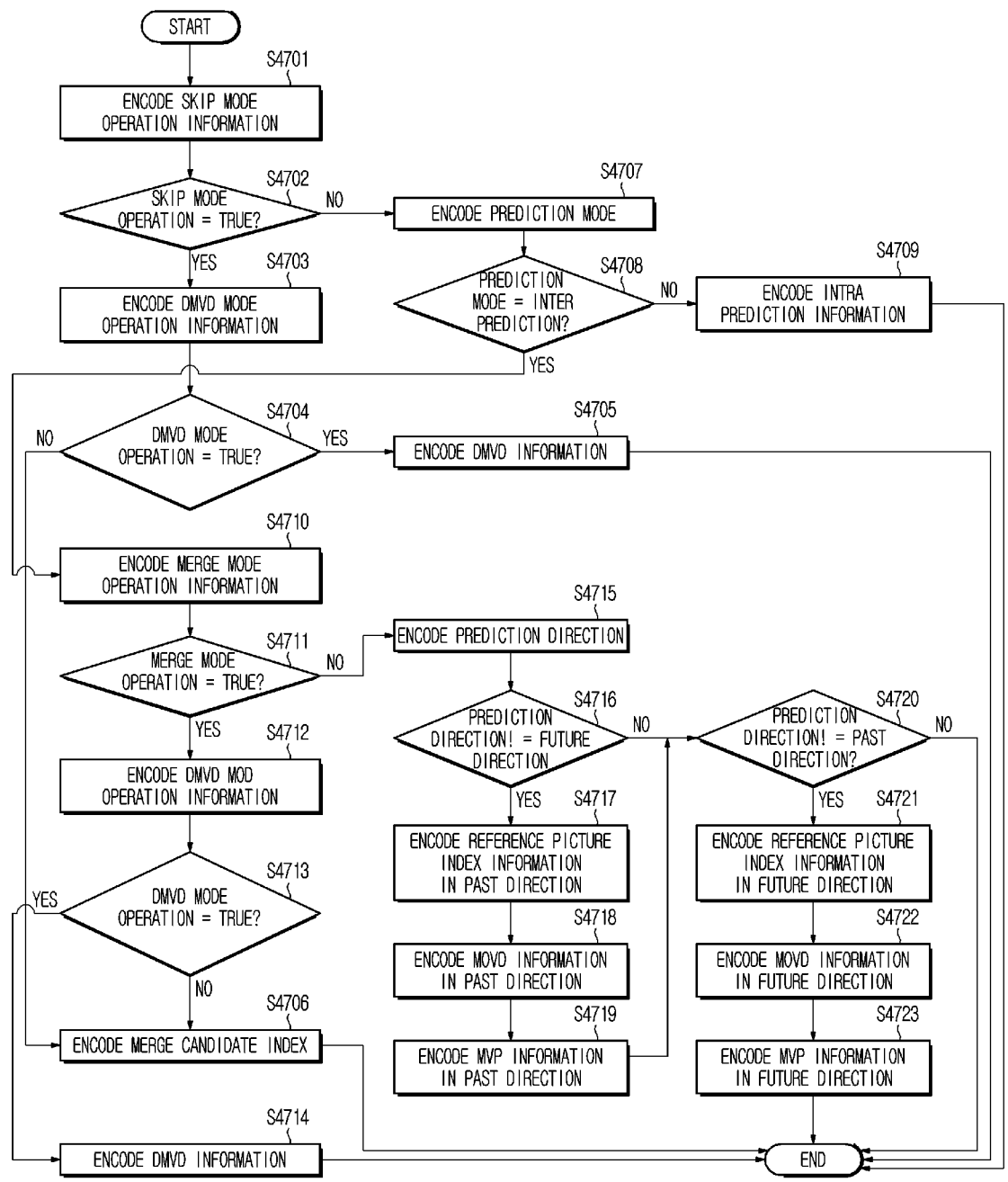
FIG. 47 is a flowchart illustrating an encoding flow of prediction mode according to an embodiment of the present invention.

FIG. 47 is a flowchart illustrating a process of encoding coding information according to one embodiment.

Referring to FIG. 47, in step S4701, operation information of the SKIP mode is encoded. In step S4702, it is determined whether the SKIP mode operates. When the SKIP mode operation is true in step S4702, operation information of the DMVD mode is encoded in step S4703. In step S4704, it is determined whether the DMVD mode operates. When operation of the DMVD mode is true in step S4704, the DMVD information is encoded in step S4705 and then this flow is finished. Here, the DMVD information means flag information indicating a bidirectional matching mode or a template matching mode. If all the top/left template blocks around the current block are not included in the template estimation region, the DMVD information is not encoded and the DMVD information is determined to be in a bidirectional matching mode. When operation of the DMVD mode is false in step S4704, MERGE candidate index information for the SKIP mode is encoded in step S4706 and then this flow is finished. When operation of the SKIP mode is false in step S4702, prediction mode information is encoded in step S4707. In step S4708, it is determined whether the prediction mode is inter prediction. When the prediction mode is not an inter prediction mode but is an intra prediction mode in step S4708, the intra prediction information is encoded in step S4709 and then this flow is finished. When the prediction mode is inter prediction in step S4708, operation information of the MERGE mode is encoded in step S4710. It is determined whether the MERGE mode operates in step S4711. When operation of the MERGE mode is true in step S4711, DMVD mode operation information is encoded in step S4712. When operation of the DMVD mode is true in step S4713, DMVD information is encoded in step S4714 and then this flow is finished. When operation of the DMVD mode is false in step S4713, MERGE candidate index information for the MERGE mode is encoded in step S4706 and then this flow is finished. When operation of the MERGE mode is false in step S4711, steps S4715 to S4723 are performed, which are the same as steps S3609 to S3617 of FIG. 36. After step S4723 is finished, this flow is finished.

Figure 48:
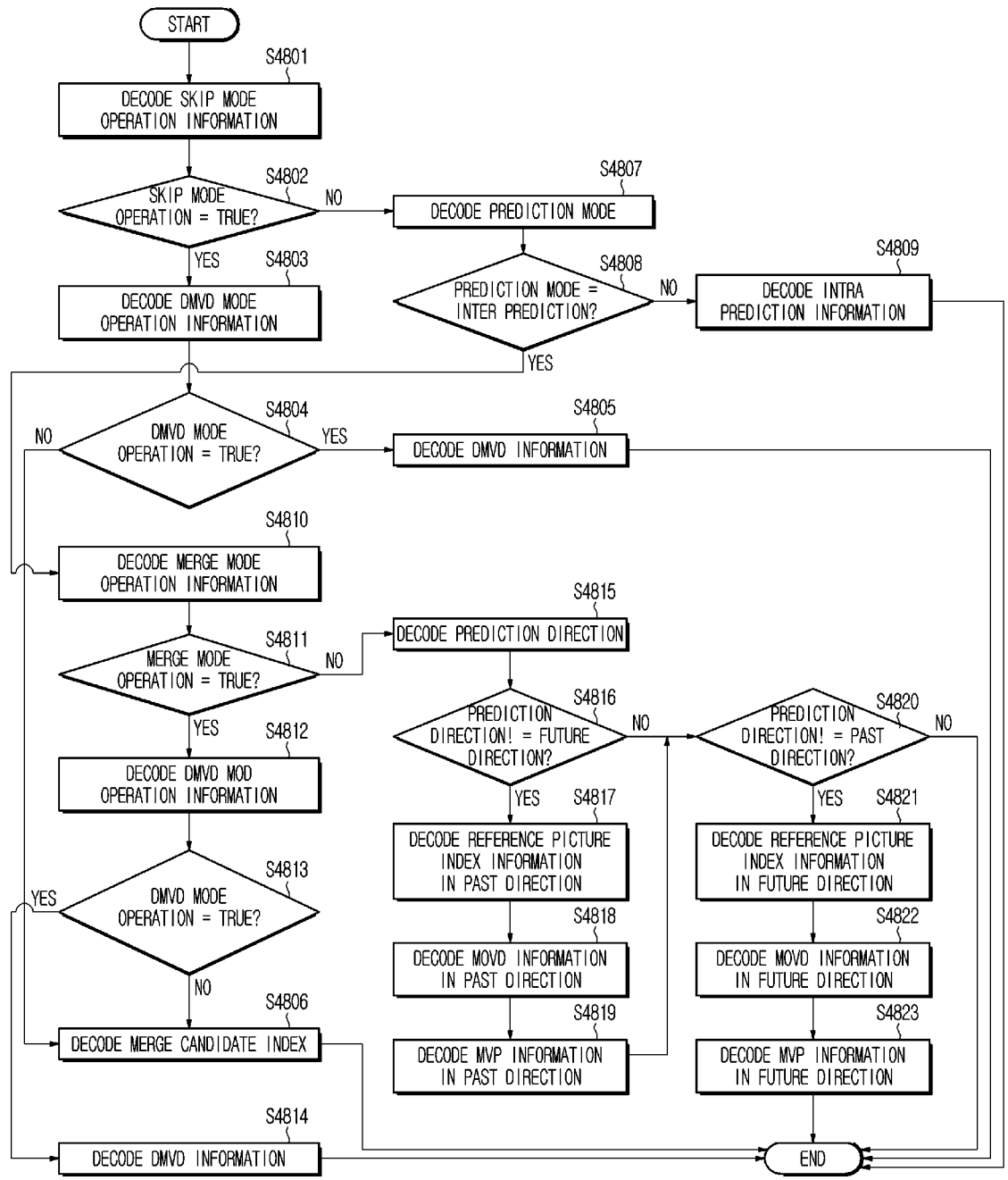
FIG. 48 is a flowchart illustrating a decoding flow of prediction mode according to an embodiment of the present invention.

FIG. 48 is a flowchart illustrating a process of decoding coding information according to one embodiment.

Referring to FIG. 48, in step S4801, operation information of the SKIP mode is decoded. In step S4802, it is determined whether the SKIP mode operates. When operation of the SKIP mode is true in step S4802, operation information of the DMVD mode is decoded in step S4803. In step S4804, it is determined whether the DMVD mode operates. When operation of the DMVD mode is true in step S4804, DMVD information is decoded in step S4805 and then this flow is finished. When operation of the DMVD mode is false in step S4804, MERGE candidate index information for the SKIP mode is decoded in step S4806 and then this flow is finished. When operation of the SKIP mode is false in step S4802, prediction mode information is decoded in step S4807. In step S4808, it is determined whether the prediction mode is inter prediction. When the prediction mode is not an inter prediction mode but is an intra prediction mode in step S4808, the intra prediction information is decoded in step S4809 and then this flow is finished. When the prediction mode is inter prediction in step S4808, MERGE mode operation information is decoded in step S4810. In step S4811, it is determined whether the MERGE mode operates. When operation of the MERGE mode is true in step S4811, DMVD mode operation information is decoded in step S4812. When operation of the DMVD mode is true in steps 4813, DMVD information is decoded in step S4814 and then this flow is finished. When operation of the DMVD mode is false in step S4813, MERGE candidate index information for the MERGE mode is decoded in step S4806 and then this flow is finished. When operation of the MERGE mode is false in step S4811, steps S4815 to S4823 are performed, which are the same as steps S3909 to S3917 of FIG. 39. After step S4823 is finished, this flow is finished.

Hereinafter, in the present embodiment, when the template region is determined in the reconstructed region around the current block, only a single template block is not used, but a plurality of sub template blocks may be used. A method of deriving the motion information of each sub template block using the above-described template matching mode and using the motion information as candidate motion information for the SKIP, MERGE and AMVP modes will be described.

Figure 49:
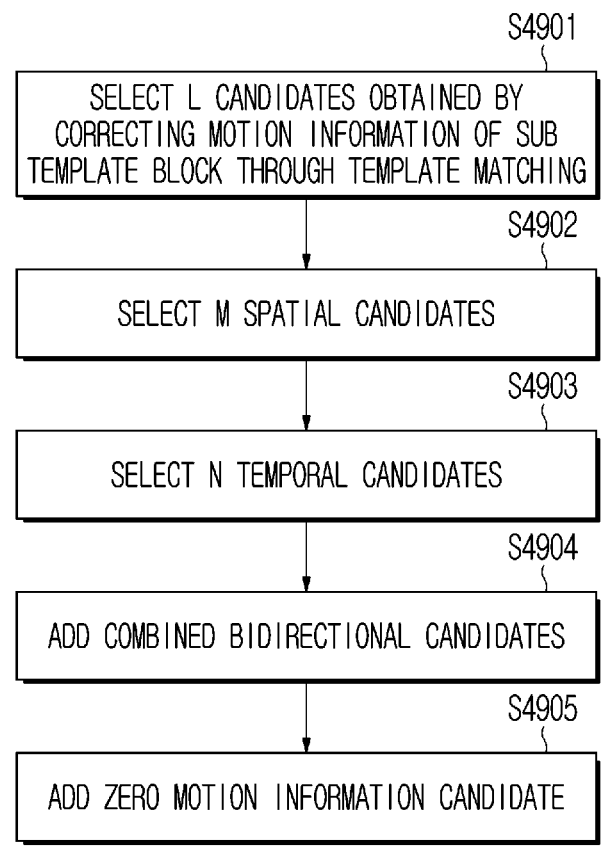
FIG. 49 is a view illustrating a method of using optimal motion information of a template matching mode according to an embodiment of the present invention as candidate motion information of SKIP and MERGE modes.

FIG. 49 is a flowchart illustrating a candidate motion information derivation method for SKIP and MERGE modes using a template matching mode according to an embodiment of the present invention.

Referring to FIG. 49, in step S4901, using motion information reconstructed in a sub template block as initial motion information, optimal motion information of the sub template block is derived through the processes 4305, 4306, 4303 and 4307 of FIG. 43. At this time, the number of sub template blocks may be L (L being an integer ≥1).

Figure 51:
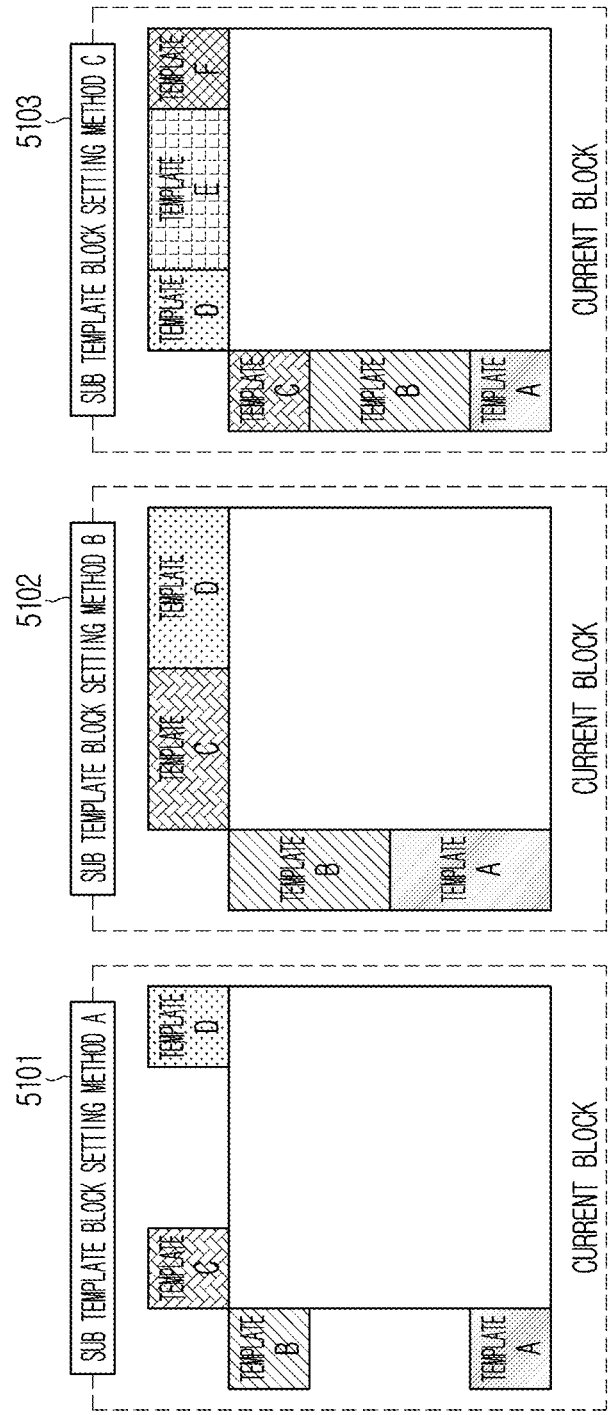
FIG. 51 is a view illustrating a motion information determination method using a plurality of templates when deriving optimal motion information of a template matching mode according to an embodiment of the present invention.

FIG. 51 is a view showing an example of determining a sub template block in a reconstructed region around a current block.

Referring to FIG. 51, the sub template block may be set like examples of 5101 to 5103.

In 5101 of FIG. 51, the sub template block is determined in the bottom left (Template A), top left (Template B), top left (Template C) and top right (Template D) of the current block. The size and shape of each sub template block may be variously determined.

In 5102 of FIG. 51, similarly to the method of 5101, the sub template block may be determined in the bottom left (Template A), top left (Template B), top left (Template C) and top right (Template D) of the current block. However, both the left and top reconstructed regions adjacent to the current block are used unlike 5101.

5103 of FIG. 51 shows a method of generating a sub template block in consideration of both the sub template block generation methods of 5101 and 5102.

The sub template block may be generated in the reconstructed region around the current block using various methods such as a method of determining and using the left and top reconstructed regions adjacent to the current block as one sub template block.

In step S4902, M (M being an integer ≥1) spatial candidates are selected. The generation method is equal to step S3101 of FIG. 31. In step S4903, N (N being an integer ≥1) temporal candidates are selected. The generation method is equal to step S3102 of FIG. 31. Steps S4904 and S4905 are equal to steps S3103 and S3104 of FIG. 31. In this flowchart, the order of steps may be changed. In addition, when the previously derived motion information is the same as the currently derived motion information for each step, the overlapping candidate may be removed.

Figure 50:
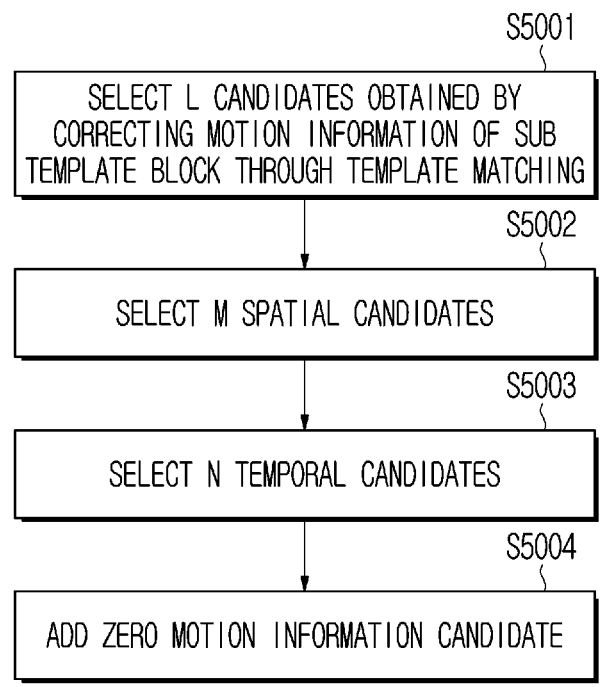
FIG. 50 is a view illustrating a method of using optimal motion information of a template matching mode according to an embodiment of the present invention as candidate motion information of an AMVP mode.

FIG. 50 is a flowchart illustrating a candidate motion information derivation method for an AMVP mode using a template matching mode according to an embodiment of the present invention.

Referring to FIG. 50, the description of step S5001 is equal to the description of step S4901 of FIG. 49. In step S5002, M (M being an integer ≥1) spatial candidates are selected. The generation method is equal to step S3201 of FIG. 32. In step S5003, N (N being an integer ≥1) temporal candidates are selected. The generation method is equal to step S3202 of FIG. 32. Step S5004 is equal to step S3204 of FIG. 32. In this flowchart, the order of steps may be changed. In addition, when the previously derived motion information is the same as the currently derived motion information for each step, the overlapping candidate may be removed.

Hereinafter, in the present embodiment, a method of deriving corrected candidate motion information of the SKIP and MERGE modes using a DMVD mode (template matching mode or bidirectional matching mode) and a method of realigning the candidate motion information of the SKIP and MERGE modes using the cost value of the template matching mode will be described.

FIG. 52 is a table illustrating a method of correcting the candidate motion information of the SKIP and MERGE modes using a DMVD mode.

Referring to FIG. 52, in Table 5201 of FIG. 52, the candidate motion information of the SKIP and MERGE modes is derived using the method of FIG. 31 or 49. In this example, the number of pieces of candidate motion information is 5. The derived candidate motion information may have motion information in the past/future direction.

For each candidate motion information, the corrected motion information may be obtained through the process of FIG. 43. In Table 5202 of FIG. 52, some of the candidate motion information of Table 5201 was corrected. Here, although correction of all candidate motion information may be performed, only several pieces of candidate motion information may be corrected. For example, some candidate motion information having high priority may be corrected.

In Table 5202 of FIG. 52, three pieces of upper candidate motion information were corrected. In Table 5202 of FIG. 52, candidate motion information 1 and 3 was corrected, but candidate motion information 2 was not corrected. This may mean that candidate motion information 2 did not need to be corrected. As in the example of candidate motion information 1, only a motion vector of the motion information may be corrected and, as in candidate motion information 3, up to a motion vector and a reference picture index of the motion information may be corrected.

The candidate motion information corrected using the DMVD mode may be used for motion compensation of the current block. In addition, the candidate motion information corrected using the DMVD mode may be stored for a block encoded/decoded after the current block. In this case, the candidate motion information corrected using the DMVD mode may be used to derive the motion information of the block encoded/decoded after the current block.

Figure 53:
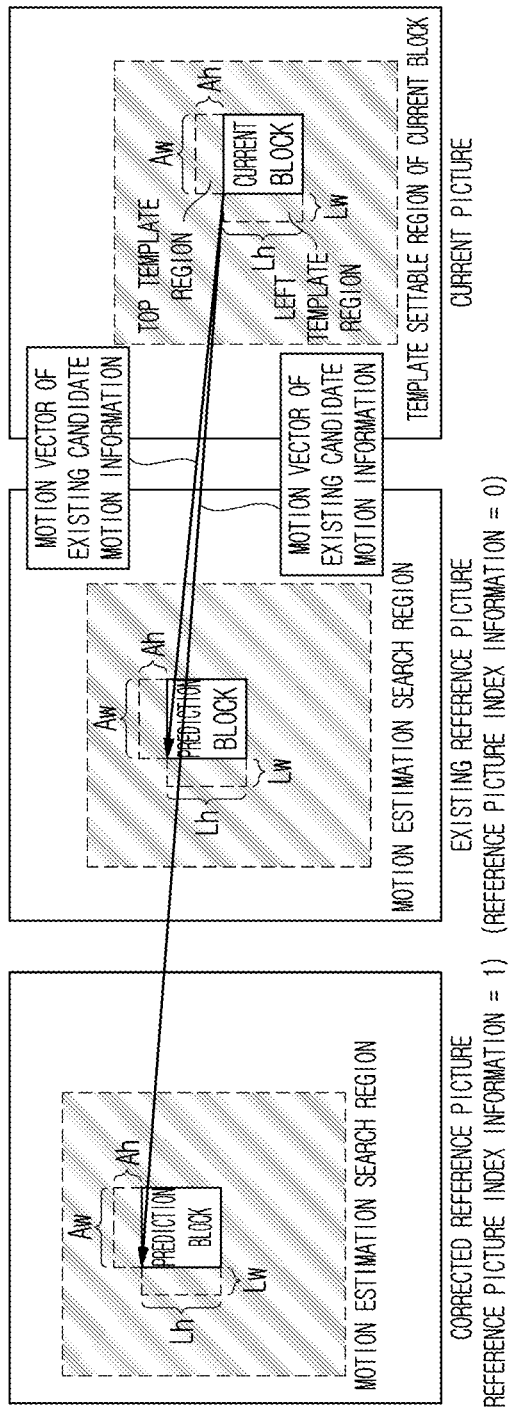
FIG. 53 is a view illustrating a method of changing a reference picture when correcting candidate motion information of SKIP and MERGE modes according to an embodiment of the present invention.

Meanwhile, when the reference picture is changed, in the process 4304 of FIG. 43, motion estimation search region may be different from that of the original reference picture. For example, referring to FIG. 53, when the existing candidate motion information of the SKIP and MERGE modes is corrected using the template matching mode, the reference picture may also be corrected. At this time, motion estimation search region may also be changed, which may move motion estimation search region according to the linear direction of the motion vector. When the reference picture is further away from the current picture, it is possible to further enlarge or reduce the motion estimation search region including the current motion estimation search region.

FIG. 54 is a table illustrating a method of realigning candidate motion information of SKIP and MERGE modes using a template matching mode.

In Tale 5401 of FIG. 54, the candidate motion information of the SKIP and MERGE modes is derived using the method of FIG. 31 or 49, similarly to Table 5201 of FIG. 52.

In Table 5402 of FIG. 54, a template matching mode cost value (hereinafter referred to as a "cost value") is calculated using the candidate motion information derived in Table 5401. In Table 5402, the candidate motion information is realigned in the ascending order of the cost value. If the candidate motion information has both past and future motion information, the cost value is calculated using the candidate motion information for each direction and an average cost value for each direction is determined as the cost value of the candidate motion information. Alternatively, for each direction, the cost value of the candidate motion information having a low cost value may be determined as the cost value of the candidate motion information.

Referring to FIG. 32, among the candidate motion information of the AMVP mode, MVP information which is optimal candidate motion information may be encoded by the entropy encoding unit and decoded by the entropy decoding unit. Using the template matching mode, for each candidate motion information of the AMVP mode, the template matching mode cost value is calculated in the same manner as described above. Thereafter, the template matching mode cost value may be aligned in ascending order, and candidate motion information having a lowest cost value may be determined as MVP information. In this case, the image decoding apparatus may reconstruct the MVP information without encoding the MVP information in the entropy encoding unit.

Hereinafter, in the present embodiment, a weighted cost value calculation method according to a template region when a template matching mode cost value is calculated in a template matching mode commonly described in the above-described embodiments will be described.

Figure 55:
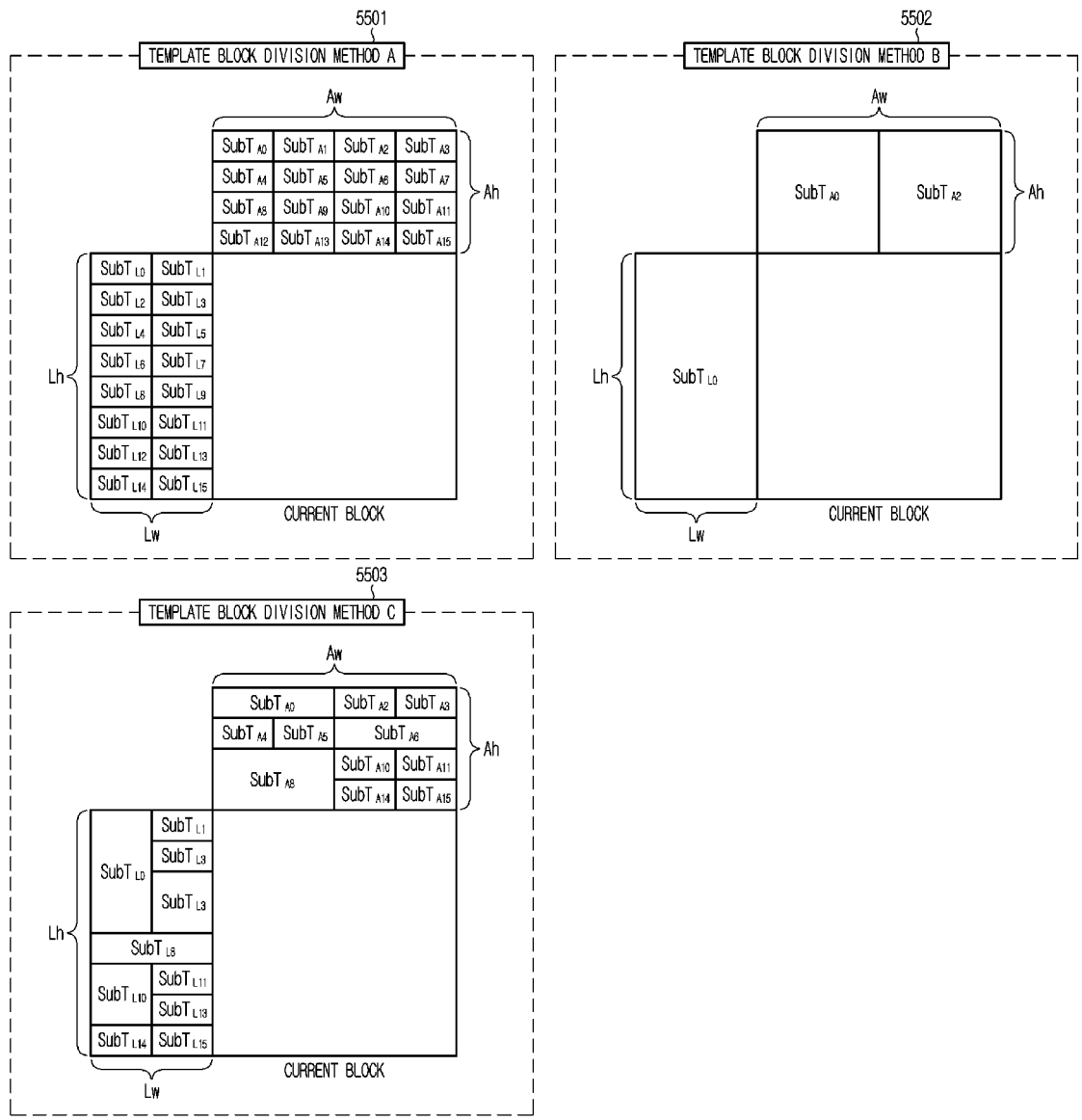
FIG. 55 is a view illustrating a method of changing a weight of a cost value per sub template by dividing a template of a template matching mode according to an embodiment of the present invention into sub templates.

FIG. 55 is a view illustrating a method of dividing a template of a template matching mode according to an embodiment of the present invention into sub templates to change the weight of the cost value for each sub template.

The weight of the cost value calculated for each sub template may be changed. Equation 13 is a generalized equation for calculating a cost value.

$$TempDist = \sum_{i=0}^{N} W_i \times SubTempDist_i \qquad \text{Equation 13}$$

In Equation 13, TempDist denotes the amount of prediction error among the cost values of motion estimation in the template matching mode. The amount of prediction error is calculated as a sum of a product of $SubTempDist_i$ and $W_i$ which is the weight of the sub template block. i denotes the index information of the sub template block.

5501 of FIG. 55 is an example in which the template block is composed of sub template blocks having the same size. The sizes of the sub template blocks are the same and may be variously set.

5502 of FIG. 55 is an example in which the template block is composed of sub templates based on the actual division boundary line of the reconstructed block.

5503 of FIG. 55 is an example in which the template block is composed of sub template blocks having similar reconstruction pixel characteristics. Here, the reconstruction pixel characteristics may be a reconstructed pixel value or motion information of a reconstructed pixel. In addition, the template block may be composed of sub template blocks using various methods.

The weight for the amount of prediction error may be changed according to the determined location of the sub template block.

In the weight determination method according to one embodiment of the present invention, the weight for the amount of error decreases as the sub template block is close to the pixel located at the top left of the current block and increases as the sub template block is away from the pixel located at the top left of the current block, and vice versa.

In the weight determination method according to another embodiment of the present invention, the weight of each sub template block is changed according to the degree of similarity between the motion information of each sub template block and the motion information which is currently being subjected to motion estimation. The weight may decrease as the degree of similarity increases and increase as the degree of similarity decreases, and vice versa.

Figure 56:
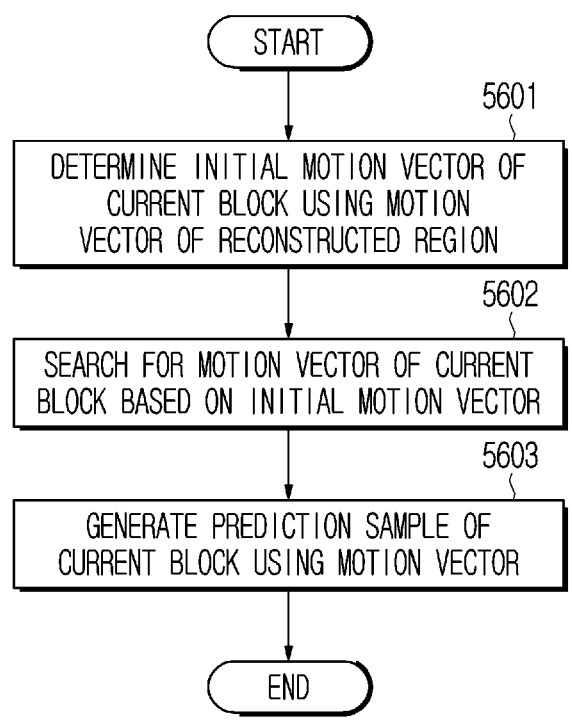
FIG. 56 is a flowchart illustrating an image encoding method according to an embodiment of the present invention.

FIG. 56 is a flowchart illustrating an image decoding method according to an embodiment of the present invention.

Referring to FIG. 56, the image decoding apparatus may determine an initial motion vector of a current block using a motion vector of a reconstructed region (5601).

Here, the initial motion vector may include a motion vector in a past direction and a motion vector in a future direction. That is, the initial motion vector may be motion information of bidirectional prediction.

Meanwhile, the motion vector of the reconstructed region may be candidate motion information of a MERGE mode. Here, the candidate motion information of the MERGE mode may include at least one of motion information of spatial candidate blocks of the current block or motion information of a temporal candidate block.

In addition, the image decoding apparatus may search for the motion vector of the current block based on the initial motion vector determined in step S601 (5602).

Specifically, in the step of searching for the motion vector, the motion vector may be searched using a difference between the prediction block in the past direction indicated by the motion vector in the past direction and the prediction block in the future direction indicated by the motion vector in the future direction.

For example, in the step of searching for the motion vector, the motion vector may be searched based on prediction error generated by applying the difference between the prediction block in the past direction and the prediction block in the future direction to a method of calculating a sum of absolute difference (SAD).

Meanwhile, in the step of searching for the motion vector, the motion vector may be searched in the search region having a predefined size.

In addition, the image decoding apparatus may generate a prediction sample of the current block using the motion vector searched in step S602 (5603).

Meanwhile, the image decoding method of FIG. 56 may further include a step of decoding decoder-side motion vector derivation (DMVD) mode operation information. This step may be performed after step S2801, and, when the DMVD mode operation information indicates DMVD mode operation, a step of searching for the motion vector of the current block based on the initial motion vector may be performed.

The motion vector searched in the image decoding method of FIG. 56 may be used to derive the motion vector of the block decoded after the current block. Here, the searched motion vector may mean the motion vector corrected by the DMVD mode.

Figure 57:
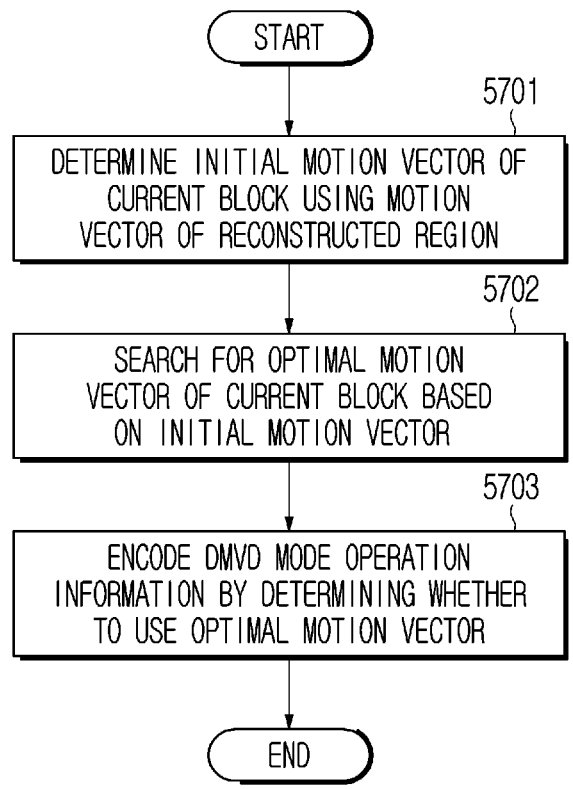
FIG. 57 is a flowchart illustrating an image encoding method according to an embodiment of the present invention.

FIG. 57 is a flowchart illustrating an image encoding method according to an embodiment of the present invention.

Referring to FIG. 57, the image encoding apparatus may determine the initial motion vector of the current block using the motion vector of the reconstructed region (5701).

Here, the initial motion vector may include a motion vector in a past direction and a motion vector in a future direction. That is, the initial motion vector may be motion information of bidirectional prediction.

Meanwhile, the motion vector of the reconstructed region may be candidate motion information of a MERGE mode. Here, the candidate motion information of the MERGE mode may include at least one of motion information of spatial candidate blocks of the current block or motion information of a temporal candidate block.

In addition, the image encoding apparatus may search for an optimal motion vector of the current block based on the initial motion vector (5702).

Specifically, in the step of searching for the optimal motion vector, the optimal motion vector may be searched using a difference between the prediction block in the past direction indicated by the motion vector in the past direction and the prediction block in the future direction indicated by the motion vector in the future direction.

For example, in the step of searching for the optimal motion vector, the optimal motion vector may be searched based on prediction error generated by applying the difference between the prediction block in the past direction and the prediction block in the future direction to a method of calculating a sum of absolute difference (SAD).

Meanwhile, in the step of searching for the optimal motion vector, the optimal motion vector may be searched in the search region having a predefined size.

In addition, the image encoding apparatus may encode decoder-side motion vector derivation (DMVD) mode operation information by determining whether the optimal motion vector is used (5703).

The optimal motion vector searched in the image encoding method of FIG. 57 may be used to derive the motion vector of the block encoded after the current block. Here, the searched optimal motion vector may mean the motion vector corrected by the DMVD mode.

A bitstream (or coding data) generated by the image encoding method of FIG. 57 may be stored in a non-transitory computer-readable recording medium. In addition, the bitstream may further include DMVD mode operation information.

Figure 58:
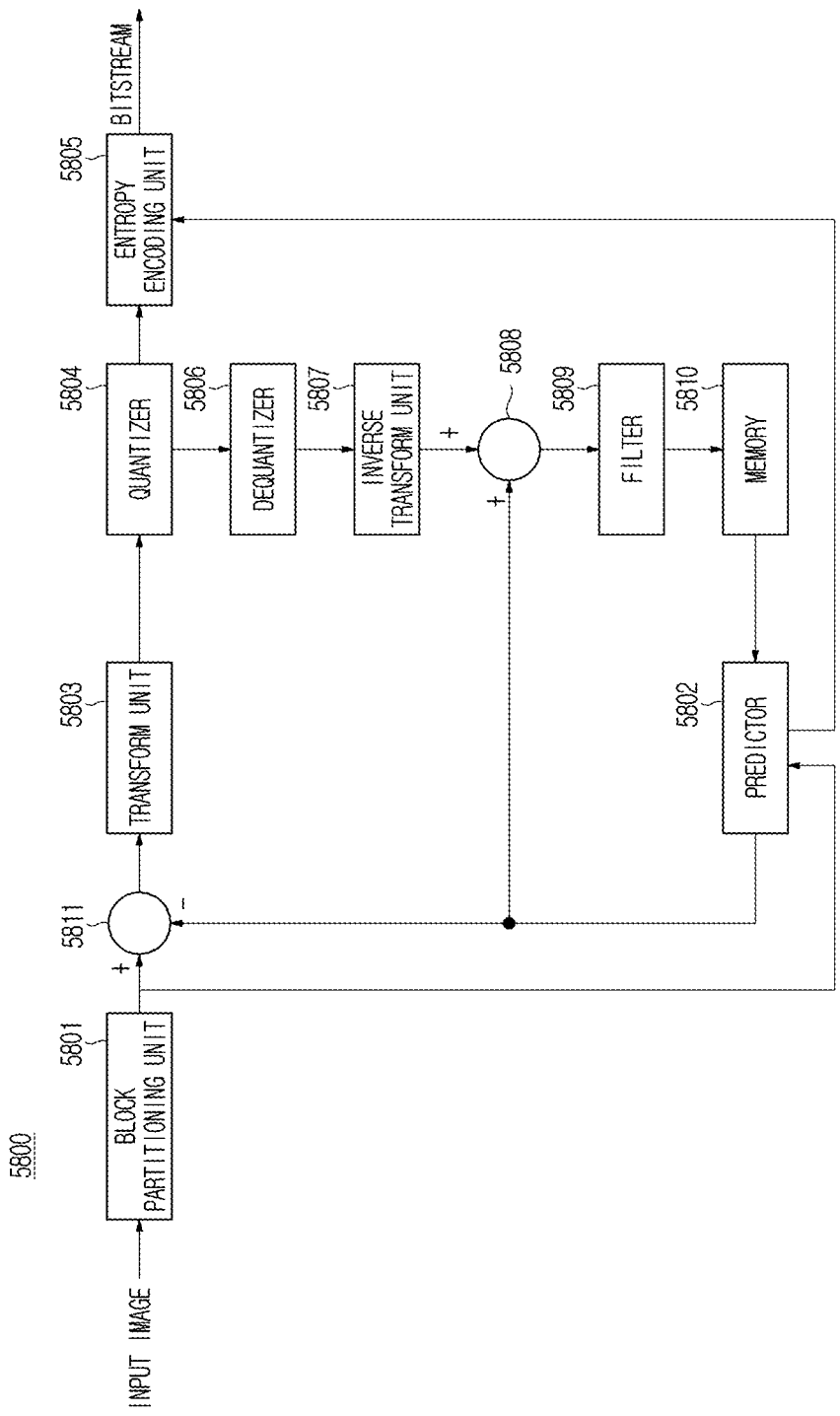
FIG. 58 is a view showing an image encoding apparatus.

FIG. 58 shows a flow of an image encoding apparatus.

Referring to FIG. 58, the image encoding apparatus encodes an image and may include a block partitioning unit 5801, a predictor 5802, a transform unit 5803, a quantizer 5804, an entropy encoding unit 5805, a dequantizer 5806, an inverse transform unit 5807, an adder 5808, an in-loop filter 5809, a memory 5810 and a subtractor 5811.

The components shown in FIG. 58 are independently shown to represent different characteristic features in the image encoding apparatus, which does not mean that the components are configured in separated hardware or a single software component. That is, the components are listed and included for convenience of description and at least two components are combined into one component and one component may be divided into a plurality of components. Embodiments in which the components are combined and embodiments in which the component is divided are also included in the scope of the present invention without departing from the essence of the present invention.

In addition, some components are not essential components for performing the essential functions in the present invention, but are optional components for improving performance. The present invention may be implemented by including only components necessary to implement the essence of the present invention excluding the components used for performance essence, and a structure including only the essential components excluding the optional components used for performance improvement is also included in the scope of the present invention.

The block partitioning unit 5801 may partition an input image into at least one block. At this time, the input image may have various shapes and sizes, such as pictures, slices, tiles, bricks or segments. The block may mean a coding unit (CU), a prediction unit (PU) or a transform unit (TU). Partitioning may be performed based on at least one a quadtree, binary tree and ternary tree.

The quadtree means accurately partitioning a current encoding block in four. The binary tree means accurately partitioning the encoding block in two in a horizontal or vertical direction. Ternary tree means a method of partitioning an upper block into three lower blocks. For example, the three lower blocks may be obtained by partitioning the width or height of the upper block in a ratio of 1:2:1. Through the above-described binary tree partitioning, the block may have not only a square but also a non-square. In addition, a partitioning method considering various partitioning methods is also possible.

The predictor 5802 may generate a prediction block using neighboring pixels of a block to be currently predicted (hereinafter referred to as a prediction block) in a current original block or pixels in a reference picture which has already been encoded/decoded.

As the prediction block, one or more prediction blocks may be generated in the coding block. When there is one prediction block in the coding block, the prediction block has the same shape as the coding block.

As the prediction technology of a video signal, there are intra prediction and inter prediction.

Intra prediction refers to a method of generating a prediction block using the neighboring pixels of the current block.

Inter prediction refers to a method of generating a prediction block by fining a block most similar to the current block from the reference picture which has already been encoded/decoded.

Meanwhile, the predictor 5802 may determine an optimal prediction mode of the prediction block by performing various methods such as rate-distortion optimization (RDO) with respect to a residual block obtained by subtracting the prediction block from the original block after generating the prediction block. The formula of calculating the RDO cost is shown in Equation 14.

$$J(\emptyset,\lambda)=D(\emptyset)+\lambda R(\emptyset)$$ Equation 14 where, D, R and J respectively denote deterioration due to quantization, the rate of the compression stream and RD cost, ¢ denotes an encoding mode, and λ is Lagrangian multiplier, which is used as a scale correction coefficient for matching units between error amount and bit amount. In the encoding process, in order to select an optimal encoding mode, J when the corresponding mode is applied, that is, the RD-cost value, needs to be less than when another mode is applied, and the equation of obtaining the RD-cost value may be calculated in consideration of both the bit rate and error.

Figure 59:
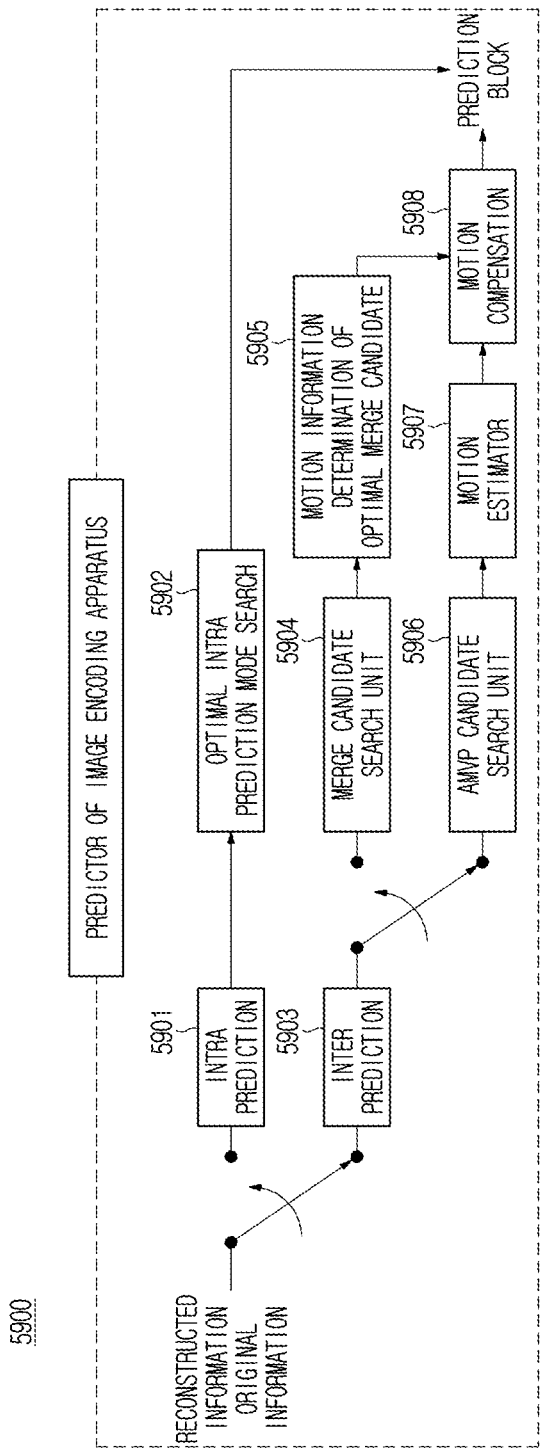
FIG. 59 is a view illustrating a predictor of an image encoding apparatus.

FIG. 59 is a view illustrating the predictor of the image encoding apparatus.

When intra prediction is performed using original information and reconstructed information (5901), the optimal intra prediction mode may be determined for each prediction mode using the RD-cost value (5902), thereby generating the prediction block.

When inter prediction is performed using original information and reconstructed information (5903), the RD-cost value is calculated with respect to the SKIP mode, the MERGE mode and the AMVP mode.

In the MERGE candidate search unit 5904, a candidate motion information set for the SKIP mode and the MERGE mode may be configured. In addition, from the candidate motion information set, optimal motion information may be determined (5905) using the RD-cost value.

In the AMVP candidate search unit 5906, a candidate motion information set for the AMVP mode may be configured. In addition, motion estimation is performed using the candidate motion information set (3007), and optimal motion information may be determined.

The prediction block may be generated by performing motion compensation using the optimal motion information determined in each mode (5908).

The above-described inter prediction may be composed of three modes (SKIP mode, MERGE mode and AMVP mode). The motion information (prediction direction information, reference picture information and motion vector) may be encoded according to each prediction mode.

In the SKIP mode, the optimal prediction information may be determined using the motion information of the already reconstructed region. In the SKIP mode, a motion information candidate group may be configured in a reconstructed region and a candidate having a minimum RD-cost value of the candidate group may be used as prediction information to generate a prediction block. Here, a method of configuring a motion information candidate group is equal to a method of configuring a motion information candidate group of a MERGE mode which will be described below and thus a description thereof will be omitted in the present description.

The MERGE mode is equal to the SKIP mode in that the optimal prediction information is determined using the motion information of the already reconstructed region. However, in the SKIP mode, motion information which causes prediction error to become 0 is searched in the motion information candidate group, whereas, in the MERGE mode, motion information in which prediction error is not 0 is searched. Similarly to the SKIP mode, the motion information candidate group may be configured in the reconstructed region and a candidate having a minimum RD-cost value of the candidate group may be used as prediction information, thereby generating a prediction block.

In the AMVP mode, optimal motion information may be determined for each reference picture according to the prediction direction. Here, the prediction direction may be unidirection which uses only one of the past/future direction and bidirection which uses both the past and future directions. Motion compensation may be performed using the optimal motion information determined through motion estimation, thereby generating the prediction block. Here, a motion information candidate group for motion estimation may be derived for each reference picture according to the prediction direction. The motion information candidate group may be used as a starting point of motion estimation.

In intra prediction, a most probable mode (MPM) may be used for efficient encoding/decoding of the optimal intra prediction mode. The MPM refers to a method of configuring an MPM candidate list using the reconstructed intra prediction mode around the current block, and, if the optimal intra prediction mode of the current block is one of the intra prediction mode in the MPM candidate list, transmitting only MPM candidate index information to encode the intra prediction mode. Here, the MPM candidate list may be used to encode an optimal luma intra prediction mode. On the other hand, when a chroma intra prediction mode is encoded, a chroma candidate list may be configured using a luma intra prediction mode. Among the modes of the configured chroma candidate list, the prediction block for the optimal chroma intra prediction mode may be generated through RD-cost value calculation.

The transform unit 5803 transforms a residual block which is a difference between an original block and a prediction block to generate a transform block. The transform block is a smallest unit used for the transform and quantization process. The transform unit 5803 transforms the residual signal into a frequency domain to generate a transform block having a transform coefficient. Here, as a method of transforming the residual signal into the frequency domain, various transform methods such as DCT (Discrete Cosine Transform), DST (Discrete Sine Transform) or KLT (Karhunen Loeve Transform) may be used and, using this, the residual signal may be transformed into the frequency domain, thereby generating the transform coefficient. In order to conveniently use the transform scheme, matrix operation is performed using a basis vector and transform schemes may be variously mixed and used upon matrix operation depending on in which prediction mode the prediction block is encoded. For example, upon intra prediction, according to the prediction mode, discrete cosine transform may be used in the horizontal direction and discrete sine transform may be used in the vertical direction.

The quantizer 5804 quantizes the transform block to generate a quantized transform block. That is, the quantizer 5804 may quantize the transform coefficients of the transform block generated by the transform unit 5803 to generate a quantized transform block having the quantized transform coefficient. As a quantization method, a dead zone uniform threshold quantization (DZUTQ) or quantization weighted matrix may be used or various quantization methods which are obtained by improving the same may be used.

Meanwhile, although the image encoding apparatus includes the transform unit 5803 and the quantizer 5804 in the above description, the transform unit and the quantizer may be optionally included in the image encoding apparatus. That is, the image encoding apparatus may transform the residual block to generate the transform block but may not perform the quantization process, perform only the quantization process without transforming the residual block into the frequency coefficient, or may not perform both the transform and quantization processes. In the image encoding apparatus, although some or both of the processes of the transform unit and the quantizer may not be performed, a block input to the entropy encoding unit is generally referred to as a "quantized transform block".

The entropy encoding unit 5805 encodes the quantized transform block and outputs a bitstream. That is, the entropy encoding unit 5805 may encode the coefficients of the quantized transform block output from the quantizer 5804 using various encoding method such as entropy encoding, and generate and output a bitstream including additional information (e.g., information on the prediction mode (the information on the prediction mode may include the intra prediction mode information or motion information determined in the predictor), a quantization coefficient, etc.) necessary to encode the block.

The dequantizer 5806 inversely performs the quantization method used upon quantization with respect to the quantized transform block to reconstruct a dequantized transform block.

The inverse transform unit 5807 inversely transforms the dequantized transform block using the same method as the method used upon transform to reconstruct the residual block, and performs inverse transform by inversely performing the transform method used in the transform unit.

Meanwhile, in the above description, the dequantizer and the inverse transform unit may perform dequantization and inverse transform using inversely the quantization method and the transform method used in the quantizer and the transform unit. In addition, when only quantization is performed and transform is not performed in the transform unit and the quantizer, only dequantization may be performed and inverse transform may not be performed. When both transform and quantization are not performed, the dequantizer and the inverse transform unit may not perform inverse transform and dequantization or may be omitted without being included in the image encoding apparatus.

The adder 5808 adds the residual signal generated by the inverse transform unit and the prediction block generated through prediction, thereby reconstructing the current block.

The filter 5809 performs additional filtering, such as deblocking filtering or sample adaptive offset (SAO), with respect to the entire picture after all blocks in the current picture are reconstructed. Deblocking filtering reduces block distortion occurring when an image is encoded in block units. SAO refers to operation of minimizing a difference between a reconstructed image and an original image, by subtracting or adding a specific value from or to the reconstructed pixel.

The memory 5810 may store the current block reconstructed through additional filtering by the in-loop filter after adding the residual signal generated by the inverse transform unit and the prediction block generated through prediction, and may be used to predict a next block or a next picture.

The subtractor 5811 generates a residual block by subtracting the prediction block from the current original block.

Figure 60:
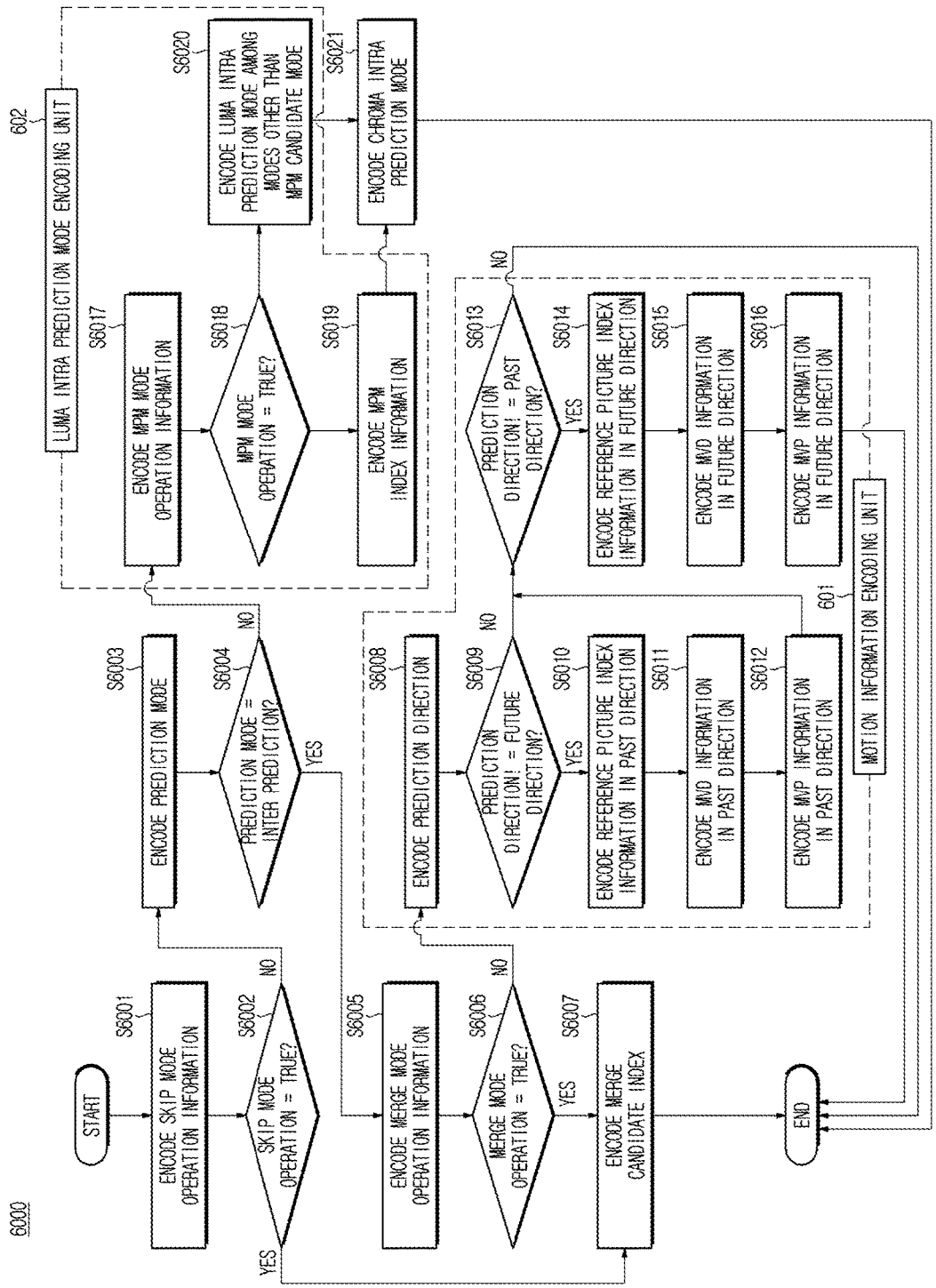
FIG. 60 is a flowchart illustrating a method of encoding prediction information.

FIG. 60 is a flowchart illustrating a method of encoding prediction information.

Referring to FIG. 60, in step S6002, operation information of the SKIP mode is encoded. In addition, in step S6002, it is determined whether the SKIP mode operates. When the SKIP mode operates in step S6002, MERGE candidate index information for the SKIP mode may be encoded in step S6007 and then this flow may be finished.

When the SKIP mode does not operate in step S6002, the prediction mode is encoded in step S6003. In step S6003, it is determined whether the prediction mode is an inter prediction mode or an intra prediction mode. When the prediction mode is an inter prediction mode in step S6004, operation information of the MERGE mode is encoded in step S6005.

In step S6006, it is determined whether the MERGE mode operates. When the MERGE mode operates in step S6006, MERGE candidate index information for the MERGE mode is encoded in step S6007 and then this flow is finished. When the MERGE mode does not operate in step S6006, the prediction direction is encoded in step S6008. Here, the prediction direction may be one of the past direction, the future direction or both directions.

In step S6009, it is determined whether the prediction direction is a future direction. When the prediction direction is not a future direction in step S6009, reference picture index information in the past direction is encoded in step S6010.

In step S6011, motion vector difference (MVD) information in the past direction is encoded. In step S6012, motion vector predictor (MVP) information in the past direction is encoded.

When the prediction direction is a future direction or both directions in step S6009 or when step S6012 is finished, it is determined whether the prediction direction is a past direction in step S6013. When the prediction direction is not a past direction in step S6013, the reference picture index in the future direction is encoded in step S6014.

In step S6015, MVD information in the future direction is encoded. MVP information in the future direction is encoded in step S6016 and then this flow is finished.

When the prediction mode is an intra prediction mode in step S6004, most probable mode (MPM) operation information is encoded in step S6017. The MPM refers to a method of configuring an MPM candidate intra prediction mode using the reconstructed intra prediction mode around the current block and then, if the optimal intra prediction mode information of the current block determined in the image encoding apparatus is present in the MPM candidate intra prediction mode, transmitting MPM candidate intra prediction mode index information.

In step S6018, it is determined whether the MPM operates. When MPM operation is true in step S6018, the index information of the MPM candidate intra prediction mode is encoded in step S6019. When MPM operation is false in step S6018, among the intra prediction modes except for the MPM candidate intra prediction mode, optimal intra prediction mode information of luma is encoded in step S6020.

After steps S6019 and S6020 are finished, optimal intra prediction mode information of Chroma may be encoded in step S6021 and then this flow may be finished. Here, a unit for performing steps S6008 to S6016 is referred to as a motion information encoding unit 601. In addition, a unit for performing steps S6017 to S6020 is referred to as a luma intra prediction mode encoding unit 602.

Figure 61:
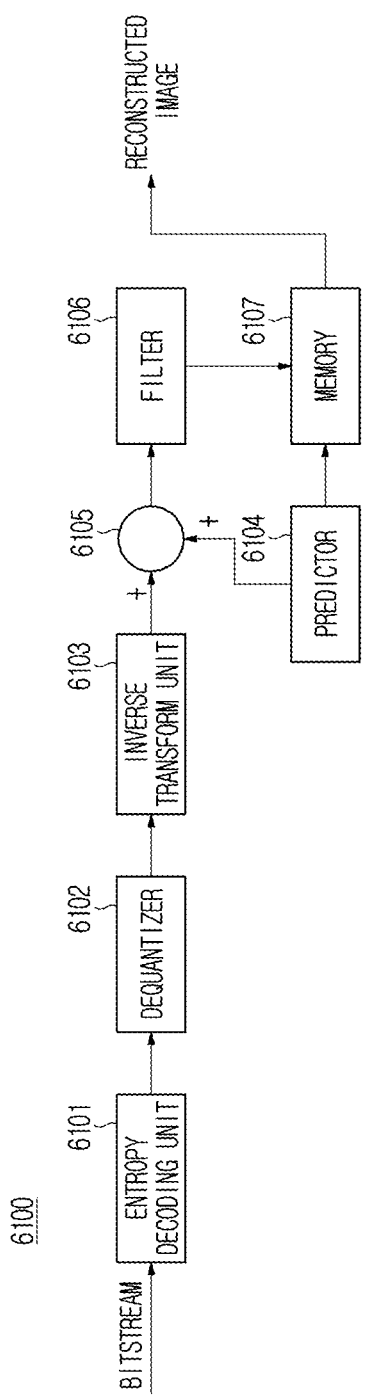
FIG. 61 is a view showing an image decoding apparatus.

FIG. 61 shows a flow of an image decoding apparatus.

Referring to FIG. 61, the image decoding apparatus decodes an image and may include an entropy decoding unit 6101, a dequantizer 6102, an inverse transform unit 6103, a predictor 6104, an adder 6105, an in-loop filter 6106 and a memory 6107.

The components shown in FIG. 61 are independently shown to represent different characteristic features in the image encoding apparatus, which does not mean that the components are configured in separated hardware or a single software component. That is, the components are listed and included for convenience of description and at least two components are combined into one component and one component may be divided into a plurality of components. Embodiments in which the components are combined and embodiments in which the component is divided are also included in the scope of the present invention without departing from the essence of the present invention.

In addition, some components are not essential components for performing the essential functions in the present invention, but are optional components for improving performance. The present invention may be implemented by including only components necessary to implement the essence of the present invention excluding the components used for performance essence, and a structure including only the essential components excluding the optional components used for performance improvement is also included in the scope of the present invention.

The encoding block in the image encoding apparatus may be referred to as a decoding block or an encoding block in the image decoding apparatus.

The entropy decoding unit 6101 may analyze the bitstream received from the image encoding apparatus to read a variety of information necessary to decode the block and a quantized transform coefficient.

The dequantizer 6102 may inversely perform the quantization method used upon quantization with respect to the quantization coefficient decoded by the entropy decoding unit to reconstruct the dequantized block having the dequantized coefficient.

The inverse transform unit 6103 may inversely transform the dequantized transform block using the same method as the method used upon transform to reconstruct a residual block having a difference signal and may perform inverse transform by inversely performing the transform method used in the transform unit.

The predictor 6104 generates the prediction block using the prediction mode information decoded by the entropy decoding unit, using the same method as the prediction method performed in the predictor of the image encoding apparatus.

The adder 6105 may add the residual signal reconstructed by the inverse transform unit and the prediction block generated through prediction, thereby reconstructing the current block.

The filter 6106 performs additional filtering, such as deblocking filtering or sample adaptive offset (SAO), with respect to the entire picture after all blocks in the current picture are reconstructed, and the details thereof are the same as those described in the in-loop filter of the image encoding apparatus.

The memory 6107 may store the current block reconstructed through additional filtering by the in-loop filter after adding the residual signal generated by the inverse transform unit and the prediction block generated through prediction, and may be used to predict a next block or a next picture.

Figure 62:
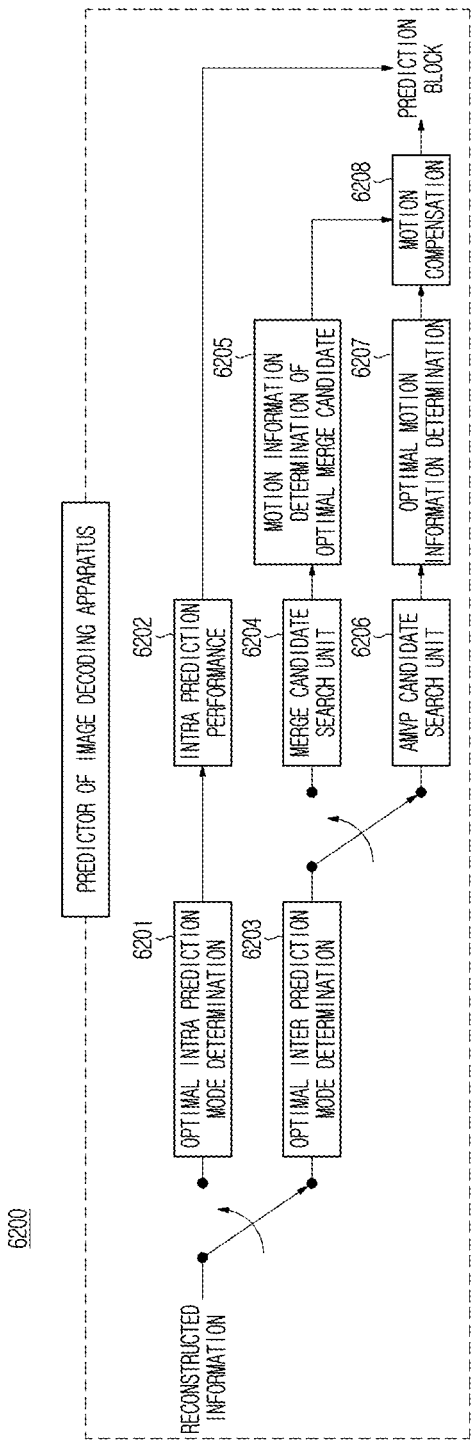
FIG. 62 is a view illustrating a predictor of an image decoding apparatus.

FIG. 62 is a view illustrating the predictor of the image decoding apparatus.

Referring to FIG. 62, when the prediction mode is intra prediction, optimal intra prediction mode information may be determined (6201), and intra prediction may be performed (6202), thereby generating the prediction block.

When the prediction mode is inter prediction, an optimal prediction mode is determined from the SKIP, MERGE and AMVP modes (6203). In addition, when decoding is performed in the SKIP mode or the MERGE mode, a candidate motion information set for the SKIP mode and the MERGE mode may be configured in the MERGE candidate search unit 6204. Optimal motion information may be determined from the candidate motion information set (6205).

When decoding is performed in the AMVP mode, a candidate motion information set for the AMVP mode may be configured in the AMVP candidate search unit 6206. Optimal motion information may be determined from among the candidate motion information candidates using the transmitted MVP information (6207). Thereafter, motion compensation may be performed using the optimal motion information determined in each mode (6208), thereby generating the prediction block.

Figure 63:
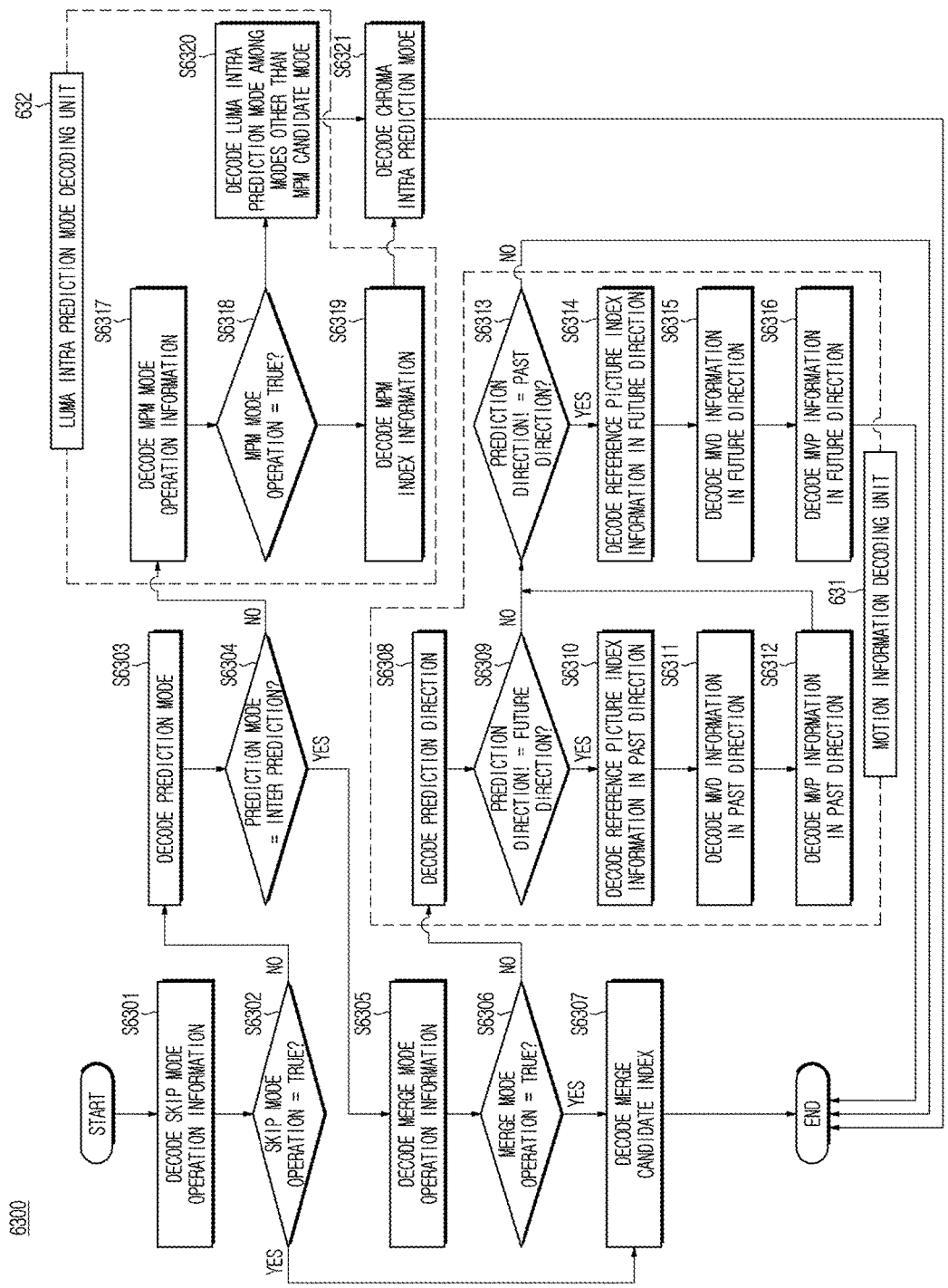
FIG. 63 is a flowchart illustrating a method of decoding prediction information.

FIG. 63 is a flowchart illustrating a method of decoding prediction information.

Referring to FIG. 63, in step S6301, operation information of the SKIP mode is decoded. In step S6302, it is determined whether the SKIP mode operates. When the SKIP mode operates in step S6302, MERGE candidate index information for the SKIP mode may be decoded in step S6307 and this flow may be finished.

When the SKIP mode does not operate in step S6302, the prediction mode is decoded in step S6303. In step S6303, it is determined whether the prediction mode is an inter prediction or intra prediction mode. When the prediction mode is an inter prediction mode in step S6304, operation information of the MERGE mode is decoded in step S6305.

In step S6306, it is determined whether the MERGE mode operates. When the MERGE mode operates in step S6306, MERGE candidate index information for the MERGE mode may be decoded in step S6307 and then this flow may be finished. When the MERGE mode does not operate in step S6306, the prediction direction is decoded in step S6308. Here, the prediction direction may be one of the past direction, the future direction or both directions. In step S6309, it is determined whether the prediction direction is a future direction. When the prediction direction is not a future direction in step S6309, reference picture index information in the past direction is decoded in step S6310.

Motion vector difference (MVD) information in the past direction is decoded in step S6311. In addition, in step S6312, motion vector predictor (MVP) information in the past direction is decoded.

When the prediction direction is a future direction or both directions in step S6309 or when step S6312 is finished, it is determined whether the prediction direction is a past direction in step S6313. In addition, when the prediction direction is not the past direction in step S6313, reference picture index information in the future direction is decoded in step S6314.

In step S6315, the MVD information in the future direction is decoded. In step S6316, the MVP information in the future direction may be decoded and then this flow may be finished.

When the prediction mode is an intra prediction mode in step S6304, MPM operation information is decoded in step S6317. In step S6318, it is determined whether the MPM operates. When MPM operation is true in step S6318, index information of MPM candidate intra prediction mode is decoded in step S6319. When MPM operation is false in step S6318, optimal intra prediction mode information of luma among the remaining intra prediction modes except for than the MPM candidate intra prediction mode is decoded in step S6320.

After steps S6319 and S6320 are finished, optimal intra prediction mode information of chroma may be decoded in step S6321 and then this flow may be finished. Here, a unit for performing steps S6308 to S6316 is referred to as a motion information encoding unit 631. In addition, a unit for performing steps S6317 to S6320 is referred to as a luma intra prediction mode encoding unit 632.

Hereinafter, various embodiments of the present invention will be described in greater detail with reference to the drawings.

Figure 64:
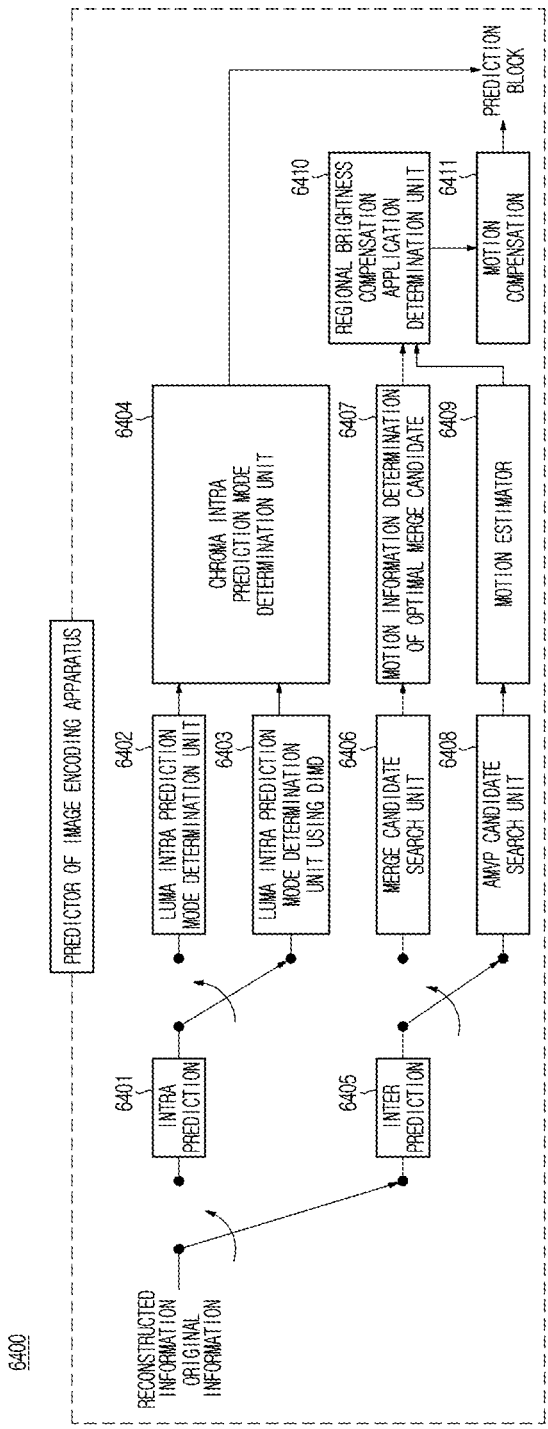
FIG. 64 is a view illustrating a predictor of an image encoding apparatus according to an embodiment of the present invention.

FIG. 64 is a view illustrating a predictor of an image encoding apparatus according to an embodiment of the present invention.

When intra prediction is performed using original information and reconstructed information (6401), whether intra prediction mode is determined using a decoder side intra prediction mode derivation (DIMD) mode may be determined using the RD-cost value. When the DIMD mode is not used, a Luma intra prediction mode is determined (6402). At this time, an intra prediction mode having a minimum RD-cost value may be determined from among intra prediction modes.

On the other hand, when the DIMD mode is used, intra prediction mode information is not transmitted, and the intra prediction mode of Luma may be determined using the same prediction method as the image decoding apparatus. A DIMD prediction method will be described in detail using FIG. 72.

Thereafter, candidate modes for a Chroma intra prediction mode may be determined using a Luma intra prediction mode, and an intra prediction mode, in which the RD-cost value is minimized, among the candidate modes may be determined as a Chroma intra prediction mode (6404). The predictor 6400 of the image encoding apparatus may generate an intra prediction block of the current block using the determined Luma and Chroma intra prediction modes.

When inter prediction is performed using original information and reconstructed information (6405), the RD-cost value may be calculated with respect to the SKIP mode, the MERGE mode and the AMVP mode.

In the MERGE candidate search unit 6406, a candidate motion information set for the SKIP mode and the MERGE mode may be configured (6406). Optimal motion information may be determined from the configured candidate motion information set using the RD-cost value (6407).

In the AMVP candidate search unit 6408, a candidate motion information set for the AMVP mode may be configured (6408). Motion estimation may be performed using the configured candidate motion information sets (6409), and optimal motion information may be determined.

After the optimal motion information of the SKIP, MERGE and AMVP modes is determined, whether to apply regional brightness compensation may be determined (6410). In the SKIP and MERGE modes, it may be determined whether to apply regional brightness compensation by applying whether to apply regional brightness compensation of the prediction block reconstructed as the optimal candidate motion information without change or by comparing the RD-cost value, to which regional brightness compensation is applied and, the RD-cost value, to which regional brightness compensation is not applied. In the AMVP mode, it may be determined whether to apply regional brightness compensation by comparing the RD-cost value, to which regional brightness compensation is applied and, the RD-cost value, to which regional brightness compensation is not applied.

Motion compensation may be performed (6411) using optimal motion information (including motion vector precision) and information determined after determining whether to apply regional brightness compensation. The predictor 6400 of the image encoding apparatus generates an inter prediction block through motion compensation 6411.

Figure 65:
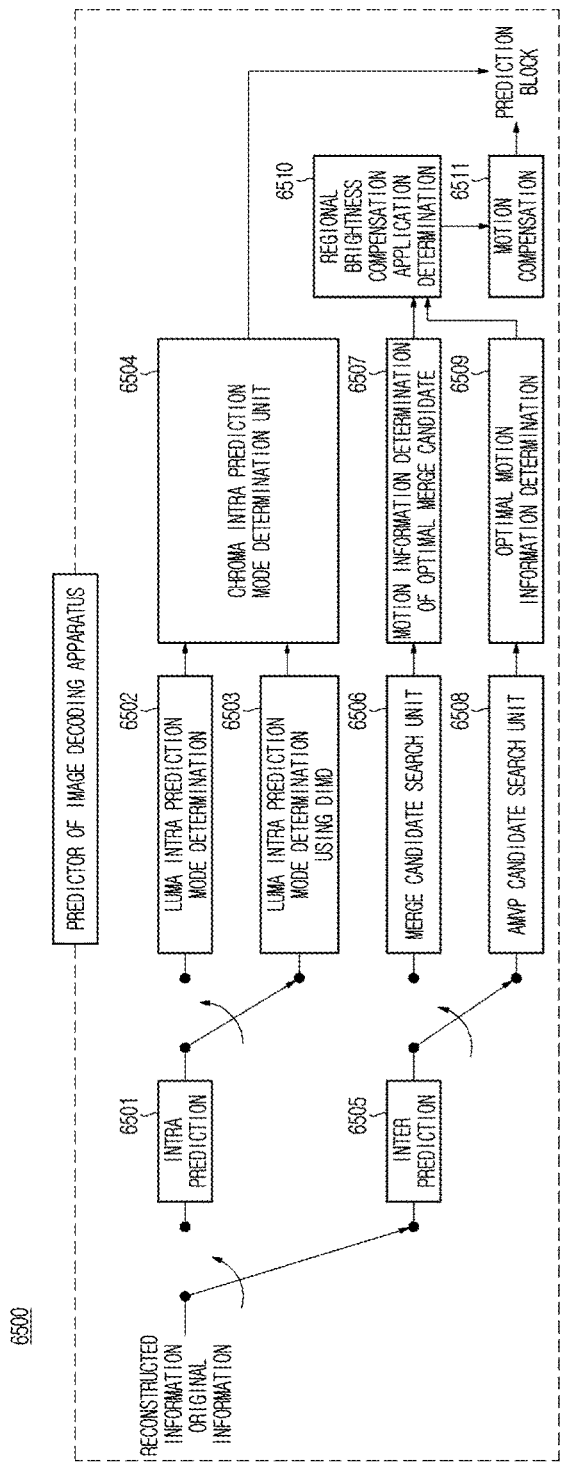
FIG. 65 is a view illustrating a predictor of an image decoding apparatus according to an embodiment of the present invention.

FIG. 65 is a view illustrating the predictor of an image decoding apparatus according to an embodiment of the present invention.

When intra prediction is performed using reconstructed information (6501), whether intra prediction mode is determined using a DIMD mode may be determined.

At this time, when the DIMD mode is not used, a Luma intra prediction mode may be determined through the reconstructed information (6502). When the DIMD mode is used, the intra prediction mode of Luma may be determined using the same prediction method as the image encoding apparatus through the reconstructed information.

Thereafter, a Chroma intra prediction mode may be determined through the reconstructed information (6504). The predictor 6500 of the image decoding apparatus may generate the intra prediction block of the current block using the determined Luma and Chroma intra prediction modes.

When inter prediction is performed using the reconstructed information (6505), it should be determined whether the current prediction mode is the SKIP mode, the MERGE mode or the AMVP mode among the inter prediction modes.

When the current prediction mode is one of the SKIP and MERGE modes, the MERGE candidate search unit 6506 may configure a candidate motion information set for the SKIP mode and the MERGE mode. Optimal motion information may be determined (6507) from the candidate motion information set through the reconstructed information.

The AMVP candidate search unit 6508 may configure a candidate motion information set for the AMVP mode. An optimal candidate may be selected from the candidate motion information set through the reconstructed information and optimal motion information may be determined through the reconstructed motion information (6509).

After the optimal motion information of the SKIP, MERGE and AMVP modes is determined, whether to apply regional brightness compensation may be determined through the reconstructed information (6510). Motion compensation may be performed (6511) using optimal motion information (including motion vector precision) and information determined after determining whether to apply regional brightness compensation. The predictor 6500 of the image decoding apparatus may generate an inter prediction block through motion compensation.

Figure 66:
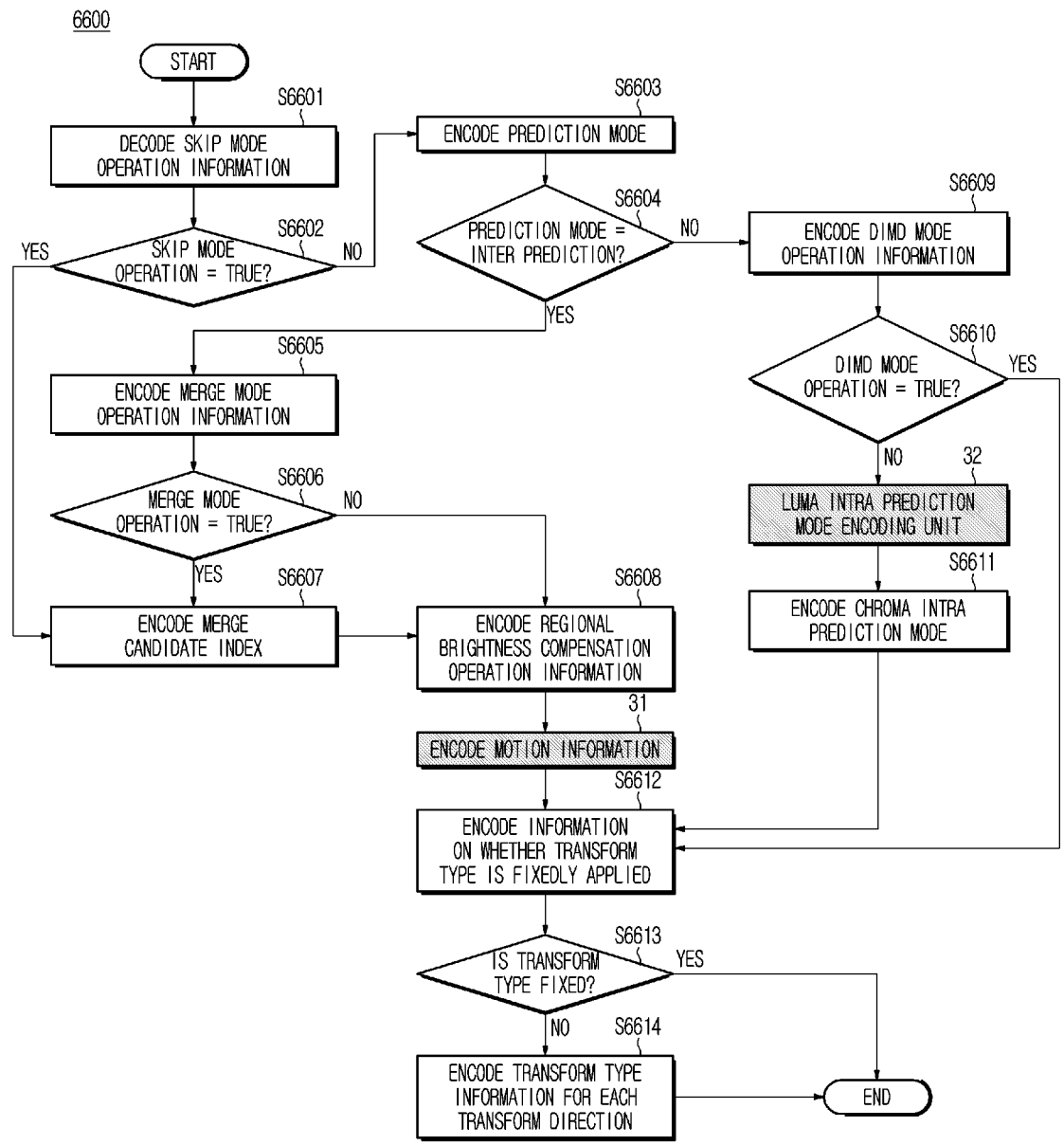
FIG. 66 is a flowchart illustrating a method of encoding coding information according to an embodiment of the present invention.

FIG. 66 is a flowchart illustrating a method of encoding coding information according to an embodiment of the present invention.

The method of encoding coding information in the entropy encoding unit of the image encoding apparatus according to an embodiment of the present invention will be described with reference to FIG. 66. Description of steps S6601 to S6607 of FIG. 66 may be the same as that of steps S6001 to S6007 of FIG. 60.

When MERGE mode operation is false in step S6606 or after step S6607 is finished, regional bright compensation operation information may be encoded in step S6608. However, when the prediction mode is the SKIP or MERGE mode and when following whether to apply regional brightness compensation of the prediction block reconstructed as the optimal candidate motion information without change, this step may be omitted.

After step S6608 is finished, motion information may be encoded through the motion information encoding unit 601 (steps S6008 to S6016 of FIG. 60).

When the prediction mode is an intra prediction mode rather than an inter prediction mode in step S6604, DIMD mode operation information may be encoded in step S6609. In step S6610, it is determined whether the DIMD mode operates. When DIMD mode operation is true, additional intra prediction mode information may not be encoded. When DIMD mode operation is false, an optimal intra prediction mode of Luma may be encoded through the Luma intra prediction mode encoding unit 602 (steps S6017 to S6020 of FIG. 60).

In step S6611, an optimal intra prediction mode of Chroma may be encoded. Thereafter, in step S6612, information on whether a transform type is fixedly applied may be encoded.

In step S6613, it may be determined whether the transform type is fixed. When the transform type is fixed, this flow may be finished and, when the transform type is adaptively determined, transform type information may be encoded for each transform direction and then this flow may be finished.

Figure 67:
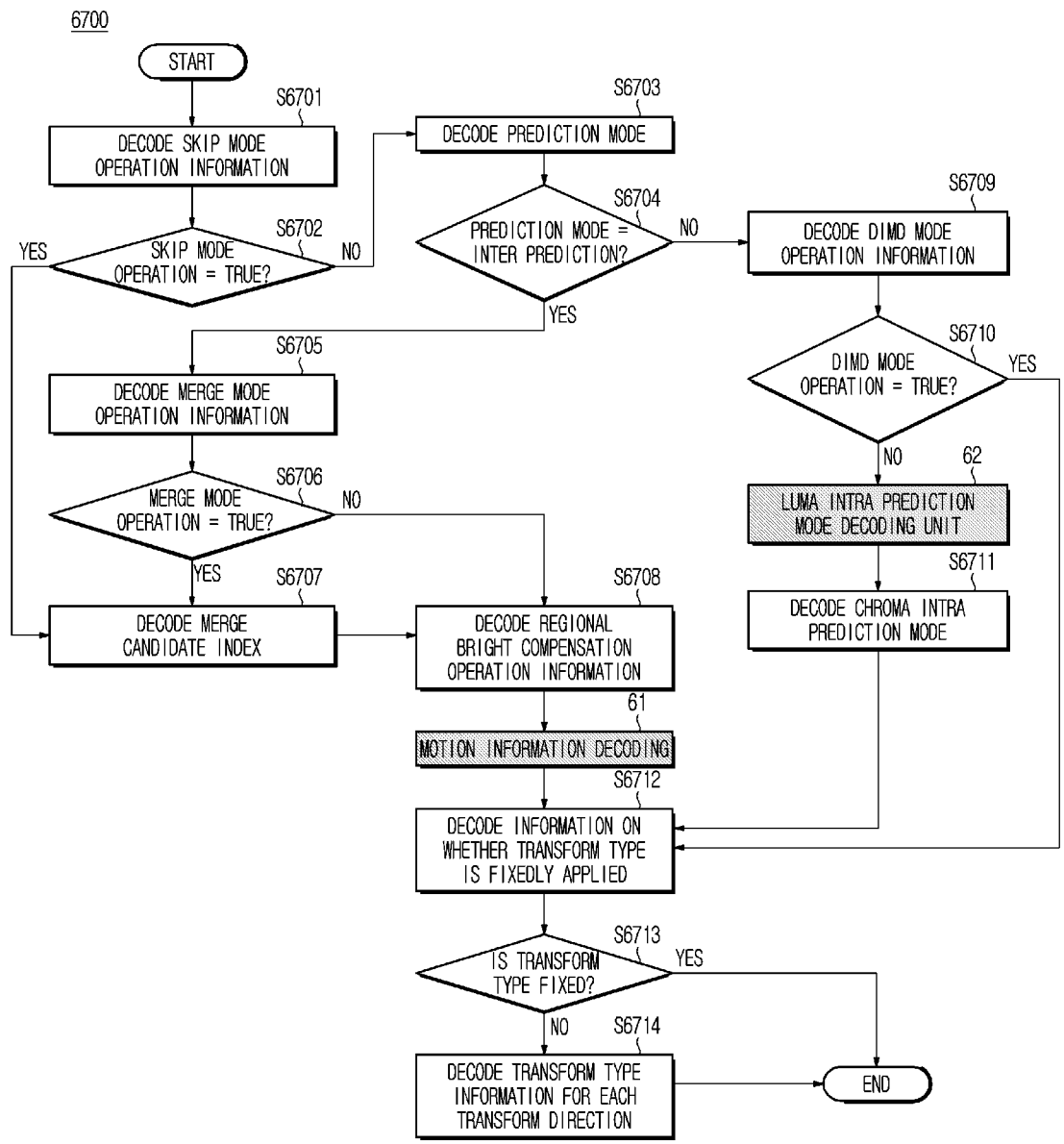
FIG. 67 is a flowchart illustrating a method of decoding coding information according to an embodiment of the present invention.

FIG. 67 is a flowchart illustrating a method of decoding coding information according to an embodiment of the present invention.

The method of decoding coding information in the entropy encoding unit of the image decoding apparatus according to an embodiment of the present invention will be described with reference to FIG. 67. Description of steps S6701 to S6707 may be the same as that of steps S6301 to S6307 of FIG. 63.

When MERGE mode operation is false in step S6706 or after step S6707 is finished, regional bright compensation operation information may be decoded in step S6708. However, when the prediction mode is the SKIP or MERGE mode and when following whether to apply regional brightness compensation of the prediction block reconstructed as the optimal candidate motion information without change, this step may be omitted.

After step S6708 is finished, motion information may be decoded through the motion information decoding unit 631 (steps S6308 to S6316 of FIG. 63). When the prediction mode is an intra prediction mode in step S6704, DIMD mode operation information may be decoded in step S6709.

In step S6710, it may be determined whether the DIMD mode operates. When DIMD mode operation is true, additional intra prediction mode information may not be decoded. When DIMD mode operation is false, an optimal intra prediction mode of Luma may be decoded through the Luma intra prediction mode decoding unit 632 (steps S6317 to S6320 of FIG. 63).

In step S6711, an optimal intra prediction mode of Chroma may be decoded. Thereafter, in step S6712, information on whether a transform type is fixedly applied may be decoded.

In step S6713, it may be determined whether the transform type is fixed. When the transform type is fixed, this flow may be finished and, when the transform type is adaptively determined, transform type information may be decoded for each transform direction and then this flow may be finished.

Hereinafter, a method of encoding/decoding a motion vector difference (MVD) using motion vector difference information in an inter prediction mode will be described.

Hereinafter, the motion vector difference may mean a vector value used to derive a final motion vector. For example, the motion vector difference for the current block may be added to the initial motion vector for the current block and used to derive the final motion vector for the current block.

The motion vector difference information may be used to derive the motion vector difference for the current block. The image decoding apparatus may decode the motion vector difference information to derive the motion vector difference for the current block.

The inter prediction mode according to the present embodiment may be one of the MERGE mode, AMVP mode or SKIP mode.

For example, when the inter prediction mode of the current block is an AMVP mode, the motion vector difference may be added to the MVP to derive the final motion vector for the current block.

As another example, when the inter prediction mode of the current block is a MERGE mode, the motion vector difference may be added to the initial motion vector derived through the MERGE mode to derive the final motion vector for the current block. That is, the motion vector difference may be a vector value used to correct the initial motion vector derived through the MERGE mode. For example, the motion vector difference may refer to precision information of the initial motion vector. The initial motion vector in the MERGE mode may be derived using a merge candidate list for the current block.

Figure 68:
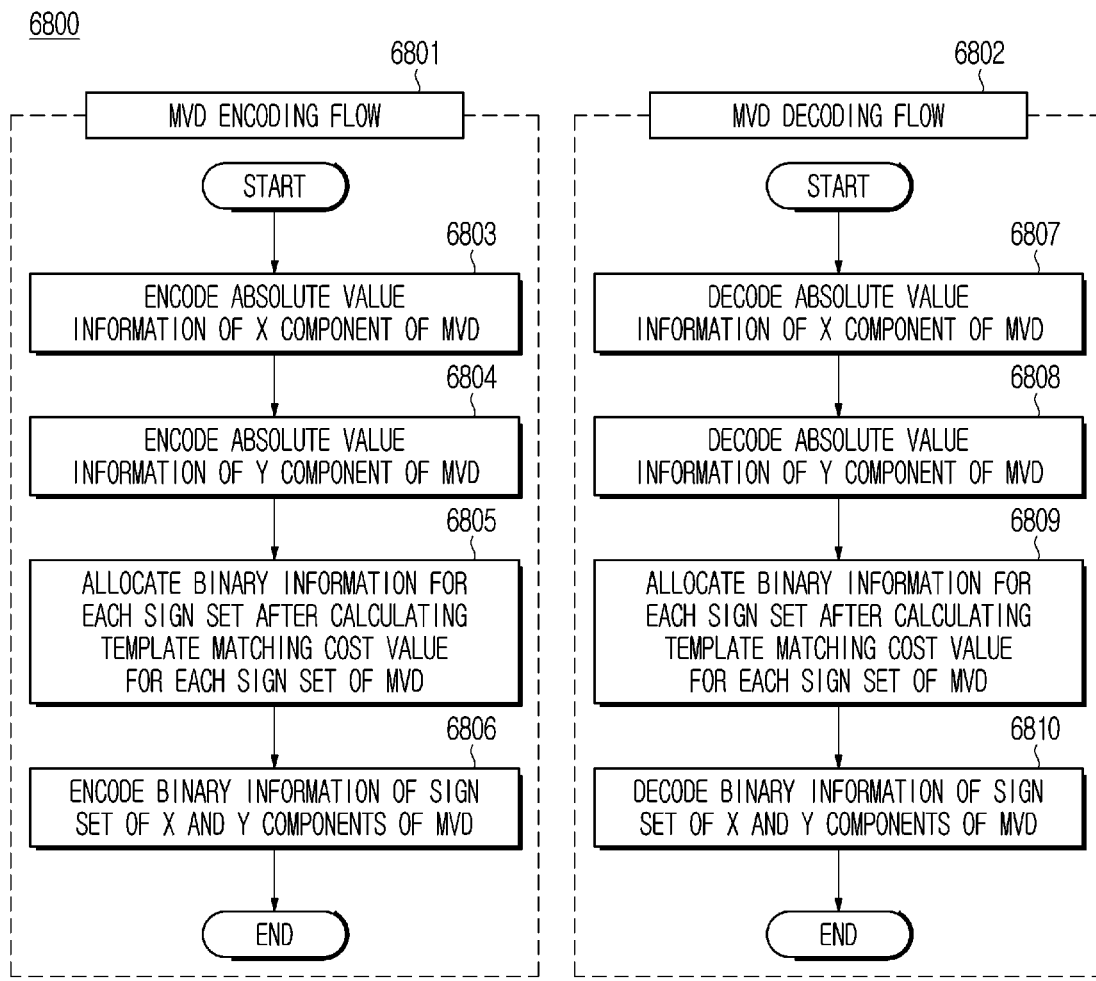
FIG. 68 is a flowchart illustrating a method of encoding/decoding motion vector difference information according to an embodiment of the present invention.

FIG. 68 is a flowchart illustrating a method of encoding/decoding motion vector difference information in an inter prediction mode.

Methods 6801 and 6802 of FIG. 68 respectively show methods of encoding (steps S6011 and S6015)/decoding (steps S6311 and S6315) the motion vector difference information in the motion information encoding unit 601 and the motion information decoding unit 631 in detail.

As another example, the methods 6801 and 6802 of FIG. 68 respectively show operation of MERGE mode operation information encoding (step S305)/MERGE mode operation information decoding (step S605) in detail.

For example, the motion vector difference information may include information indicating whether the motion vector difference for motion is present in the current block. Information indicating whether the motion vector difference is present may be expressed by a flag value.

For example, the motion vector difference information may include at least one of X component absolute value information or Y component absolute value information for the motion vector difference.

The image encoding apparatus may encode the absolute value information of the X component for the motion vector difference in step S6803, and encode the absolute value information of the Y component in step S6804. As another example, the image encoding apparatus may first encode the absolute value information of the Y component for the motion vector difference and then encode the absolute value information of the X component for the motion vector difference.

On the other hand, the image decoding apparatus may decode the absolute value information of the X component for the motion vector difference in step S6807, and decode the absolute value information of the Y component in step S6808. As another example, the image decoding apparatus may first decode the absolute value information of the Y component for the motion vector difference and then decode the absolute value information of the X component for the motion vector difference.

As another example, the image encoding/decoding apparatus may simultaneously encode/decode the absolute value information of the X component and the Y component for the motion vector difference. In order to simultaneously encode/decode the X component and the Y component for the motion vector difference, the motion vector difference information may include motion vector absolute value set information composed of at least one of the X component absolute value information or the Y component absolute value information.

Meanwhile, the motion vector difference information may include information on a sign set composed of any one of a X component sign or a Y component sign for the motion vector difference. For example, the information on the sign set may indicate one of sign sets composed of any one of the X component sign and the Y component sign for the motion vector difference. At this time, binary information may be allocated for each sign set, and information on the sign set may be expressed by an index indicating one of the sign sets.

For example, information on the sign set may be an index indicating one of the sign set defined according to Table 2 below.

TABLE 2

| Motion vector difference sign set index | X component sign | Y component sign |
|---|---|---|
| 0 | + | 0 |
| 1 | − | 0 |
| 2 | 0 | + |
| 3 | 0 | − |

In step S6805, the encoding apparatus may calculate the template matching cost value for each sign set of the motion vector difference and allocate binary information or index for each sign set of the motion vector difference.

FIG. 69 is a table showing a method of determining binary information using a template matching cost value when motion vector difference information according to an embodiment of the present invention is encoded.

For example, if the absolute values of both the X and Y components of the motion vector difference are not 0, the binary information of the motion vector difference sign set may be allocated according to 6901 of FIG. 69. At this time, the template matching cost value may be calculated for each motion vector difference sign set.

As another example, if the absolute value of one of the X and Y components of the motion vector difference is 0, the binary information of the motion vector difference sign set may be allocated according to 6902 and 6903. 6902 may be a case where the absolute value of the X component of the motion vector difference is 0 and 6903 may be a case where the absolute value of the Y component of the motion vector difference is 0. In this case, the template matching cost value may be calculated with respect to only two sign sets.

The image encoding apparatus may efficiently determine binary information allocated to each sign set in the ascending order of the template matching cost value for each case 6901, 6902 or 6903, thereby increasing coding efficiency. In the case of 6902 or 6903, the binary number of allocated binary information is 1 digit for each motion vector difference sign set, but the entropy encoding unit and the entropy decoding unit may increase the probability of the binary information having a low template matching cost value as the CABAC probability information corresponding to each binary information, thereby increasing coding efficiency.

The template matching cost value and the allocated binary information of FIG. 69 are examples, and the cost value may be changed and the method of allocating the binary information may also be changed.

Figure 70:
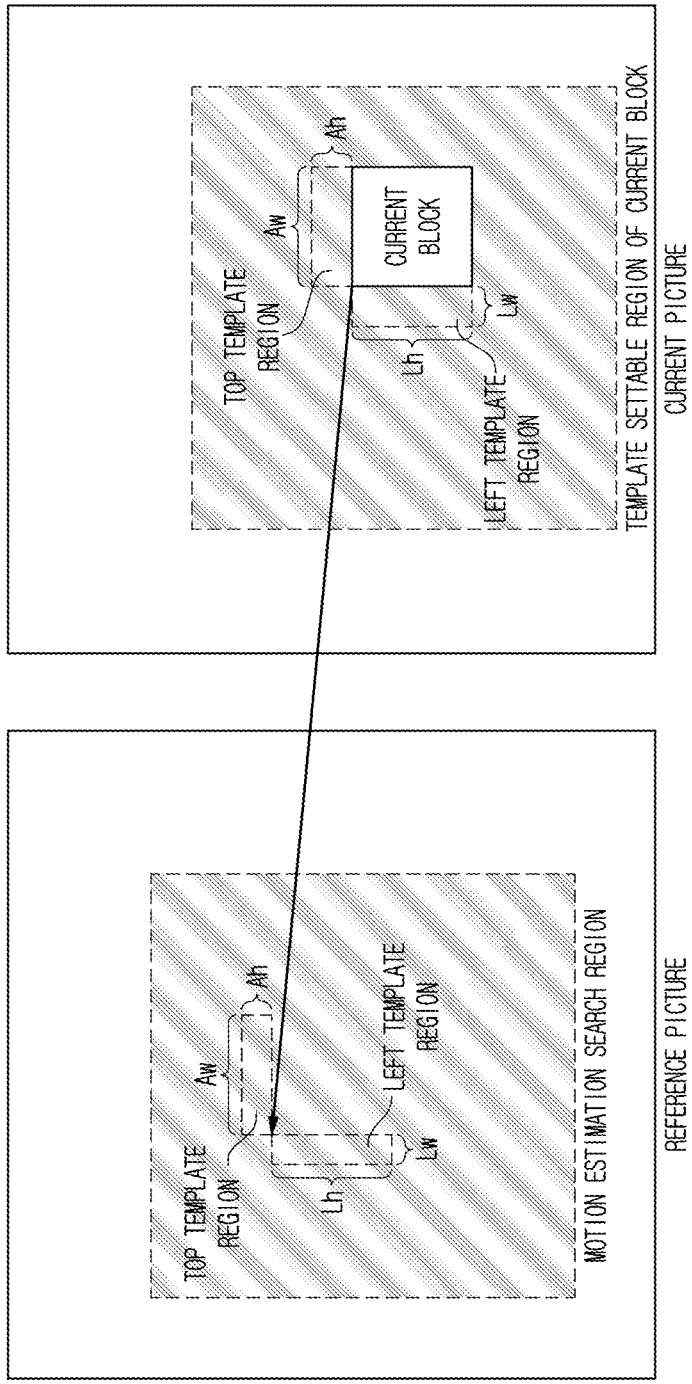
FIG. 70 is a view illustrating template matching technology when determining binary information of motion vector difference information according to an embodiment of the present invention.

FIG. 70 is a view illustrating template matching technology when binary information of motion vector difference information according to an embodiment of the present invention is determined.

The above-described template matching technology will be described with reference to FIG. 70. A template region may be determined in a reconstructed region of a current block in a current picture. The template region may be determined in the left (Lh×Lw, Lh and Lw being integers greater than 0) and top (Aw×Ah, Aw and Ah being integers greater than 0) regions of the current block as shown in FIG. 70. At this time, the shape, location and size of the template region may be variously determined.

A region most similar to the template of the current picture in the motion estimation search region in the reference picture may be searched as the template region of the reference picture. At this time, the amount of error between the template regions around the current block and the template regions in the motion estimation search region may be determined as a template matching cost value. Here, the amount of error may be derived through a calculation method such as sum of absolute difference (SAD) or sum of square difference (SSD). Equations 15 and 16 show the methods of calculating SAD and SSD, respectively.

$$SAD = \sum_{i,j} |(Diff(i, j)|, \quad \text{Equation 15}$$

$$Diff(i, j) = \text{Template}(i, j) - PredBlk(i, j)$$

$$SSD = \sum_{i,j} Diff(i, j)^2, \quad \text{Equation 16}$$

$$Diff(i, j) = \text{Template}(i, j) - PredBlk(i, j)$$

where, i and j denote the locations of pixels, Template(i, j) denotes the pixel of the template block, and PredBlk (i, j) denotes the pixel of the prediction block.

Thereafter, in steps S6806 and S6810, the binary information or index of the sign set of the determined motion vector difference may be encoded/decoded.

Hereinafter, a method of determining binary information using template matching technology when an optimal Luma Chroma intra prediction mode is encoded/decoded in an intra prediction mode will be described.

Figure 71:
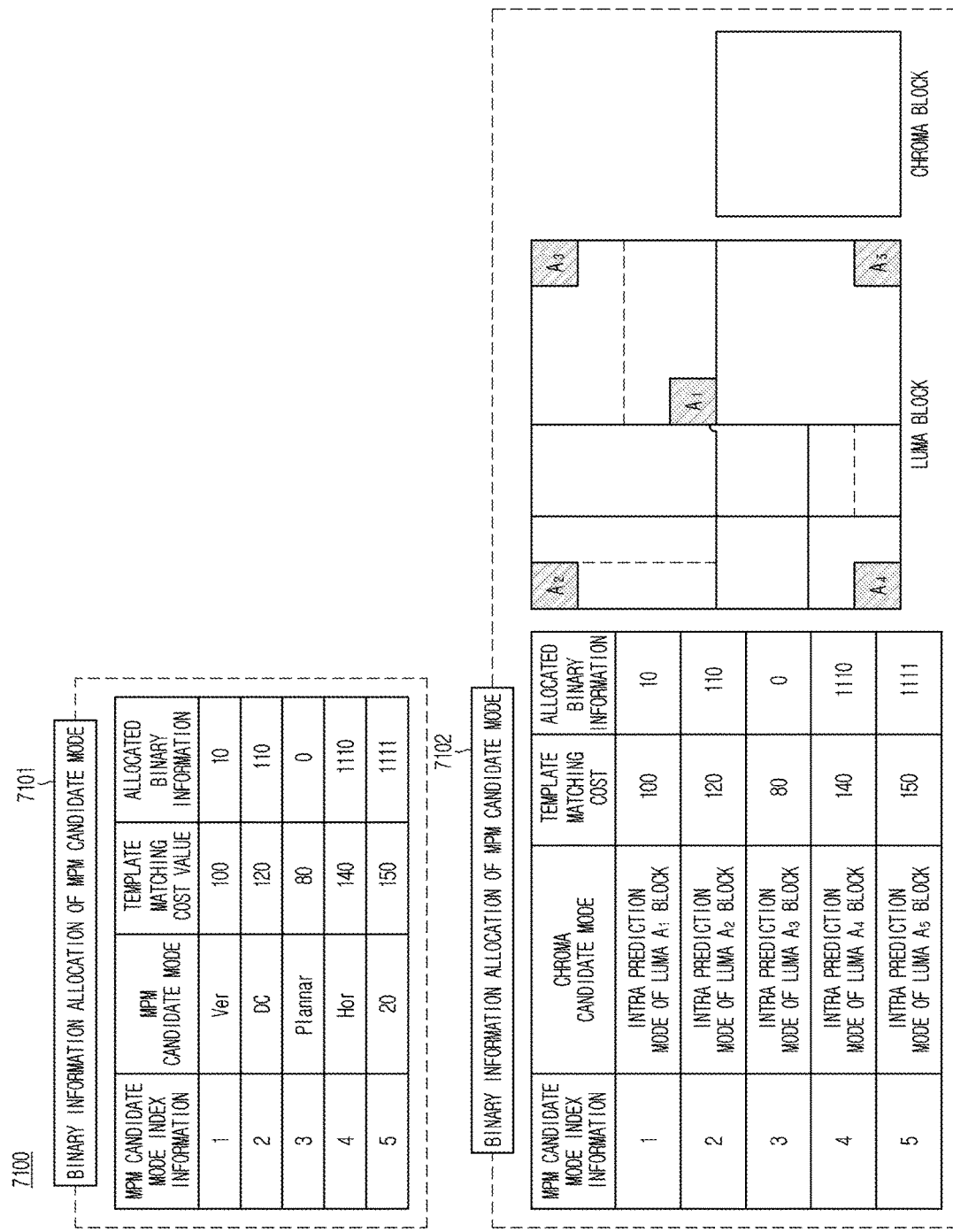
FIG. 71 is a view illustrating a method of allocating binary information per candidate of an MPM candidate mode list and a method of allocating binary information of a chroma candidate mode using a template matching cost value of template matching technology for a DIMD mode according to an embodiment of the present invention.

FIG. 71 is a view illustrating a binary information allocation method for each candidate of an MPM candidate mode list and a binary information allocation method of a Chroma candidate mode using a template matching cost value of template matching technology for a DIMD mode according to an embodiment of the present invention.

FIG. 71 shows an example of a method of determining binary information of index information based on a template matching cost value when encoding MPM index information (S6019) and decoding MPM index information (S6319) if MPM operation is true in the Luma intra prediction mode encoding unit of FIG. 60 and the Luma intra prediction mode decoding unit of FIG. 63. The template matching technology in the intra prediction mode may be different from the template matching technology in the inter prediction mode.

Figure 72:
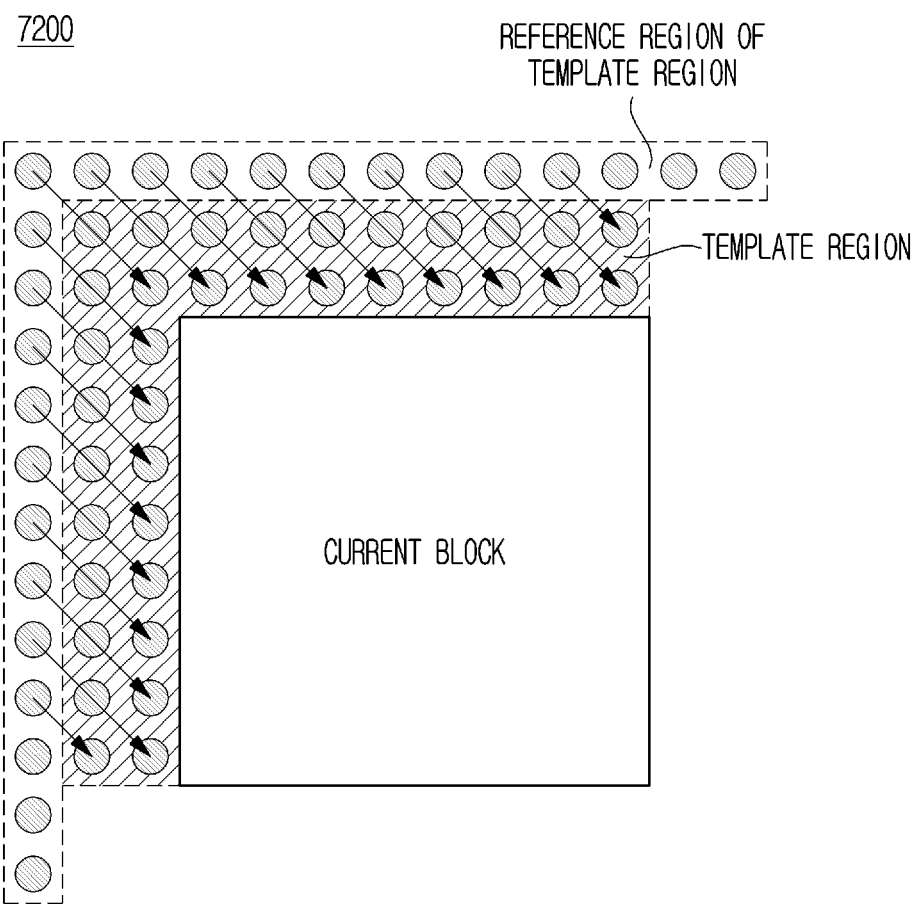
FIG. 72 is a view illustrating template matching technology of a DIMD mode according to an embodiment of the present invention.

FIG. 72 is a view illustrating template matching technology of a DIMD mode according to an embodiment of the present invention.

Template matching technology using a template region in a reconstructed region around a current block in an intra prediction mode will be described with reference to FIG. 72.

In FIG. 72, the template region may be determined in the reconstructed region around the current block.

Here, the size of the template region may be variously determined. Thereafter, the reference region of the template region may be determined around the template region. The template region is intra-predicted using the reconstructed pixels of the reference region, and a difference between a predicted value and the reconstructed value of the template region, that is, the amount of prediction error, may be determined as the template matching cost value. As the method of calculating the amount of prediction error, various methods such as SAD or SSD may be used.

In 7101 of FIG. 71, when an optimal Luma intra prediction mode is encoded, the template matching cost value for the intra prediction mode included in the MPM candidate list may be first calculated.

Thereafter, the smaller the template matching cost value, less binary information may be allocated to the intra prediction mode.

For example, as shown in Table of 7101, a vertical (Ver) mode, a DC mode, a Planar mode, a horizontal (Hor) mode, and an Angular 20 mode are included in the MPM candidate list, and, when the template matching cost value is 100, 120, 80, 140 or 150 for each intra prediction mode, allocated binary information may be determined as 0, 10, 110, 1110 and 1111 in the ascending order of the template matching cost value. The template matching cost value and the allocated binary information of Table of 7101 are examples, the cost value may be changed, and the method of allocating binary information may also be changed.

In 7102 of FIG. 71, when an optimal Chroma intra prediction mode is encoded, the template matching cost value for the intra prediction mode in the Chroma candidate mode list may be first calculated.

Thereafter, the smaller the template matching cost value, less binary information may be allocated to the Chroma intra prediction mode.

Intra prediction modes reconstructed in the luma block may be used as the intra prediction modes of the chroma candidate mode list. In an image with a format 4:2:0, the size of the chroma block is ¼ of the size of the luma block. In addition, in an intra only picture, since block partitioning of the Luma block and the Chroma block are independently performed, as shown in 7102, block partitioning of the Luma block and the Chroma block may be different.

When configuring the Chroma candidate mode list, the Chroma candidate mode list may be configured using the intra prediction mode reconstructed in five different blocks $A_1$, $A_2$, $A_3$, $A_4$ and $A_5$ of the Luma block. The template matching cost value of the intra prediction mode in the blocks $A_1$, $A_2$, $A_3$, $A_4$ and $A_5$ may be calculated in the configured Chroma candidate mode list. The smaller the cost value, less allocated binary information may be allocated as shown in the table of 7102. The template matching cost value and the allocated binary information in the table of 7102 are examples, the cost value may be changed, and the method of allocating binary information may also be changed.

Hereinafter, a method of using a template region in a reconstructed region around a current block when performing a regional brightness compensation process in an inter prediction mode will be described.

Figure 73:
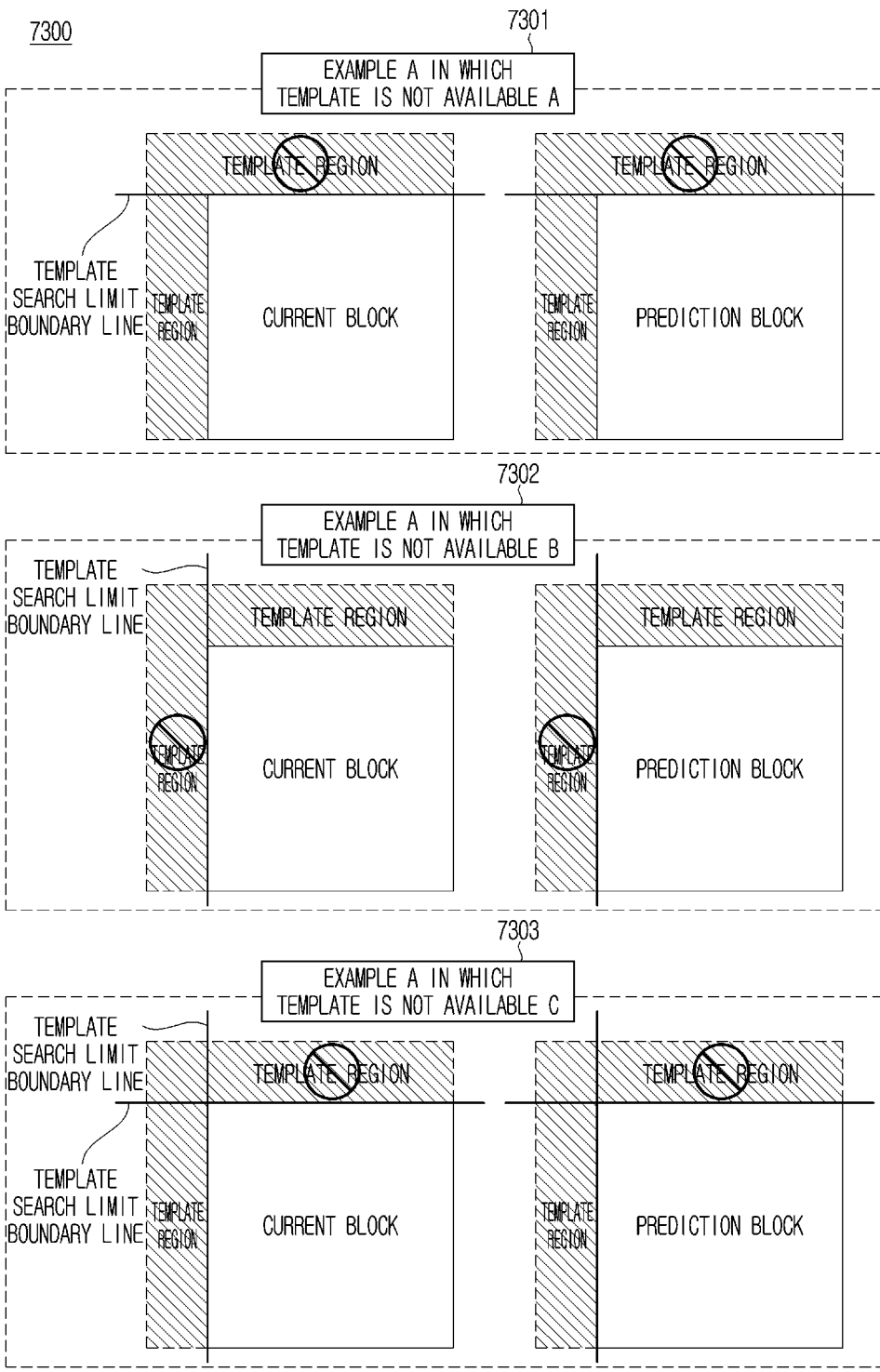
FIG. 73 is a view illustrating a method of determining whether to use a template in a reconstructed region around a prediction block depending on whether to use a template in a reconstructed region around a current block when performing a regional brightness compensation technology according to an embodiment of the present invention.

FIG. 73 is a view illustrating a method of determining whether to use a template in a reconstructed region around a prediction block depending on whether to use a template within a reconstructed region around a current block when performing a regional brightness compensation technology according to an embodiment of the present invention.

When regional brightness compensation is performed, a compensation process in which a difference between the template region of the reconstructed region around the prediction block indicated by optimal motion information and the template region of the reconstructed region around the current block is minimized may be performed. This compensation process may be a process of deriving parameters a and B in which a least squares sum of a straight line is minimized through linear regression analysis. Regional brightness compensation using $\alpha$ and $\beta$ may be performed through Equation 17.

$$\text{FinalPred} = \alpha * \text{CurPred} + \beta \qquad \text{Equation 17}$$

When $\alpha$ and $\beta$ are derived, the template region of the reconstructed region around the current block may be limited as shown in FIG. 73. This limitation may be for the design of an efficient parallel processing structure of an image.

When determining whether to use the template region of the reconstructed region around the current block, a region outside a maximum coding block including the current block may not be used as the template region. In addition, a window (K×L) having an arbitrary size may be set and a template region outside the window may not be used. The size of this window may be transmitted through an upper header (video parameter end, sequence parameter end, picture parameter end, slice end, etc.) and a preset size may be equally used in the image encoding/decoding apparatus.

In addition, whether to use the template region may not be determined while invading a partitioning boundary such as slice and tile.

Even in the template region of the reconstructed region around the prediction block, only the location of the template region available around the current block may be equally used.

FIG. 73 is a view illustrating a method of determining whether to use a template in a reconstructed region around a prediction block depending on whether to use a template within a reconstructed region around a current block when performing a regional brightness compensation technology according to an embodiment of the present invention.

7301 of FIG. 73 is an example indicating that the top region of the reconstructed region around the current block cannot be used as the template region and thus the template region of the top region of the prediction block cannot be used. 7302 of FIG. 73 is an example indicating that the left region of the reconstructed region around the current block cannot be used as the template region and thus the template region of the left region of the prediction block cannot be used. 7303 of FIG. 73 is an example indicating that both the top and left regions of the reconstructed region around the current block cannot be used as the template region and thus both the template regions of the top and left regions of the prediction block cannot be used.

In the case of 7303, a regional brightness compensation process may not be performed. In this case, regional brightness compensation operation information may not be encoded in step S6608 of FIG. 66 and regional brightness compensation operation information may not be decoded in step S6708 of FIG. 67. At this time, the regional brightness compensation operation information may be determined to be false.

Hereinafter, a method of determining binary information of a transform type using template matching technology when the transform type is encoded/decoded for block-wise transform of an image will be described.

Figure 74:
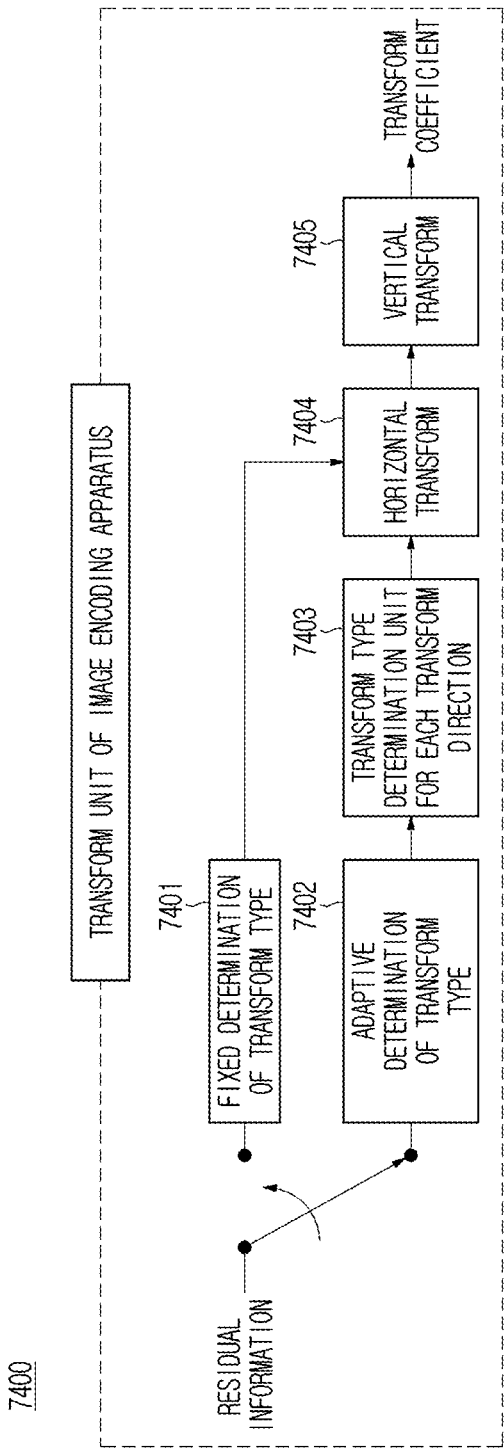
FIG. 74 is a view showing a transform unit of an image encoding apparatus according to an embodiment of the present invention.

FIG. 74 is a view showing a transform unit of an image encoding apparatus according to an embodiment of the present invention.

The transform unit 7400 of the image encoding apparatus may transform residual information into a frequency domain to derive a transform coefficient. When transforming the residual information, a transform type may be determined fixedly (7401) or adaptively (7402).

When the transform type is fixed, the transform coefficient may be obtained by transforming the residual information in the horizontal direction (7404) and then transforming the residual information in the vertical direction (7405) with the fixed transform type. At this time, as the transform type, one of various transform types such as DCT-2 type may be fixedly used.

On the other hand, when the transform type is adaptively determined, one of various transform types may be adaptively determined as the transform type. For example, one of DCT-2, DCT-5, DCT-8, DST-1 and DST-7 type may be adaptively determined as the transform type. At this time, the transform type may be determined for each transform direction (7403). Horizontal transform 7404 and vertical transform 7405 may be performed using the transform type determined for each transform direction, thereby deriving the transform coefficient. At this time, the transform type for each direction may be transmitted in units of blocks, and may be preset and used in the upper header in consideration of the size or shape of the transform block.

Figure 75:
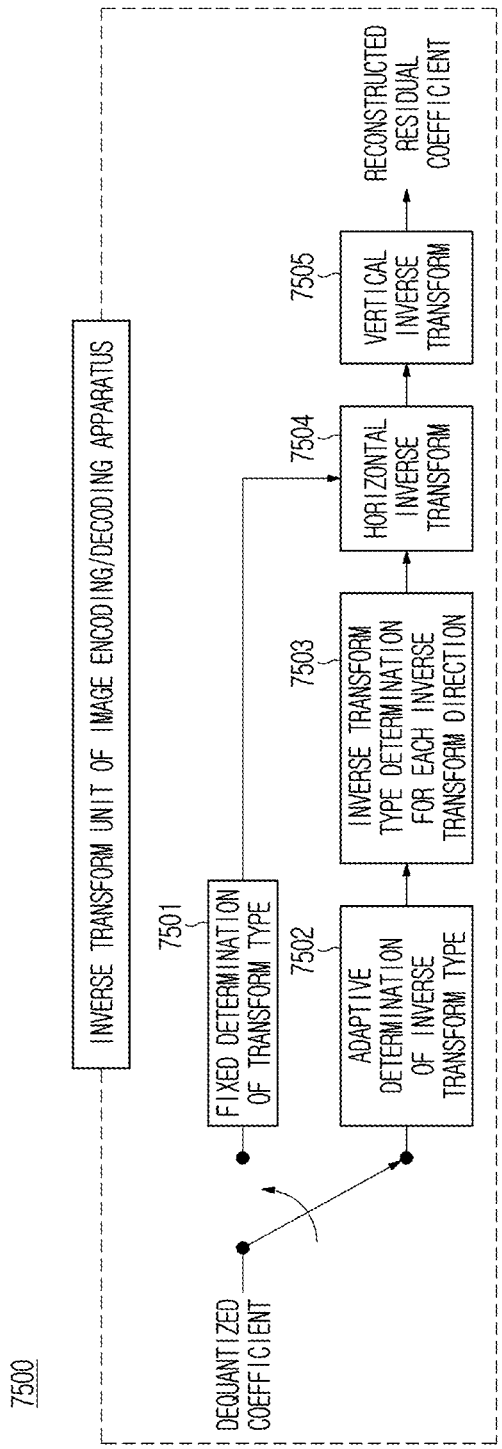
FIG. 75 is a view showing an inverse transform unit of an image encoding/decoding apparatus according to an embodiment of the present invention.

FIG. 75 is a view showing an inverse transform unit of an image encoding/decoding apparatus according to an embodiment of the present invention.

The inverse transform unit 7500 of the image encoding/decoding apparatus may transform a dequantized coefficient into a pixel domain, thereby deriving a reconstructed residual coefficient. When inversely transforming the dequantized coefficient, an inverse transform type may be determined fixedly (7501) or adaptively (7502).

When the transform unit 7400 of the image encoding apparatus fixedly transforms the transform type, the inverse transform unit 7500 of the image encoding/decoding apparatus may perform inverse transform with the fixed inverse transform type. A reconstructed residual coefficient may be derived by performing vertical inverse transform (7504) and horizontal inverse transform (7505) of the transform type determined by the transform unit with the inverse transform type.

When the inverse transform type is adaptively determined, a reconstructed residual coefficient may be derived by performing vertical inverse transform (7504) and horizontal inverse transform (7505) of the transform type for each transform direction determined by the transform unit with the inverse transform type.

Figure 76:
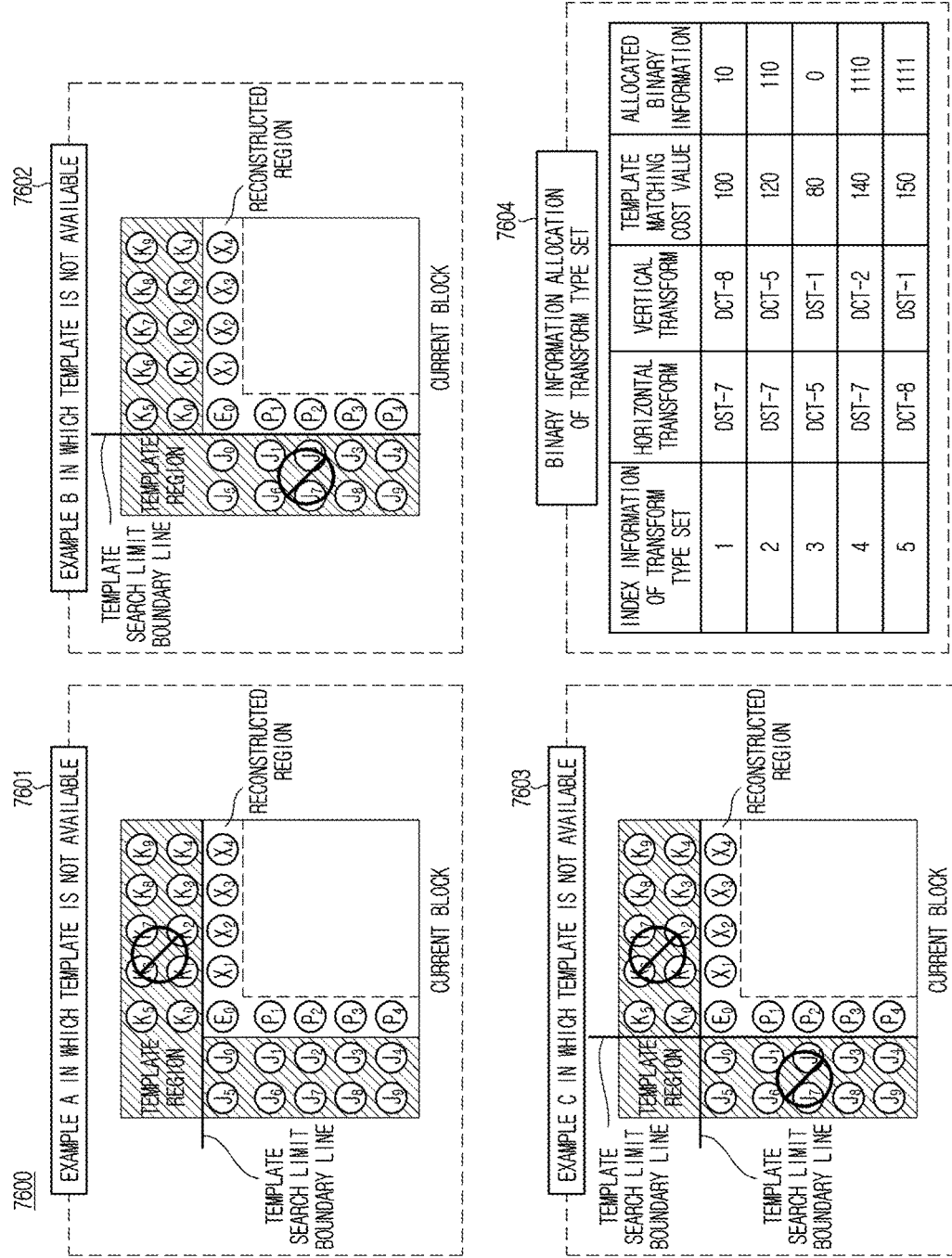
FIG. 76 is a view illustrating a method of using template matching technology in order to determine binary information of a transform type in a transform unit/inverse transform unit of an image encoding/decoding apparatus according to an embodiment of the present invention.

FIG. 76 is a view illustrating a method of using template matching technology in order to determine binary information of a transform type in a transform unit/inverse transform unit of an image encoding/decoding apparatus according to an embodiment of the present invention.

A method of determining binary information when transform type information for each transform direction is encoded/decoded in the case where the transform type for each transform direction is adaptively determined in a transform and a method of determining whether to use a template region in a reconstructed region around a current block upon applying template matching technology when determining binary information will be described with reference to FIG. 76.

According to the example of 7604, five transform type set are defined, and a horizontal/vertical transform type is determined for each transform type set. At this time, a template matching cost value may be calculated using template matching technology for each transform set.

In order to calculate the template matching cost value in the template matching technology in the transform unit, only the template region in the reconstructed region around the current block may be required. In the examples of 7601 to 7603, a reconstructed pixel value may be calculated with respect to one row of the top left side of the current block using each transform type set. By adding a prediction value after transforming/quantizing residual values corresponding to the reconstructed region and then performing dequantization/inverse transform, a reconstructed pixel value of a reconstructed region may be obtained. The template matching cost value may be calculated using the reconstructed region and the template region through Equation 18 below.

$$TempDist = \sum_{i=1}^{Height-1}(2J_i - J_{(i+Height)} - P_i) + \sum_{j=1}^{Width-1}(2K_j - K_{(j+Width)} - P_i) + (2(K_0 + J_0) - K_{Width} - J_{Height} - 2E_0)$$

Equation 18

In Equation 18, TempDist denotes a template matching cost value. i denotes the coordinate of a left template region, and j denotes the coordinate of a top template region. Width and Height denote the width and height of the current block, respectively.

The template matching cost value may be calculated for each transform type set through Equation 5. The lower the cost value, the less binary information may be allocated. The transform type of horizontal/vertical transform, template matching cost value and allocated binary information in the table of 7604 are examples, the transform type may be changed in various combinations, the cost value may be changed, and the method of allocating the binary information may also be changed.

When calculating the template matching cost value, the template region of the reconstructed region around the current block may be limited as in the examples of 7601, 7602 and 7603. A region outside a maximum encoding block including the current block may not be used as the template region. In addition, a window (K×L) having an arbitrary size may be set and a template region outside the window may not be used. The size of this window may be transmitted through an upper header and a preset size may be equally used in the image encoding/decoding apparatus.

In addition, whether to use the template region may not be determined while invading a partitioning boundary such as slice and tile.

7601 of FIG. 76 shows the case where the top region is not available as the template region in the reconstructed region around the current block. 7602 shows the case where the left region is not available as the template region in the reconstructed region around the current block. 7603 shows the case where both the top and left regions are not available as the template region in the reconstructed region around the current block In the example of 7603, the transform type may be fixedly used. Therefore, in step S6612 of FIG. 66, information indicating whether the transform type is fixedly applied may not be encoded and the transform type may be fixedly used. Even in step S6712 of FIG. 67, information indicating whether the transform type is fixedly applied may not be decoded and the transform type may be fixedly used.

Figure 77:
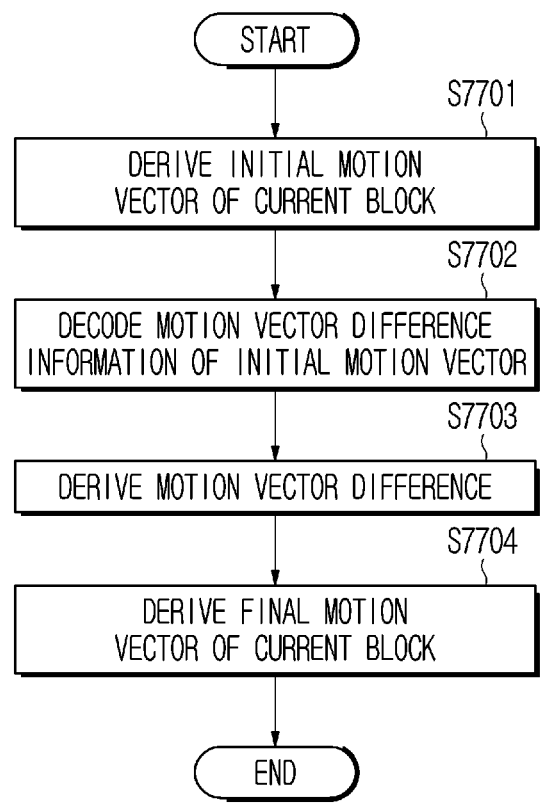
FIG. 77 is a flowchart illustrating an image decoding method according to an embodiment of the present invention.

FIG. 77 is a flowchart illustrating an image decoding method according to an embodiment of the present invention.

Referring to FIG. 77, the image decoding apparatus may derive an initial motion vector of a current block (S7701).

Here, the initial motion vector may be derived using α merge candidate list of the current block. For example, the initial motion vector may be derived through candidate motion information derived through a Merge mode. The merge candidate list may be derived using at least one of motion information of spatial candidate blocks of the current block or motion information of a temporal candidate block.

In addition, the image decoding apparatus may decode motion vector difference information of the initial motion vector derived in step S7701 (S7702), and derive a motion vector difference of the initial motion vector using the decoded motion vector difference information (S7703). In addition, the image decoding apparatus may derive the final motion vector of the current block by adding the motion vector difference derived in step S7703 to the initial motion vector derived in step S7701 (S7704).

Here, the motion vector difference information may include may include information on a sign set composed of any one of an X component sign and a Y component sign for the motion vector difference. In addition, the motion vector difference information may include at least one of X component absolute value information or Y component absolute value information for the motion vector difference.

At this time, the information on the sign set may indicate one of sign sets composed of any one of the X component sign and the Y component sign, which may be expressed in the form of an index.

Figure 78:
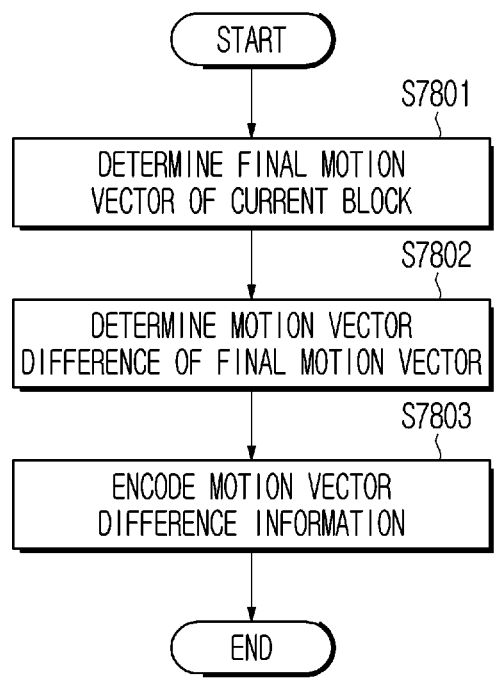
FIG. 78 is a flowchart illustrating an image encoding method according to an embodiment of the present invention.

FIG. 78 is a flowchart illustrating an image encoding method according to an embodiment of the present invention.

Referring to FIG. 78, the image encoding apparatus may determine a final motion vector of a current block (S7801).

At this time, the image encoding apparatus may derive the final motion vector of the current block through RD-cost value comparison, etc.

In addition, the image encoding apparatus may determine a motion vector difference of the final motion vector determined in S7801 (S7802). The image encoding apparatus may encode the motion vector difference information of the motion vector difference determined in S7801.

Here, the motion vector difference may be added to the initial motion vector of the current block and used to derive the final motion vector determined in S7801 in the image decoding apparatus.

Here, the motion vector difference information may include information on a sign set composed of any one of an X component sign and a Y component sign for the motion vector difference. In addition, the motion vector difference information may include at least one of X component absolute value information or Y component absolute value information for the motion vector difference.

At this time, the information on the sign set may indicate one of sign sets composed of any one of the X component sign and the Y component sign, which may be expressed in the form of an index.

A bitstream (or coding data) generated by the image encoding method of FIG. 78 may be stored in a computer-readable recording medium. In addition, the bitstream may further include initial motion vector information and the motion vector difference information of the initial motion vector.

The above-described embodiments may be performed through the same method or corresponding methods in the image encoding apparatus and the image decoding apparatus.

An image may be encoded/decoded using at least one of the embodiments or a combination thereof.

The order of applying the embodiment may differ between the image encoding apparatus and the image decoding apparatus, and the order of applying the embodiment may be the same in the image encoding apparatus and the image decoding apparatus.

The embodiment may be performed with respect to each of luma and chroma signals, and the embodiment of the luma and chroma signals may be equally performed.

Exemplary methods of the present disclosure are expressed as a series of operations for clarity of explanation, but this is not intended to limit the order in which the steps are performed, and if necessary, the steps may be performed simultaneously or in a different order. In order to implement the method according to the present disclosure, additional steps may be included in addition to the exemplary steps, some steps may be excluded and the other steps may be included, or some steps may be excluded and additional other steps may be included.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention in hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, and a non-transitory computer-readable medium having such software or commands stored thereon and executable on the apparatus or the computer.

INDUSTRIAL APPLICABILITY

The present invention may be used to encode or decode an image.

The invention claimed is:

1. An image decoding method comprising:
generating a first prediction block by performing inter prediction with respect to a current block;
generating a second prediction block by performing intra prediction with respect to the current block; and
generating a final prediction block by weighted-summing the first prediction block and the second prediction block,
wherein a weight of the first prediction block and a weight of the second prediction block are determined based on a prediction mode of neighboring block of the current block.

2. The image decoding method of claim 1, wherein the first prediction block is predicted in merge mode.

3. The image decoding method of claim 1, wherein the second prediction block is predicted using fixed intra prediction mode.

4. The image decoding method of claim 1, wherein the second prediction block is predicted using planar intra prediction mode.

5. An image encoding method comprising:
generating a first prediction block by performing inter prediction with respect to a current block;
generating a second prediction block by performing intra prediction with respect to the current block; and
generating a final prediction block by weighted-summing the first prediction block and the second prediction block,
wherein a weight of the first prediction block and a weight of the second prediction block are determined based on a prediction mode of neighboring block of the current block.

6. The image encoding method of claim 5, wherein the first prediction block is predicted in merge mode.

7. The image encoding method of claim 5, wherein the second prediction block is predicted using fixed intra prediction mode.

8. The image encoding method of claim 5, wherein the second prediction block is predicted using planar intra prediction mode.

9. A non-transitory computer-readable recording medium including a bitstream used for image decoding, the bitstream including prediction information of a current block,
wherein the prediction information is used to generate a first prediction block by performing inter prediction on the current block,
wherein the first prediction block is used to generate a final prediction block by weighted-summing with a second prediction block, and
wherein the second prediction block is generated by performing intra prediction on the current block,
wherein a weight of the first prediction block and a weight of the second prediction block are determined based on a prediction mode of neighboring block of the current block.

* * * * *